United States Patent
Kobori

(10) Patent No.: US 9,411,427 B2
(45) Date of Patent: Aug. 9, 2016

(54) ENTRY DEVICE AND PAPER SHEETS HANDLING DEVICE

(71) Applicant: Oki Electric Industry Co., Ltd., Tokyo (JP)

(72) Inventor: Hideki Kobori, Tokyo (JP)

(73) Assignee: OKI ELECTRIC INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/407,803

(22) PCT Filed: May 28, 2013

(86) PCT No.: PCT/JP2013/064781
§ 371 (c)(1),
(2) Date: Dec. 12, 2014

(87) PCT Pub. No.: WO2014/010321
PCT Pub. Date: Jan. 16, 2014

(65) Prior Publication Data
US 2015/0185863 A1    Jul. 2, 2015

(30) Foreign Application Priority Data
Jul. 9, 2012    (JP) ................................. 2012-153411

(51) Int. Cl.
| | |
|---|---|
| G06F 21/83 | (2013.01) |
| G06F 3/023 | (2006.01) |
| G06F 21/70 | (2013.01) |
| G06F 21/82 | (2013.01) |
| G06F 21/00 | (2013.01) |
| G06F 3/02  | (2006.01) |
| G06F 21/31 | (2013.01) |
| G06Q 20/10 | (2012.01) |
| G07F 19/00 | (2006.01) |
| G07F 7/10  | (2006.01) |

(52) U.S. Cl.
CPC .............. *G06F 3/023* (2013.01); *G06F 3/0219* (2013.01); *G06F 21/00* (2013.01); *G06F 21/31* (2013.01); *G06F 21/70* (2013.01); *G06F 21/82* (2013.01); *G06F 21/83* (2013.01); *G06Q 20/1085* (2013.01); *G07F 7/1033* (2013.01); *G07F 19/20* (2013.01); *G07F 19/201* (2013.01)

(58) Field of Classification Search
CPC ......... G06F 21/00; G06F 21/70; G06F 21/82; G06F 21/83
See application file for complete search history.

(56) References Cited

U.S. PATENT DOCUMENTS

| | | | | |
|---|---|---|---|---|
| 7,362,973 | B1 * | 4/2008 | Dickson .................. | G06F 21/83 340/540 |
| 7,899,325 | B2 * | 3/2011 | Dickson .................. | G06F 21/83 398/40 |
| 8,015,593 | B2 * | 9/2011 | Dickson .................. | G06F 21/83 340/540 |
| 8,750,705 | B2 * | 6/2014 | Dickson .................. | G06F 21/83 340/540 |
| 2008/0072331 | A1 * | 3/2008 | Dickson .................. | G06F 21/83 726/26 |
| 2012/0212319 | A1 * | 8/2012 | Ling ...................... | G06F 1/3203 340/3.1 |

FOREIGN PATENT DOCUMENTS

| | | |
|---|---|---|
| JP | H03-104223 U | 10/1991 |
| JP | H10-40439 A | 2/1998 |
| JP | 2011-100383 A | 5/2011 |

OTHER PUBLICATIONS

Keaton Mowery et al., "Heat of the Moment: Characterizing the Efficacy of Thermal Camera-Based Attacks", Proceeding WOOT'11, Proceedings of the 5th USENIX conference on Offensive technologies, 2011, pp. 1-8.

* cited by examiner

*Primary Examiner* — Andrew Bee
(74) *Attorney, Agent, or Firm* — Rabin & Berdo, P.C.

(57) ABSTRACT

An entry device is provided with a plural number of operation keys and a temperature changing unit. The operation keys can be operated by pressing by a fingertip of a hand touching respective operation surfaces thereof, and are used for entry of an authentication character string. When the authentication character string is to be entered, the temperature changing unit changes temperatures of the operation surfaces of the plural operation keys to be substantially equal.

15 Claims, 23 Drawing Sheets

(A) SECOND TEMPERATURE CHANGE PROCESSING ROUTINE (A) SECOND TRANSACTION GUIDANCE PROCESSING ROUTINE (B) THIRD TEMPERATURE CHANGE PROCESSING ROUTINE (A) SECOND TRANSACTION GUIDANCE PROCESSING ROUTINE

ENTRY DEVICE AND PAPER SHEETS HANDLING DEVICE

TECHNICAL FIELD

The present invention relates to an entry device and to a paper sheets handling device, and can be excellently applied to, for example, an automatic teller machine (ATM) equipped with an entry section that includes plural operation keys that can be operated by pressing for the entry of an authentication character string.

BACKGROUND ART

Heretofore, customers using ATMs of this type have been assigned, for personal identification, character strings for authentication that are composed of a predetermined number of digits (hereinafter referred to as "PIN numbers").

At the time of a withdrawal, an ATM prompts a customer to press operation surfaces of operation keys of an entry section in sequence to enter a PIN number, by touching the fingertips of their hand against the operation surfaces of the operation keys. When the customer has been authenticated in accordance with the entered PIN number, the customer withdraws cash.

However, if a PIN number used for the authentication of a customer is illegitimately acquired by a third party, the third party may misuse the PIN number for crimes such as posing as the customer and dishonestly taking out cash.

Recently, a variety of techniques have been identified by which, when a customer is using an ATM and entering their PIN number in order to withdraw cash, a third party is surreptitiously trying to illegitimately acquire the customer's PIN number.

Previously, therefore, to counter these techniques for the illegitimate acquisition of PIN numbers, some ATMs of this type have been provided with structures that may prevent the illegitimate acquisition of PIN numbers.

The techniques for illegitimate acquisition of PIN numbers that have so far been identified include, for example, attaching a fake entry section so as to cover the entry section of an ATM, the fake entry section being formed with a similar external appearance and arrangement of operation keys to the ATM's entry section. Thus, a customer is made to think that the fake entry section is the ATM's entry section and operate the fake entry section, and the PIN number may be illegitimately acquired in this manner.

An ATM that is structured to counter this technique for the illegitimate acquisition of PIN numbers focuses on the fact of the entry section being covered over by the fake entry section. Before a PIN number is entered at the time of a withdrawal, this ATM illuminates a predetermined operation key of the entry section and prompts the customer to press the illuminated operation key.

That is, the ATM prompts the customer to identify the illuminated operation key and, if the entry section is not covered by a fake entry section, the illuminated operation key can be pressed in accordance with this instruction.

However, if the entry section of the ATM is covered over by a fake entry section, the customer cannot identify the illuminated operation key and cannot press the illuminated operation key in accordance with the instruction.

Hence, the ATM with this structure prompts the customer to enter their PIN number at the time of a withdrawal only when the customer has pressed the illuminated operation key. If the operation key is not pressed, the ATM instructs the customer not to enter their PIN number.

An ATM with this structure prevents a customer's PIN number from being illegitimately acquired even if a fake entry section has been attached so as to cover the entry section (for example, see Japanese Patent Application Laid-Open (JP-A) No. 2011-100383 (page 6, page 7 and FIG. 6)).

Meanwhile, in recent years it has been reported, by a research team led by Keaton Mowery at the University of California in the USA, that when the fingertips of a hand touch the operation surfaces of operation keys, temperatures of the operation surfaces are changed by the touch of the fingertips. Therefore, when a customer has pressed plural operation keys and entered their PIN number, if the temperatures of the operation surfaces of the plural operation keys are sensed using thermography, as illustrated in FIG. 23, the operation keys that have been pressed and the order of pressing operations may be analyzed from the sensing results, so the PIN number may be identified (Keaton Mowery, Sarah Meiklejohn, Stefan Savage; "Heat of the Moment: Characterizing the Efficacy of Thermal Camera-Based Attacks": Internet URL: http://static.usenix.org/events/woot11/tech/final_files/Mowery.pdf).

That is, using thermography to sense temperatures of the operation surfaces of plural operation keys at an ATM when the plural operation keys have been pressed by a customer to enter a PIN number has been reported as being a feasible new technique for a third party to illegitimately acquire the customer's PIN number.

SUMMARY OF INVENTION

Technical Problem

In spite of the report by the research team led by Keaton Mowery of the University of California, there is as yet no ATM that anticipates cases of third parties using thermography to illegitimately acquire PIN numbers and that is configured to prevent this illegitimate acquisition of PIN numbers.

The present invention provides an entry device and a paper sheets handling device that may prevent the illegitimate acquisition of character strings for authentication by the use of thermography.

Solution to Problem

In the present invention, provided are: a plural number of operation keys that can be operated by pressing by a fingertip of a hand touching respective operation surfaces of the operation keys, to be used for entry of an authentication character string; and a temperature changing unit that changes temperatures of the operation surfaces of the plural operation keys to be substantially equal.

With the present invention, when the operation surfaces of the plural operation keys for the entry of an authentication character string are touched with a fingertip of a hand and pressed, even if the temperatures of the operation surfaces of the plural operation keys are sensed by thermography, it may not be possible to identify the operation keys that have been pressed from the temperatures of the operation surfaces.

Advantageous Effects of Invention

According to the present invention, the plural operation keys for the entry of an authentication character string and the temperature changing unit are provided. The respective operation surfaces of the plural operation keys may be touched by a fingertip of a hand and pressed, and the temperature changing unit changes the temperatures of the operation surfaces of the plural operation keys to make the temperatures substantially equal. Thus, when the operation surfaces of the plural operation keys for the entry of an authentication character string are touched with a fingertip of a hand and pressed, even if the temperatures of the operation surfaces of the plural operation keys are sensed by thermography, it may not be possible to identify the operation keys that have been pressed from the temperatures of the operation surfaces. Therefore, an entry device and a paper sheets handling device that may prevent the illegitimate acquisition of character strings for authentication by the use of thermography may be realized.

DESCRIPTION OF EMBODIMENTS

Figure 1:
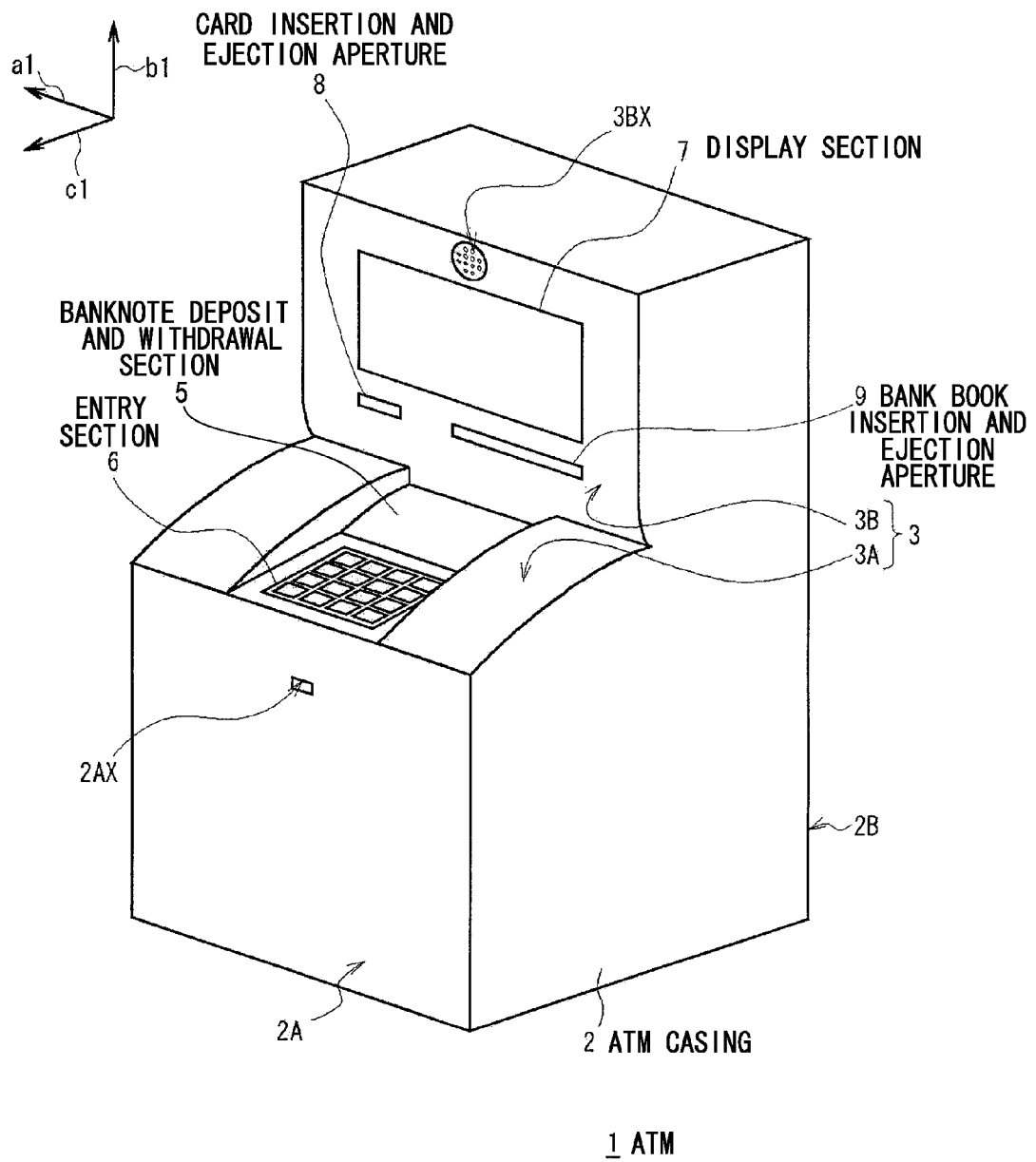
FIG. 1 is a schematic perspective view showing external structures of an ATM in accordance with a first embodiment.

Herebelow, excellent modes for embodying the invention (hereinafter referred to as embodiments) are described using the attached drawings. The descriptions are given in the following sequence.
(1) First Embodiment
(2) Second Embodiment
(3) Alternative Embodiments (1) First Embodiment (1-1) External Structures of ATM In FIG. 1, the reference symbol 1 indicates the external structure of the whole of an ATM to which the present invention is applied and that, for example, is installed indoors and handles cash in the form of banknotes. This ATM 1 includes a substantially box-shaped casing 2 (hereinafter referred to as "the ATM casing").

In the following descriptions, a direction indicated by arrow a1 in the drawings, to the left of the ATM 1 when looking toward a front face 2A of the ATM casing 2, is referred to as the ATM left direction, and the opposite direction to the ATM left direction is referred to as the ATM right direction.

In the following descriptions, where it is not particularly necessary to distinguish between the ATM left direction and the ATM right direction, these are collectively referred to as the ATM left-and-right direction.

Further, in the following descriptions, a direction indicated by arrow b1 in the drawings, upward of the ATM 1 when looking toward the front face 2A of the ATM casing 2, is referred to as the ATM upward direction, and the opposite direction to the ATM upward direction is referred to as the ATM downward direction.

In the following descriptions, where it is not particularly necessary to distinguish between the ATM upward direction and the ATM downward direction, these are collectively referred to as the ATM up-and-down direction.

Further, in the following descriptions, a direction indicated by arrow c1 in the drawings, forward from the ATM 1 when looking toward the front face 2A of the ATM casing 2, is referred to as the ATM forward direction, and the opposite direction to the ATM forward direction is referred to as the ATM rearward direction.

In the following descriptions, where it is not particularly necessary to distinguish between the ATM forward direction and the ATM rearward direction, these are collectively referred to as the ATM front-and-rear direction.

A front panel 3 is provided at an upper-front end portion of the ATM casing 2. The front panel 3 is formed in a substantial "L" shape that is recessed toward the side of a rear face 2B from the front face 2A.

An upward facing panel 3A of the front panel 3 is oriented to the ATM upward direction. A banknote deposit and withdrawal section 5 is provided at, for example, a central rear end portion of the upward facing panel 3A. The banknote deposit and withdrawal section 5 includes an openable and closeable shutter.

An entry section 6, which includes plural operation keys that can be operated by pressing, is disposed at, for example, a central front end portion of the upward facing panel 3A of the front panel 3. Operation surfaces of the plural operation keys are each oriented to the ATM upward direction.

The entry section 6 is, for example, a PIN pad formed in compliance with PCI (Payment Card Industry) standards. Various kinds of information may be entered by pressing operations of the operation keys thereof, such as numbers, confirmations and corrections of entered details, cancellations of transactions, and so forth.

A forward facing panel 3B of the front panel 3 is oriented to the ATM forward direction. A display section 7 such as a liquid crystal display is disposed at, for example, a central portion of the forward facing panel 3B. The display section 7 is for suitably switching between and displaying transaction procedure guidance screens with various contents.

A card insertion and ejection aperture 8 is provided in the forward facing panel 3B of the front panel 3, for example, below and to the left of the display section 7. The card insertion and ejection aperture 8 is for the insertion and ejection of various kinds of cards at times of transactions, such as cash cards, credit cards and the like.

A card processing section (not shown in the drawings) is provided inside an upper end portion of the ATM casing 2. The card processing section reads, for example, a pre-registered customer account number from a card inserted in the card insertion and ejection aperture 8.

A bank book insertion and ejection aperture 9 is provided in the forward facing panel 3B of the front panel 3, for example, below and to the right of the display section 7. The bank book insertion and ejection aperture 9 is for the insertion of bank books at times of transactions and for the ejection of bank books and transaction statements.

A printing processing section (not shown in the drawings) is provided inside the upper end portion of the ATM casing 2. The printing processing section prints details of transactions and the like in a bank book inserted in the bank book insertion and ejection aperture 9 or on transaction statements that have been loaded beforehand.

Plural small hole portions 3BX are cut in a predetermined pattern in the forward facing panel 3B of the front panel 3, for example, above the display section 7.

A speaker is disposed close to the front of the interior of the upper end portion of the ATM casing 2. The speaker opposes the plural hole portions 3BX of the forward facing panel 3B.

Thus, when a customer is facing the entry section 6 of the ATM 1 in order to perform a transaction, the ATM 1 may output voice messages emitted from the speaker through the plural hole portions 3BX of the forward facing panel 3B to the front face 2A side of the ATM 1, and the customer may hear the voice messages.

In addition, the ATM casing 2 is provided with a window portion 2AX at a predetermined position of a central portion of the front face 2A (specifically, at the lower side of the entry section 6).

A proximity sensor is disposed close to the front of the interior of a lower end portion of the ATM casing 2, opposing the window portion 2AX. The proximity sensor is for detecting whether or not a customer is close to the ATM 1 and facing the entry section 6 (that is, whether a customer has approached to within a predetermined distance from the front face 2A).

Thus, via the proximity sensor, the ATM 1 may detect whether a customer has approached the ATM 1 and is facing the entry section 6, and whether a customer has moved away from in front of the ATM 1.

The ATM 1 is connected, via a predetermined network which is not shown in the drawings, to an authentication device, not shown in the drawings, that is disposed in, for example, a financial institution.

The authentication device memorizes and stores customer information for plural customers who have opened accounts to perform transactions, the customer information being constituted of, for example, the name of each customer, an account number, and an authentication character string formed of a predetermined number of digits that is assigned to the customer for personal identification (hereinafter referred to as a "PIN number").

When a customer approaches the ATM 1 with the present structure and faces the entry section 6, the ATM 1 displays a transaction procedure guidance screen at the display section 7. The ATM 1 successively replaces transaction procedure guidance screens displayed at the display section 7 in accordance with actions of the customer (insertion of a card, pressing operations of the plural operation keys of the entry section 6, and so forth).

In this manner, the ATM 1 guides the customer through the procedure of a desired transaction (a withdrawal or deposit of banknotes) with the transaction procedure guidance screens that are successively replaced and displayed at the display section 7.

Thus, in accordance with the guidance through a procedure, the ATM 1 guides the customer to insert a card and/or a bank book in the card insertion and ejection aperture 8 and/or the bank book insertion and ejection aperture 9 and, if appropriate, to enter their PIN number via the entry section 6, and the customer is authenticated at the authentication device in accordance with the PIN number.

The ATM 1 feeds withdrawal banknotes out to the customer through the banknote deposit and withdrawal section 5 or takes deposit banknotes in at the banknote deposit and withdrawal section 5, after which the customer receives their card and/or bank book or a transaction statement through the card insertion and ejection aperture 8 and/or the bank book insertion and ejection aperture 9. Thus, the ATM 1 may implement the transaction for the withdrawal or deposit of banknotes that is desired by the customer.

(1-2) Internal Structures of the ATM

Figure 2:
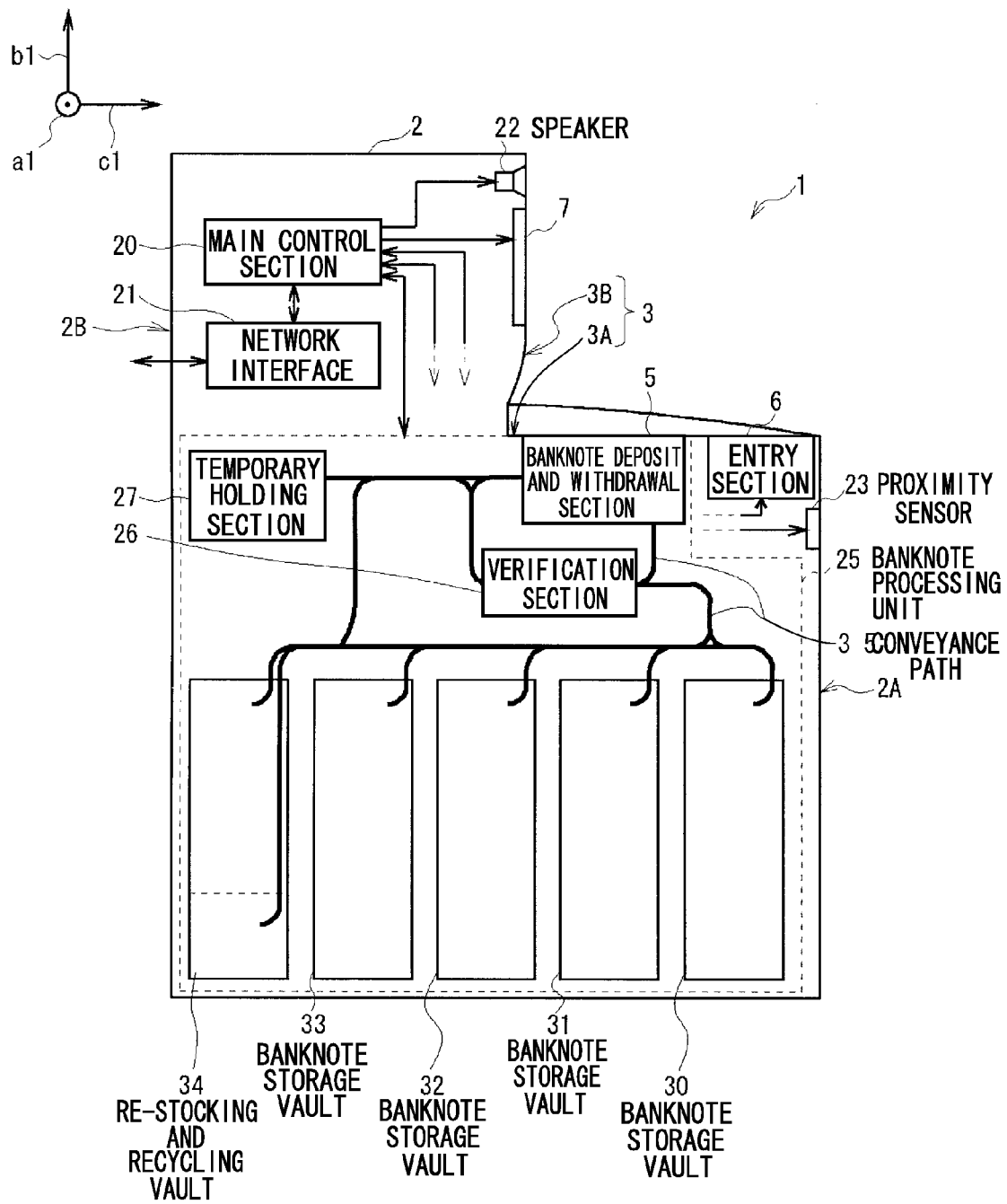
FIG. 2 is a schematic side view showing internal structures of the ATM in accordance with the first embodiment.

Now, internal structures of the ATM 1 are described using FIG. 2. As shown in FIG. 2, a main control section 20 is accommodated inside the ATM casing 2 of the ATM 1. The main control section 20 oversees and controls the ATM 1 as a whole and is structured by, for example, a microcomputer that executes various processes.

The card processing section (not shown in the drawings) and printing processing section (not shown in the drawings) as described above are also accommodated in the ATM casing 2, and a network interface 21 for communicating with the above-mentioned authentication device (not shown in the drawings) is also accommodated inside the ATM casing 2.

The entry section 6 is disposed inside the ATM casing 2 at the central front end portion of the upward facing panel 3A as described above, with the operation surfaces of the plural operation keys exposed to the exterior. The display section 7 is disposed inside the ATM casing 2 at the central portion of the forward facing panel 3B, with the display screen thereof exposed to the exterior.

A speaker 22 is also accommodated inside the ATM casing 2, close to the front of the upper end portion as described above. A proximity sensor 23, mentioned above, is also accommodated inside the ATM casing 2, close to the front of the lower end portion. The proximity sensor 23 is structured with, for example, an infrared radiation sensor that includes a light-emitting element and a light detection element for infrared radiation.

In this embodiment, the proximity sensor 23 is structured so as to output infrared radiation emitted from the light-emitting element through the window portion 2AX of the front face 2A to the front side of the ATM casing 2, and to detect reflected infrared radiation with the light detection element only when the infrared radiation is reflected by the body of an approaching customer within the predetermined distance from the front face 2A.

For example, the level of a sensor output signal from the proximity sensor 23 rises to a logical "high" level when the infrared radiation emitted from the light-emitting element is being reflected by the body of a customer close to the front face 2A of the ATM casing 2 and is being detected by the light detection element.

In this example, the level of the sensor output signal from the proximity sensor 23 falls to, for example, a logical "low" level when none of the infrared light emitted from the light-emitting element is being reflected and so is not being detected by the light detection element.

Thus, from the level of the sensor output signal, the proximity sensor 23 may detect whether a customer has approached the ATM 1 and is facing the entry section 6, and whether a customer has moved away from in front of the ATM 1.

Furthermore, a banknote processing unit 25 that processes banknotes during withdrawal processing, deposit processing and the like is accommodated at the lower end portion of the interior of the ATM casing 2.

Each of the network interface 21, the entry section 6, the display section 7, the speaker 22, the proximity sensor 23, the card processing section, the printing processing section and the banknote processing unit 25 is connected to the main control section 20.

The banknote deposit and withdrawal section 5 is disposed in the banknote processing unit 25, opposing the upward facing panel 3A. A verification section 26 is disposed in the banknote processing unit 25, diagonally below the rear of the banknote deposit and withdrawal section 5. A temporary holding section 27 is also disposed in the banknote processing unit 25, at the rear side of the banknote deposit and withdrawal section 5 and the verification section 26.

A plural number of banknote storage vaults 30, 31, 32 and 33 are also disposed in the banknote processing unit 25, at the lower side of the verification section 26 and the temporary holding section 27. The banknote storage vaults 30 to 33 are for storing plural banknotes for withdrawals and deposits, separated by denomination (that is, each stores only banknotes of one particular denomination).

A re-stocking and recycling vault 34 is removably mounted in the banknote processing unit 25 at, for example, the rear side of the plural banknote storage vaults 30 to 33. The re-stocking and recycling vault 34 is for re-stocking banknotes into the plural banknote storage vaults 30 to 33 and for recovering banknotes from the plural banknote storage vaults 30 to 33.

A banknote storage section is provided in the re-stocking and recycling vault 34 that stores plural banknotes for re-stocking and recycling to and from the plural banknote storage vaults 30 to 33, and another banknote storage section is provided in the re-stocking and recycling vault 34 for storing improper banknotes such as damaged banknotes, folded banknotes and the like.

In the descriptions below, improper banknotes such as damaged banknotes, folded banknotes and the like are referred to as "reject banknotes" where appropriate to specifically distinguish them from proper banknotes.

In the descriptions below, the banknote storage section in the re-stocking and recycling vault 34 that stores the reject banknotes is specifically referred to as "the reject storage section".

A banknote conveyance section is disposed in the banknote processing unit 25, between the banknote deposit and withdrawal section 5, the verification section 26, the temporary holding section 27, the plural banknote storage vaults 30 to 33 and the re-stocking and recycling vault 34. The banknote conveyance section includes plural kinds of conveyance path formation components such as conveyance guides, rollers and the like.

With the plural kinds of conveyance path formation components, the banknote conveyance section forms a conveyance path 35 for switching conveyance destinations as appropriate and conveying banknotes between the banknote deposit and withdrawal section 5, the verification section 26, the temporary holding section 27, the plural banknote storage vaults 30 to 33 and the re-stocking and recycling vault 34.

According to the present structure, the main control section 20 executes first transaction guidance processing in accordance with a first transaction guidance processing program that is memorized in advance in an internal memory. The first transaction guidance processing controls the network interface 21, the entry section 6, the display section 7, the speaker 22 and the proximity sensor 23, and guides customers through the procedures of transactions.

During the execution of the first transaction guidance processing, when a withdrawal or a deposit is requested as a desired transaction by a customer, the main control section 20 controls the banknote processing unit 25 in accordance with a withdrawal processing program or a deposit processing program, which are memorized in advance in the internal memory, and executes a banknote withdrawal process or deposit process.

When a start-up is commanded by operation staff from outside the ATM 1 in association with, for example, the start of transaction operations, the end of maintenance or the like, the main control section 20 starts up in response and starts the first transaction guidance processing in accordance with the first transaction guidance processing program.

After the first transaction guidance processing has started, the main control section 20 goes into a standby mode, waiting for a customer, and operates the proximity sensor 23 while keeping the display section 7 turned off.

Hence, on the basis of the level of the sensor output signal provided from the proximity sensor 23, the main control section 20 detects whether or not a customer has approached the ATM 1 and is facing the entry section 6.

For as long as the main control section 20 detects, via the proximity sensor 23, that no customer has approached the ATM 1, the main control section 20 waits for the arrival of a customer (that is, for a customer to come close to the ATM 1 and face the entry section 6) with the display section 7 turned off.

From this state, when the main control section 20 detects, via the proximity sensor 23, that a customer has come close to the ATM 1 and is facing the entry section 6, the main control section 20 switches from the standby mode to a guidance mode.

When the main control section 20 switches from the standby mode to the guidance mode thus, arrival voice message data, which has been memorized in advance in the internal memory, is sent to the speaker 22.

On the basis of the arrival voice message data, the main control section 20 outputs an arrival voice message such as, for example, "Hello" via the speaker 22, informing the customer that the ATM 1 has started to respond to them.

Then, from among plural sets of transaction procedure guidance screen data that have been memorized in advance in the internal memory, the main control section 20 sends to the display section 7, for example, transaction procedure guidance screen data of, for example, a transaction procedure guidance screen for prompting the insertion of a card and a bank book.

In the descriptions below, the transaction procedure guidance screen for prompting the insertion of a card and a bank book is referred to as "the card insertion guidance screen", and the transaction procedure guidance screen data of the card insertion guidance screen is referred to as "the card insertion guidance screen data".

Thus, the main control section 20 displays the card insertion guidance screen at the display section 7 in accordance with the card insertion guidance screen data, including a guidance text such as, for example, "Please insert your card. If you have your bank book, please insert your bank book too.", prompting the customer to insert their card and bank book.

Hence, for example, when at least the card is inserted into the card insertion and ejection aperture 8 by the customer, the main control section 20 reads the account number of the customer from the card with the card processing section.

The main control section 20 then sends to the display section 7, to replace the present card insertion guidance screen data, from among the plural sets of transaction procedure guidance screen data memorized in advance in the internal memory, transaction procedure guidance screen data of, for example, a transaction procedure guidance screen for prompting the selection of a transaction type.

In the descriptions below, the transaction procedure guidance screen for prompting the selection of a transaction type is referred to as "the type selection guidance screen", and the transaction procedure guidance screen data of the type selection guidance screen is referred to as "the type selection guidance screen data".

Thus, in place of the card insertion guidance screen, the main control section 20 displays the type selection guidance screen at the display section 7 in accordance with the type selection guidance screen data, including a guidance text such as, for example, "Please select a transaction: press [1] for a withdrawal or press [2] for a deposit.", prompting the customer to select a transaction type.

Then, if an operation key of the entry section 6 is pressed by the customer to select a withdrawal of banknotes as the transaction type, the main control section 20 sends to the display section 7, to replace the type selection guidance screen data, from among the plural sets of transaction procedure guidance screen data memorized in advance in the internal memory, transaction procedure guidance screen data of, for example, a transaction procedure guidance screen for prompting the entry of a PIN number.

In the descriptions below, the transaction procedure guidance screen for prompting the entry of a PIN number is referred to as "the PIN number entry guidance screen", and the transaction procedure guidance screen data of the PIN number entry guidance screen is referred to as "the PIN number entry guidance screen data".

Thus, in place of the type selection guidance screen, the main control section 20 displays the PIN number entry guidance screen at the display section 7 in accordance with the PIN number entry guidance screen data, including a guidance text such as, for example, "Please use the number keys to enter your PIN number.", prompting the customer to enter their PIN number.

Hence, when the plural operation keys of the entry section 6 are pressed in sequence by the customer touching the operation surfaces with the fingertips of their hand, to enter a PIN number with a predetermined number of digits, the main control section 20 packages the PIN number with the account number that has already been read from the card and generates identification processing request data for requesting the execution of identification processing for the customer.

The main control section 20 then sends the identification processing request data through the network from the network interface 21 to the authentication device to request the execution of the identification processing for the customer.

Correspondingly, the authentication device receives the identification processing request data sent from the ATM 1, and extracts the account number and PIN number from the identification processing request data.

From among plural sets of customer information, the authentication device identifies the account number extracted from the identification processing request data and customer information containing the same account number (that is, customer information of the customer currently requesting a transaction at the ATM 1).

The authentication device executes the identification processing on the basis of a PIN number contained in the identified customer information and the PIN number extracted from the identification processing request data, comparing the PIN number contained in the identified customer information with the PIN number extracted from the identification processing request data.

Hence, if the PIN number contained in the identified customer information matches the PIN number extracted from the identification processing request data, the authentication device positively identifies the customer requesting the transaction at the ATM 1, and reports to the ATM 1 via the network that the customer has been identified.

Here, if the PIN number contained in the identified customer information does not match the PIN number extracted from the identification processing request data—because, for example, the PIN number was incorrectly entered by the customer—the authentication device reports to the ATM 1 via the network that the customer requesting the transaction at the ATM 1 could not be identified.

If the main control section 20 is informed by the authentication device that the customer could not be identified, the main control section 20 sends to the display section 7, to replace the PIN number entry guidance screen data, from among the plural sets of transaction procedure guidance screen data memorized in advance in the internal memory, transaction procedure guidance screen data of, for example, a transaction procedure guidance screen for prompting the re-entry of the PIN number.

In the descriptions below, the transaction procedure guidance screen for prompting the re-entry of the PIN number is referred to as "the PIN number re-entry guidance screen", and the transaction procedure guidance screen data of the PIN number re-entry guidance screen is referred to as "the PIN number re-entry guidance screen data".

Thus, in place of the PIN number entry guidance screen, the main control section 20 displays the PIN number re-entry guidance screen at the display section 7 in accordance with the PIN number re-entry guidance screen data, including a guidance text such as, for example, "Please use the number keys to re-enter your PIN number.", prompting the customer to re-enter the PIN number.

Hence, when the operation keys of the entry section 6 are pressed by the customer to re-enter the PIN number with the predetermined number of digits, the main control section 20 packages the re-entered PIN number with the account number and generates identification processing repeat request data to request a repeat of the execution of the identification processing for the customer.

The main control section 20 then sends the identification processing repeat request data through the network from the network interface 21 to the authentication device to request a repeat of the execution of the identification processing for the customer.

Correspondingly, the authentication device receives the identification processing repeat request data sent from the ATM 1, and extracts the account number and PIN number from the identification processing repeat request data.

The authentication device re-executes the identification processing for the customer in the same manner as described above, and if the customer is positively identified, reports this fact to the ATM 1 via the network.

Accordingly, when the main control section 20 is informed by the authentication device that the customer has been positively identified, the main control section 20 sends to the display section 7, to replace the PIN number entry guidance screen data (or the PIN number re-entry guidance screen data), from among the plural sets of transaction procedure guidance screen data memorized in advance in the internal memory, transaction procedure guidance screen data of, for example, a transaction procedure guidance screen for prompting the specification of a withdrawal amount.

In the descriptions below, the transaction procedure guidance screen for prompting the specification of a withdrawal amount is referred to as "the amount specification guidance screen", and the transaction procedure guidance screen data of the amount specification guidance screen is referred to as "the amount specification guidance screen data".

Thus, in place of the PIN number entry guidance screen (or the PIN number re-entry guidance screen), the main control section 20 displays the amount specification guidance screen at the display section 7 in accordance with the amount specification guidance screen data, including a guidance text such as, for example, "Specify the amount to withdraw with the number keys.", prompting the customer to specify the amount of the withdrawal.

When the plural operation keys of the entry section 6 have been pressed by the customer to specify the withdrawal amount, the main control section 20 sends to the display section 7, to replace the amount entry guidance screen data, from among the plural sets of transaction procedure guidance screen data memorized in advance in the internal memory, transaction procedure guidance screen data of, for example, a transaction procedure guidance screen for reporting that the withdrawal of banknotes is being processed.

In the descriptions below, the transaction procedure guidance screen for reporting that the withdrawal of banknotes is being processed is referred to as "the ongoing withdrawal process guidance screen", and the transaction procedure guidance screen data of the ongoing withdrawal process guidance screen is referred to as "the ongoing withdrawal process guidance screen data".

Thus, in place of the amount specification guidance screen, the main control section 20 displays the ongoing withdrawal process guidance screen at the display section 7 in accordance with the ongoing withdrawal process guidance screen data, including a guidance text such as, for example, "Your cash is being prepared. Please wait.", notifying the customer to wait in front of the ATM 1 until the withdrawal banknotes can be prepared.

Correspondingly, in response to the specification by the customer of the amount to be withdrawn, the main control section 20 controls the banknote processing unit 25 and starts withdrawal processing in accordance with a withdrawal processing program, while continuing to display the ongoing withdrawal process guidance screen at the display section 7.

At this time, when the main control section 20 starts the withdrawal processing, banknotes in an amount corresponding to the amount specified by the customer are fed out one by one from inside the banknote storage vaults 30 to 33 and conveyed along the conveyance path 35 to the verification section 26, and denominations, conditions and the like of the banknotes are verified at the verification section 26.

Hence, the main control section 20 conveys banknotes that have been verified as proper and fed out from the verification section 26 along the conveyance path 35 to the banknote deposit and withdrawal section 5.

On the other hand, the main control section 20 identifies a banknote that has been verified as improper and fed out from the verification section 26 as a reject banknote, conveys this banknote along the conveyance path 35 to the re-stocking and recycling vault 34, stores the banknote in the reject storage section, and does not subsequently use this banknote in the withdrawal processing.

When the main control section 20 has completed the conveyance of banknotes in an amount corresponding to the amount specified by the customer to the banknote deposit and withdrawal section 5, the main control section 20, for example, prints details of the transaction and the like in the bank book or on a transaction statement with the printing processing section.

Thereafter, the main control section 20 opens the shutter of the banknote deposit and withdrawal section 5, ejects the card from the card insertion and ejection aperture 8, and ejects the bank book or transaction statement on which the transaction details have been printed from the bank book insertion and ejection aperture 9.

Then the main control section 20 sends to the display section 7, to replace the ongoing withdrawal process guidance screen data, from among the plural sets of transaction procedure guidance screen data memorized in advance in the internal memory, transaction procedure guidance screen data of, for example, a transaction procedure guidance screen for prompting the customer to take the banknotes.

In the descriptions below, the transaction procedure guidance screen for prompting the customer to take the banknotes is referred to as "the banknote acceptance guidance screen", and the transaction procedure guidance screen data of the banknote acceptance guidance screen is referred to as "the banknote acceptance guidance screen data".

Thus, in place of the ongoing withdrawal process guidance screen, the main control section 20 displays the banknote acceptance guidance screen at the display section 7 in accordance with the banknote acceptance guidance screen data, including a guidance text such as, for example, "Please take your cash from the banknote delivery aperture, and please take your card and bank book."

Thus, the main control section 20 feeds the banknotes out through the banknote deposit and withdrawal section 5 to the customer in an amount corresponding to the specified amount and allows the customer to take the banknotes, and the main control section 20 brings out the card and/or the bank book or transaction statement through the card insertion and ejection aperture 8 and/or the bank book insertion and ejection aperture 9 and delivers the same to the customer.

When the withdrawal banknotes have been taken from the banknote deposit and withdrawal section 5 by the customer, the main control section 20 closes the shutter of the banknote deposit and withdrawal section 5 and ends the withdrawal processing.

Thereafter, when the main control section 20 detects via the proximity sensor 23 that the customer has moved away from in front of the ATM 1, the main control section 20 turns off the display section 7 and switches from the guidance mode to the standby mode.

Thus, if a withdrawal of banknotes is selected as the desired transaction by the customer standing in front of the ATM 1 during the execution of the first transaction guidance processing, the main control section 20 may execute the banknote withdrawal processing while executing the first transaction guidance processing and deliver banknotes in the specified amount to the customer.

Alternatively, when the main control section 20 displays the type selection guidance screen at the display section 7 as described above, if an operation key of the entry section 6 is pressed by the customer to select a deposit of banknotes as the transaction type, the main control section 20 controls the banknote processing unit 25 and starts deposit processing in accordance with a deposit processing program. Accordingly, the main control section 20 opens the shutter of the banknote deposit and withdrawal section 5.

The main control section 20 sends to the display section 7, to replace the type selection guidance screen data, from among the plural sets of transaction procedure guidance screen data memorized in advance in the internal memory, transaction procedure guidance screen data of, for example, a transaction procedure guidance screen for prompting the insertion of banknotes to be deposited.

In the descriptions below, the transaction procedure guidance screen for prompting the insertion of deposit banknotes is referred to as "the banknote insertion guidance screen", and the transaction procedure guidance screen data of the banknote insertion guidance screen is referred to as "the banknote insertion guidance screen data".

Thus, in place of the type selection guidance screen, the main control section 20 displays the banknote insertion guidance screen at the display section 7 in accordance with the banknote insertion guidance screen data, including a guidance text such as, for example, "Please insert banknotes to be deposited in the banknote insertion aperture and then press the [ENTER] key.", prompting the customer to insert the deposit banknotes in the banknote deposit and withdrawal section 5.

When deposit banknotes have been inserted in the banknote deposit and withdrawal section 5 by the customer and then an operation key of the entry section 6 has been pressed to report that the insertion of banknotes is complete, the main control section 20 closes the shutter of the banknote deposit and withdrawal section 5.

Then the main control section 20 sends to the display section 7, to replace the banknote insertion guidance screen data, from among the plural sets of transaction procedure guidance screen data memorized in advance in the internal memory, transaction procedure guidance screen data of, for example, a transaction procedure guidance screen for reporting that the banknotes are being counted.

In the descriptions below, the transaction procedure guidance screen for reporting that the banknotes are being counted is referred to as "the ongoing counting guidance screen", and the transaction procedure guidance screen data of the ongoing counting guidance screen is referred to as "the ongoing counting guidance screen data".

Thus, in place of the banknote insertion guidance screen, the main control section 20 displays the ongoing counting guidance screen at the display section 7 in accordance with the ongoing counting guidance screen data, including a guidance text such as, for example, "Your cash is being counted. Please wait.", notifying the customer to wait in front of the ATM 1 until the counting of the banknotes is completed.

While continuing to display the ongoing counting guidance screen at the display section 7, the main control section 20 feeds out the inserted single banknote or plural banknotes from the banknote deposit and withdrawal section 5 one at a time and conveys the banknotes along the conveyance path 35 to the verification section 26. Denominations, conditions and the like of the banknotes are verified at the verification section 26.

Hence, the main control section 20 conveys banknotes that have been verified as proper and fed out from the verification section 26 along the conveyance path 35 to the temporary holding section 27, and temporarily holds the banknotes in the temporary holding section 27. Thus, the deposit of the banknotes is suspended.

The main control section 20 identifies a banknote that has been verified as improper due to being damaged, folded or the like and fed out from the verification section 26 as a reject banknote, and conveys this banknote along the conveyance path 35 to the banknote deposit and withdrawal section 5.

While, for example, the deposit banknotes that have been inserted at the banknote deposit and withdrawal section 5 are being verified at the verification section 26 in this manner, the main control section 20 counts up a total value of the banknotes verified as proper by the verification section 26 to serve as an amount of the deposit.

When the deposit banknotes that have been inserted in the banknote deposit and withdrawal section 5 have all been verified at the verification section 26, if there is/are a reject banknote/banknotes among the verified banknotes (that is, deposit banknotes that have not been counted but conveyed to the banknote deposit and withdrawal section 5 due to being improper), the main control section 20 opens the shutter of the banknote deposit and withdrawal section 5.

Then the main control section 20 sends to the display section 7, to replace the ongoing counting guidance screen data, from among the plural sets of transaction procedure guidance screen data memorized in advance in the internal memory, transaction procedure guidance screen data of, for example, a transaction procedure guidance screen for reporting the return of banknotes that could not be counted (i.e., the reject banknotes).

In the descriptions below, the transaction procedure guidance screen for reporting the return of banknotes that could not be counted is referred to as "the banknote return guidance screen", and the transaction procedure guidance screen data of the banknote return guidance screen is referred to as "the banknote return guidance screen data".

Thus, in place of the ongoing counting guidance screen, the main control section 20 displays the banknote return guidance screen at the display section 7 in accordance with the banknote return guidance screen data, including a guidance text such as, for example, "Banknotes that could not be counted are being returned. Please take them."

In this manner, the main control section 20 feeds out and returns banknotes that could not be counted (that is, a reject banknote/banknotes) through the banknote deposit and withdrawal section 5 to the customer, and subsequently closes the shutter of the banknote deposit and withdrawal section 5.

Alternatively, if all of the deposit banknotes that have been inserted into the banknote deposit and withdrawal section 5 have been verified and there are no reject banknotes among these verified banknotes, the main control section 20 generates transaction procedure guidance screen data of a transaction procedure guidance screen for presenting the counted value of the deposit (that is, the total value of the banknotes verified as being proper).

Then the main control section 20 sends to the display section 7, to replace the ongoing counting guidance screen data, the transaction procedure guidance screen data that has been generated to present the counted value of the deposit.

In the descriptions below, the transaction procedure guidance screen for presenting the counted value of a deposit is referred to as "the deposit value guidance screen", and the transaction procedure guidance screen data of the deposit value guidance screen is referred to as "the deposit value guidance screen data".

Thus, in place of the ongoing counting guidance screen, the main control section 20 displays the deposit value guidance screen at the display section 7 in accordance with the deposit value guidance screen data, including a guidance text such as, for example, "The value of the deposited cash is XX. To confirm this deposit, press the [ENTER] key. To cancel this deposit, press the [CANCEL] key.", thus presenting the value of the deposit to the customer to allow checking, and inquiring as to whether the banknotes of this value are to be deposited.

On the other hand, if there are reject banknotes among the deposit banknotes, the main control section 20 generates the deposit value guidance screen data not at the moment when the verification of the deposit banknotes is completed but, for example, when the uncounted banknotes (i.e., the reject banknotes) have been returned to the customer and the shutter of the banknote deposit and withdrawal section 5 has been closed.

Then the main control section 20 sends to the display section 7, to replace the banknote return guidance screen data, the deposit value guidance screen data.

Thus, in place of the banknote return guidance screen, the main control section 20 displays the deposit value guidance screen at the display section 7, presenting the value of the deposit to the customer to allow checking, and inquiring as to whether the banknotes of this value are to be deposited.

When the customer has checked the value of the deposit via the deposit value guidance screen and pressed an operation key of the entry section 6 to command the deposit of the banknotes, then, for example, the printing processing section prints details of the transaction and the like in the bank book or on a transaction statement.

Thereafter, the main control section 20 ejects the card from the card insertion and ejection aperture 8 and ejects the bank book or transaction statement on which the transaction details have been printed from the bank book insertion and ejection aperture 9.

Then the main control section 20 sends to the display section 7, to replace the deposit value guidance screen data, from among the plural sets of transaction procedure guidance screen data memorized in advance in the internal memory, transaction procedure guidance screen data of, for example, a transaction procedure guidance screen for reporting that the deposit of the banknotes is complete.

In the descriptions below, the transaction procedure guidance screen for reporting that the deposit of banknotes is complete is referred to as "the deposit completion guidance screen", and the transaction procedure guidance screen data of the deposit completion guidance screen is referred to as "the deposit completion guidance screen data".

Thus, in place of the deposit value guidance screen, the main control section 20 displays the deposit completion guidance screen at the display section 7 in accordance with the deposit completion guidance screen data, including a guidance text such as, for example, "The deposit has been completed. Please take your card and bank book."

Accordingly, the main control section 20 brings out the card and/or the bank book or transaction statement from the card insertion and ejection aperture 8 and/or the bank book insertion and ejection aperture 9 and delivers the same to the customer.

When the main control section 20 detects via the proximity sensor 23 that the customer has moved away from in front of the ATM 1, the main control section 20 turns off the display section 7 and switches from the guidance mode to the standby mode.

During this transaction, when the deposit of the banknotes is commanded by the customer, in parallel with the printing of details of the transaction and the like on the bank book or transaction statement and the display of the transaction procedure guidance screens, the main control section 20 feeds out the temporarily held banknotes (that is, the proper banknotes to be deposited) from the temporary holding section 27 one at a time and conveys the banknotes along the conveyance path 35 to the verification section 26. The denominations, conditions and the like of the banknotes are verified at the verification section 26 again.

The main control section 20 conveys banknotes that have been verified as proper and fed out from the verification section 26 along the conveyance path 35 to the banknote storage vaults 30 to 33 in accordance with the denominations of the banknotes, and stores the banknotes therein.

On the other hand, the main control section 20 identifies a banknote that has been verified as improper and fed out from the verification section 26 as a reject banknote, conveys this banknote along the conveyance path 35 to the re-stocking and recycling vault 34, and stores this banknote in the reject storage section.

Hence, when the main control section 20 has finished storing all of the banknotes that were temporarily held in the temporary holding section 27 (that is, the banknotes whose deposit was suspended) to the banknote storage vaults 30 to 33 or the reject storage section of the re-stocking and recycling vault 34, the main control section 20 ends the deposit processing.

When the main control section 20 has ended the deposit processing in this manner and detected that the customer has moved away from in front of the ATM 1, the main control section 20 switches from the guidance mode to the standby mode.

Alternatively, if the customer, having checked the value of the deposit via the deposit value guidance screen, presses an operation key of the entry section 6 to command the cancellation of the deposit, then the main control section 20 feeds out the temporarily held banknotes (that is, the banknotes whose deposit has been suspended) from the temporary holding section 27 one at a time, conveys the banknotes along the conveyance path 35 to the banknote deposit and withdrawal section 5, and opens the shutter of the banknote deposit and withdrawal section 5.

At this time, the main control section 20 also ejects the card and/or bank book from the card insertion and ejection aperture 8 and/or bank book insertion and ejection aperture 9, and the main control section 20 sends to the display section 7, to replace the deposit value guidance screen data, from among the plural sets of transaction procedure guidance screen data memorized in advance in the internal memory, transaction procedure guidance screen data of, for example, a transaction procedure guidance screen for reporting that the banknotes are being returned due to the cancellation of the deposit.

In the descriptions below, the transaction procedure guidance screen for reporting the return of banknotes due to the cancellation of a deposit is referred to as "the deposit cancellation guidance screen", and the transaction procedure guidance screen data of the deposit cancellation guidance screen is referred to as "the deposit cancellation guidance screen data".

Thus, in place of the deposit value guidance screen, the main control section 20 displays the deposit cancellation guidance screen at the display section 7 in accordance with the deposit cancellation guidance screen data, including a guidance text such as, for example, "Your cash is being returned because the deposit has been cancelled. Please take your cash, and please take your card and bank book."

In this manner, the main control section 20 feeds out and returns the deposit banknotes through the banknote deposit and withdrawal section 5 to the customer, and subsequently closes the shutter of the banknote deposit and withdrawal section 5 and ends the deposit processing.

In addition, the main control section 20 brings out the card and/or the bank book or a transaction statement from the card insertion and ejection aperture 8 and/or the bank book insertion and ejection aperture 9 and delivers the same to the customer.

When the main control section 20 detects via the proximity sensor 23 that the customer has moved away from in front of the ATM 1, the main control section 20 turns off the display section 7 and switches from the guidance mode to the standby mode.

Thus, if a deposit of banknotes is selected as the desired transaction by the customer standing in front of the ATM 1 during the execution of the first transaction guidance processing, the main control section 20 may execute the banknote deposit processing while executing the first transaction guidance processing and implement a deposit of the customer's banknotes.

The ATM 1 is also connected, via the network, to a customer administration device, not shown in the drawings, that is disposed at the financial institution.

Thus, when the first transaction guidance processing is executed, the main control section 20, using the account number read from the card, communicates as appropriate with the customer administration device via, in order, the network interface 21 and the network.

The main control section 20 receives a report of a balance in the customer's account—after the withdrawal and/or after the deposit of banknotes—from the customer administration device, and prints details of the transaction and the like in the bank book and/or on a transaction statement.

Thus, while executing the first transaction guidance processing, the main control section 20 may execute withdrawal processing or deposit processing each time a customer visits and implement the transactions desired by customers until a stoppage of operations is instructed by operation staff from outside the ATM 1 in association with, for example, the end of transaction operations or the performance of maintenance.

At a time of banknote re-stocking processing or a time of recovery processing, the main control section 20 controls the banknote processing unit 25 in accordance with a re-stocking processing program or a recovery processing program, which are memorized in advance in the internal memory.

During banknote re-stocking processing, the main control section 20 feeds out banknotes one at a time from the banknote storage section of the re-stocking and recycling vault 34, conveys the banknotes along the conveyance path 35 to the verification section 26, and verifies the denominations, conditions and the like of the banknotes at the verification section 26.

Hence, the main control section 20 conveys banknotes that have been verified as proper and fed out from the verification section 26 along the conveyance path 35 to the banknote storage vaults 30 to 33 in accordance with the denominations of the banknotes and stores the banknotes in the banknote storage vaults 30 to 33.

On the other hand, the main control section 20 identifies a banknote that has been verified as improper at this time and fed out from the verification section 26 as a reject banknote, conveys this banknote along the conveyance path 35 back to the re-stocking and recycling vault 34, and stores the banknote in the reject storage section.

In this manner, the main control section 20 may re-stock banknotes to be used in withdrawal processing to the plural banknote storage vaults 30 to 33 of the banknote processing unit 25.

During banknote recovery processing, the main control section 20 feeds out banknotes one at a time from the banknote storage vaults 30 to 33, conveys the banknotes along the conveyance path 35 to the verification section 26, and verifies the denominations, conditions and the like of the banknotes at the verification section 26.

Hence, the main control section 20 conveys banknotes that have been verified as proper and fed out from the verification section 26 along the conveyance path 35 to the re-stocking and recycling vault 34 and stores the banknotes in the banknote storage section.

On the other hand, the main control section 20 identifies a banknote that has been verified as improper and fed out from the verification section 26 as a reject banknote, conveys this banknote along the conveyance path 35 to the re-stocking and recycling vault 34, and stores this banknote in the reject storage section.

In this manner, the main control section 20 may recover banknotes from the plural banknote storage vaults 30 to 33 of the banknote processing unit 25.

(1-3) External Structures and Internal Structures of the Entry Section

Figure 3:
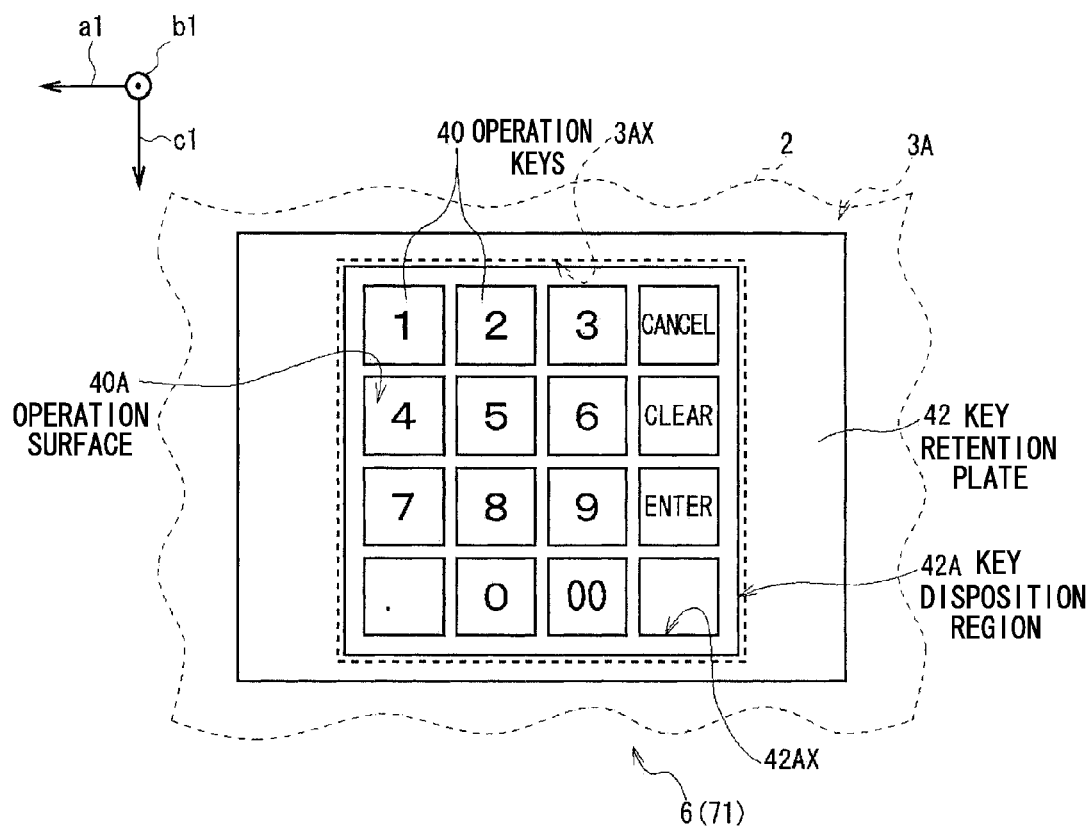
FIG. 3 is a schematic plan view showing external structures of an entry section in accordance with the first embodiment.
Figure 4:
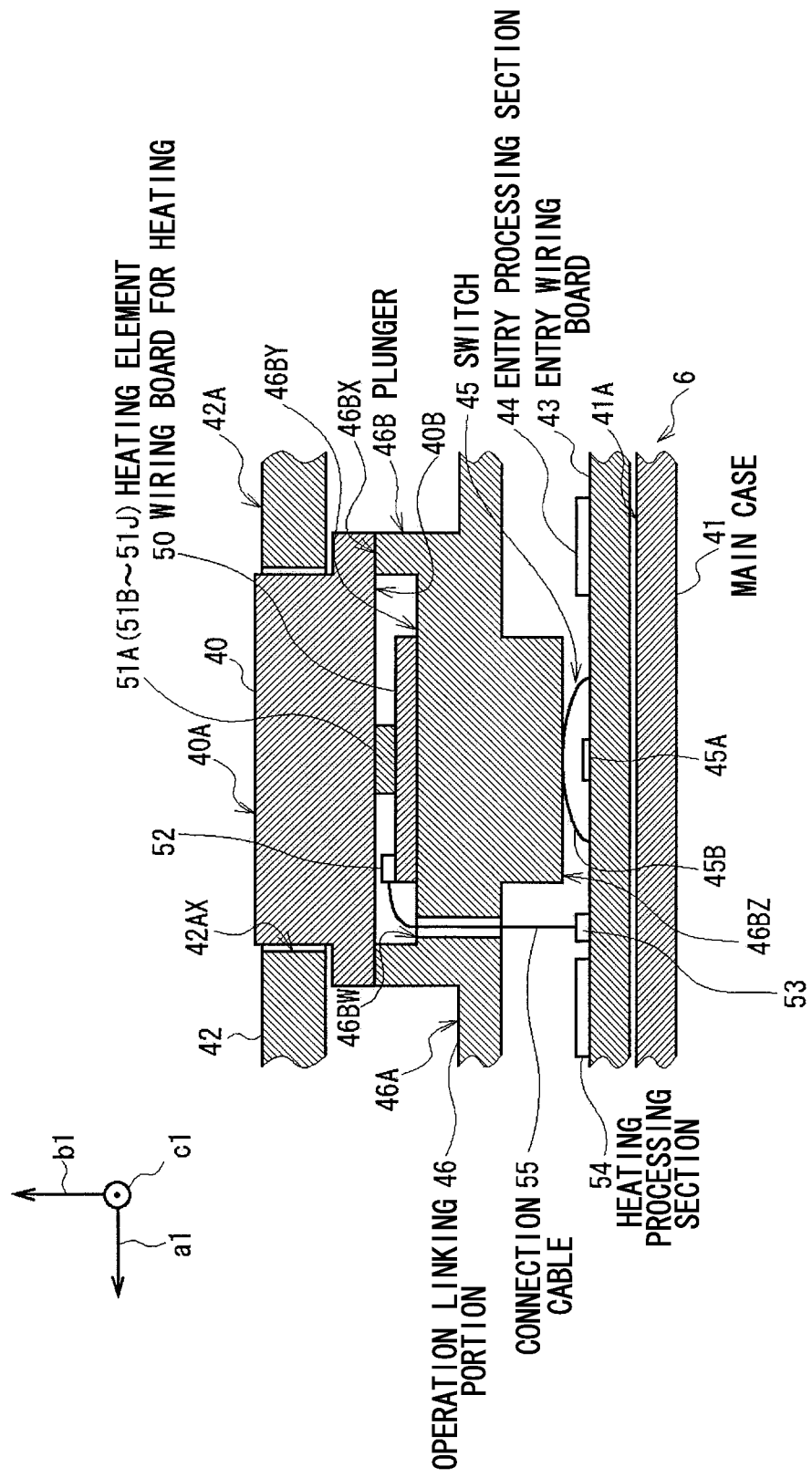
FIG. 4 is a schematic sectional view showing internal structures of the entry section in accordance with the first embodiment.

Now, external structures and internal structures of the entry section 6 that is used for the entry of PIN numbers are described using FIG. 3 and FIG. 4.

Note that FIG. 3 shows structures of the entry section 6 when viewed from directly above, and FIG. 4 shows structures of the interior of the entry section 6 when a portion in which a single operation key 40 is disposed is viewed.

As shown in FIG. 3 and FIG. 4, the plural operation keys 40 provided at the entry section 6 are each formed in a square columnar shape with a step, with a base portion being one step wider than a distal end portion. Each operation key 40 is formed of a metallic material with a relatively high thermal conductivity such as, for example, aluminium.

In this embodiment, the distal end portion of each of the plural operation keys 40 serves as an operation surface 40A with a square shape. The operation surface 40A of the operation key 40 is for being touched by a customer with a fingertip of a hand and being pressed for operation.

Such that the plural operation keys 40 can easily be pressed for operation by any of numerous customers with fingertips of different sizes on their hands, the width of each operation surface 40A is specified to be wider than, for example, the size of the fingertip of the second finger on the hand of an ordinary adult male.

Characters and character strings representing enterable information are rendered on each of the operation surfaces 40A of the plural operation keys 40 (that is, [0] to [9] and [00] representing numbers, [.] representing a symbol, [ENTER] representing the confirmation of entry details, [CLEAR] representing the deletion of entered details and [CANCEL] representing the cancellation of a transaction, or the like).

Thus, with the characters and character strings drawn on the operation surfaces 40A, the plural operation keys 40 may allow a customer to understand what information can be entered via the operation keys 40.

The entry section 6 also includes a main case 41 in, for example, a substantially square shape. An opening portion with a square shape is formed in a case upper end of the main case 41.

A key retention plate 42 with a substantially square shape is mounted at the case upper end of the main case 41, such that a central portion of the key retention plate 42 is fixed. The key retention plate 42 is one step larger than the case upper end of the main case 41.

Thus, front, rear, left and right edge portions of the key retention plate 42 (hereinafter these are collectively referred to as retention plate edge portions) are protruded at the periphery (that is, the front, rear, left and right) of the case upper end of the main case 41, and the opening portion at the case upper end is closed off by the central portion of the key retention plate 42.

A region 42A in, for example, a square shape at a central portion of the key retention plate 42 is used for arrangement of the plural operation keys 40, and is machined in a protruding shape that protrudes to the upper side, to one level higher than the edge portions. In the following descriptions, the protruding region 42A at the central portion of the key retention plate 42 is referred to as "the key disposition region 42A".

Plural key insertion hole portions 42AX are cut in a matrix pattern in an upper face of the key disposition region 42A of the key retention plate 42. The key insertion hole portions 42AX have square shapes with widths substantially equal to the widths of the distal end portions of the operation keys 40.

The distal end portions of the operation keys 40 are inserted into the key insertion hole portions 42AX of the key disposition region 42A of the key retention plate 42 from the lower side, and the operation surfaces 40A of the operation keys 40 are caused to protrude to the ATM upward direction from the upper face of the key disposition region 42A.

That is, at the key retention plate 42, the base portions of the plural operation keys 40 that are wider than the plural key insertion hole portions 42AX are disposed at the lower side of the key disposition region 42A. Thus, the plural operation keys 40 are inserted into the plural key insertion hole portions 42AX so as not to fall out to the upper side.

In this manner, the plural operation keys 40 are arranged in a matrix pattern passing through the plural key insertion hole portions 42AX in the key disposition region 42A of the key retention plate 42, and the plural operation keys 40 are retained by the plural key insertion hole portions 42AX to be movable up and down.

In the following descriptions, end faces 40B of base portions of the plural operation keys 40 disposed in the key disposition region 42A of the key retention plate 42, which are oriented to the ATM downward direction, are each referred to as "the key lower face 40B".

A multilayer wiring board 43 is disposed at a floor face 41A of the main case 41. Surface-mounted components such as, for example, semiconductor components are mounted at the multilayer wiring board 43.

An entry processing section 44 structured by, for example, a microcomputer is mounted at one face of the multilayer wiring board 43 as a surface-mounted component. The entry processing section 44 executes entry processing in accordance with pressing operations of the plural operation keys 40 under the control of the above-described main control section 20.

In the following descriptions, the multilayer wiring board 43 at which the entry processing section 44 is mounted as a surface-mounted component is referred to as "the entry wiring board 43".

Fixed contact points 45A that are each formed of conductive metal foil are disposed at one face of the entry wiring board 43. The fixed contact points 45A are disposed at positions that oppose central portions of the key lower faces 40B of the plural operation keys 40.

Diaphragms 45B are mounted at the one face of the entry wiring board 43 so as to cover the fixed contact points 45A. The diaphragms 45B are each a surface-mounted component that is formed in a bowl shape, with resilience, of conductive metal foil. The diaphragms 45B are mounted at positions that oppose the central portions of the key lower faces 40B of the plural operation keys 40.

Conductive wiring is formed in predetermined patterns at the one face and another face and the like of the entry wiring board 43. Thus, the plural fixed contact points 45A and the plural diaphragms 45B of the entry wiring board 43 are respectively electronically connected with the entry processing section 44 via the conductive wiring.

Switches 45 are provided at the one face of the entry wiring board 43. The switches 45 are formed of respective pairs of the fixed contact points 45A and the diaphragms 45B, at positions opposing the central portions of the key lower faces 40B of the plural operation keys 40.

An operation linking portion 46, substantially in a grid shape, is disposed in the main case 41 between the plural operation keys 40 and the entry wiring board 43.

The operation linking portion 46 is provided with plungers 46B at regions of intersection between plural spar-shaped support portions 46A that combine into the grid pattern. Each plunger 46B is formed substantially in a square rod shape with a step, an upper end portion thereof being one step wider than a lower end portion.

The plural plungers 46B of the operation linking portion 46 are respectively disposed between the key lower faces 40B of the operation keys 40 and the switches 45 below those operation keys 40.

The operation linking portion 46 is integrally formed of a resilient material such as rubber (that is, the plural support portions 46A and the plural plungers 46B are formed as a single body).

Thus, the plural plungers 46B of the operation linking portion 46 are supported by the plural support portions 46A to be individually movable up and down.

The width of, for example, the upper end portion of each of the plural plungers 46B of the operation linking portion 46 is set to a width substantially equal to the width of the base portion of the operation key 40, and the width of the lower end portion of the plunger 46B is specified to be slightly larger than the diameter of the diaphragm 45B of the switch 45.

A circuit board arrangement recess portion 46BY is formed in a central portion of an upper end face 46BX of each of the plural plungers 46B of the operation linking portion 46.

Edge portions of the upper end face 46BX of each of the plural plungers 46B of the operation linking portion 46 abut against edge portions of the key lower face 40B of the respectively corresponding operation key 40.

Thus, the operation linking portion 46 supports the respectively corresponding operation keys 40 from below with the plural plungers 46B.

When no external forces are applied to any of the plural operation keys 40 so as to press an operation key 40 down, in this example, the plural support portions 46A of the operation linking portion 46 are kept horizontal and support the plural plungers 46B.

An up-and-down length of each of the plural plungers 46B of the operation linking portion 46 is set to a predetermined length such that, when no external force is applied so as to press the respectively corresponding operation key 40 downward, the step portion of the operation key 40 abuts against or is close to the lower face of the key disposition region 42A of the key retention plate 42, and a top portion of the diaphragm 45B of the switch 45 abuts against or is close to a lower end face 46BZ of the operation linking portion 46 without the diaphragm 45B being at all deformed.

Herein, a reference position of each of the plural operation keys 40 when a pressing operation for entering information begins is a position such that, when no external force is applied to press the operation key 40 downward, the step portion of the operation key 40 abuts against or is close to the lower face of the key disposition region 42A of the key retention plate 42.

Accordingly, in the following descriptions, this position of the operation key 40 such that the step portion abuts against or is close to the lower face of the key disposition region 42A of the key retention plate 42 when no external force is being applied to the operation key 40 to press the operation key 40 downward is referred to as "the operation reference position".

Hence, when an external force pressing in the downward direction is applied to the operation surface 40A of the operation key 40 and the operation key 40 is pressed down from the operation reference position, the operation linking portion 46 links with this pressing down and the corresponding plunger 46B descends and pushes against the diaphragm 45B.

Accordingly, the diaphragm 45B is deformed by the pushing of the plunger 46B of the operation linking portion 46. Thus, the deformed diaphragm 45B may be mechanically and electronically connected with the fixed contact point 45A, and the switch 45 may be switched on.

When the external force is removed from the operation surface 40A of the operation key 40 that has been pressed down, the diaphragm 45B is restored in shape by an inherent restoring force, and the corresponding plunger 46B of the operation linking portion 46 rises.

Accordingly, the operation linking portion 46 allows the diaphragm 45B to separate from the fixed contact point 45A and the switch 45 may switch off, and the operation key 40 may be pushed up by the plunger 46B rising and returned to the operation reference position from before the pressing operation.

Herein, the retention plate edge portions of the key retention plate 42 of the entry section 6 are made to protrude at the periphery of the case upper end of the main case 41, for mounting of the entry section 6 to the upward facing panel 3A of the ATM casing 2.

In the ATM casing 2, an aperture portion 3AX is formed in a central front end portion of the upward facing panel 3A. The aperture portion 3AX is formed in, for example, a square shape that corresponds with the key disposition region 42A of the key retention plate 42 of the entry section 6.

Thus, the entry section 6 is mounted to the upward facing panel 3A such that the retention plate edge portions are fixed to the inner face of the upward facing panel 3A in a state in which the key disposition region 42A of the key retention plate 42 has been inserted through the aperture portion 3AX of the upward facing panel 3A of the ATM casing 2 from the lower side thereof.

That is, the entry section 6 is mounted to the upward facing panel 3A of the ATM casing 2 such that the key disposition region 42A of the key retention plate 42 and the operation surfaces 40A of the plural operation keys 40 are exposed to the exterior through the aperture portion 3AX of the upward facing panel 3A.

Therefore, in the state in which the entry section 6 has been mounted to the upward facing panel 3A of the ATM casing 2 in this manner, the operation surface 40A of each of the plural operation keys 40 at the operation reference position may be pressed for operation by being touched with a fingertip of a hand by a customer.

In the entry section 6, when an operation key 40 is pressed by a customer, the switch 45 corresponding to (i.e., directly below) the operation key 40 that has been pressed may switch on accordingly.

Then, in the entry section 6, when the fingertip of the hand is removed from the operation surface 40A of the operation key 40 that has been pressed by the customer, the operation key 40 may accordingly return to the operation reference position and the corresponding switch 45 may switch off.

The entry processing section 44 of the entry section 6 memorizes in internal memory beforehand, for example, a data table in which positions of arrangement of the plural switches 45 corresponding to the plural operation keys 40 are associated in advance with the enterable information that is assigned to those operation keys 40.

When an operation key 40 is pressed by a customer, the entry processing section 44 detects the position of arrangement of the switch 45 that has been switched on by the pressing operation of that operation key 40.

On the basis of the detected position of arrangement of the switch 45 that has been switched on and the data table in the memory, the entry processing section 44 identifies the enterable information that is assigned to the operation key 40 that has been pressed.

The entry processing section 44 then reports the identified information to the main control section 20. Thus, the plural operation keys 40 may be pressed by customers and PIN numbers (and other information) may be entered by the entry processing section 44.

Now, respective temperatures of the operation surfaces 40A of the plural operation keys 40 change substantially uniformly in accordance with a usage environment of the ATM 1 (that is, the temperature and humidity in the vicinity of the ATM 1, whether there are air currents or not and the like, which are hereinafter referred to as "the ATM usage environment").

The ATM usage environment in a room in which the ATM 1 is disposed is regulated by, for example, air-conditioning equipment. In particular, a room temperature that is the temperature in the vicinity of the ATM 1 is regulated as appropriate to a lower temperature than human body temperature for the comfort of customers.

Therefore, when the ATM 1 is disposed in a room, the temperatures of the respective operation surfaces 40A of the plural operation keys 40 change uniformly in accordance with the ATM usage environment, being lowered to a temperature that is lower than the temperature of the fingertips of the hand of a customer who is pressing the operation keys 40 (i.e., body temperature).

When this temperature of the operation surfaces 40A of the operation keys 40 differs from the temperature of the fingertips of the hand of a customer, then when any of the operation keys 40 is pressed, at least a contact area of the operation surface 40A with the fingertip of the hand changes to a different temperature from the temperature before contact with the fingertip and from a non-contact area.

That is, when any of the plural operation keys 40 of the entry section 6 is pressed, a difference is produced between the temperature of the operation surface 40A of the pressed operation key 40 and the temperature of the operation surface 40A of each operation key 40 that has not been pressed.

Accordingly, in addition to the present structures, the entry section 6 is provided with a wiring board 50 at a central portion of the interior of the circuit board arrangement recess portion 46BY of each of, among the plural plungers 46B of the operation linking portion 46, only the plural plungers 46B that touch the plural operation keys 40 that can be used for entering PIN numbers (that is, for the entry of the digits 0 to 9). Surface mounted components are mounted at the wiring boards 50.

In the following descriptions, of the plural operation keys 40, the operation keys 40 that can be used for the entry of a PIN number (that is, the ten operation keys 40 that can enter the digits 0 to 9) are particularly referred to as "the number entry operation keys 40".

Further, in the following descriptions, of the plural plungers 46B of the operation linking portion 46, the respective plungers 46B that touch against the plural number entry operation keys 40 (that is, the plungers 46B at the ten locations supporting the ten number entry operation keys 40 from below) are particularly referred to as "the number entry plungers 46B".

At central portions of respective one faces of the plural wiring boards 50, heating elements 51A to 51J are mounted as surface-mounted components. The heating elements 51A to 51J are, for example, resistive heat generating bodies in which currents flow through resistances between terminals and generate heat. Surfaces of the heating elements 51A to 51J are caused to touch against central portions of the key lower faces 40B of the corresponding number entry operation keys 40.

In the following descriptions, each of the plural wiring boards 50 at which the heating elements 51A to 51J are mounted is referred to as "the heating wiring board 50".

Connectors (hereinafter referred to as "the heating board side connectors") 52 are mounted as surface-mounted components at, for example, predetermined positions of an edge portion of the one face of each of the plural heating wiring boards 50.

Conductive wiring (not shown in the drawings) is formed in a predetermined pattern at the one face of each of the plural heating wiring boards 50.

Thus, at the plural heating wiring boards 50, the respective heating elements 51A to 51J are electronically connected to the heating board side connectors 52 via the conductive wiring.

In the plural number entry plungers 46B of the operation linking portion 46, cable insertion hole portions 46BW are cut from predetermined positions of the floor face of each circuit board arrangement recess portion 46BY to the step portion.

Connectors (hereinafter referred to as "the entry board side connectors") 53 are respectively mounted as surface-mounted components at one face of the entry wiring board 43, for example, at positions opposing the cable insertion hole portions 46BW of the plural number entry plungers 46B of the operation linking portion 46.

A heating processing section 54 structured by, for example, a microcomputer, is mounted as a surface-mounted component at the one face of the entry wiring board 43. The heating processing section 54 causes the plural heating elements 51A to 51J to generate heat, thus heating the plural number entry operation keys 40.

The heating processing section 54 at the entry wiring board 43 is electronically connected with the entry board side connectors 53 via conductive wiring.

Hence, one end portions of respective connection cables 55, such as flat cables, are mechanically and electronically connected to the plural entry board side connectors 53.

Other end portions of the plural connection cables 55 pass through the cable insertion hole portions 46BW in the number entry plungers 46B that are disposed directly above the respective entry board side connectors 53 to which the one end portions are connected, and hence are mechanically and electronically connected to the heating board side connectors 52 of the wiring boards 50 in the circuit board arrangement recess portions 46BY of the number entry plungers 46B.

Thus, the heating processing section 54 of the entry section 6 is electronically connected to the plural heating elements 51A to 51J via, in order, the plural entry board side connectors 53, the plural connection cables 55 and the plural heating board side connectors 52.

When a PIN number is to be entered by a customer, under the control of the main control section 20, the heating processing section 54 of the entry section 6 raises the temperatures of all of the respective operation surfaces 40A of the plural number entry operation keys 40 and makes the temperatures substantially equal, by causing the plural heating elements 51A to 51J to generate heat and heat the plural number entry operation keys 40.

Thus, when some of the plural number entry operation keys 40 are pressed in sequence by the customer to enter a PIN number, the heating processing section 54 may prevent changes such that temperatures of the operation surfaces 40A of the number entry operation keys 40 that have been pressed at this time are different from temperatures of the operation surfaces 40A of the number entry operation keys 40 that have not been pressed.

Therefore, when a PIN number is entered by a customer, even if temperatures of the operation surfaces 40A of the plural number entry operation keys 40 are sensed by a third party using thermography, the heating processing section 54 may make it not possible to identify the number entry operation keys 40 that have been pressed to enter the PIN number and the sequence of pressing operations of these number entry operation keys 40 from the sensed temperatures.

(1-4) Structure of the Temperature Changing Unit

Figure 5:
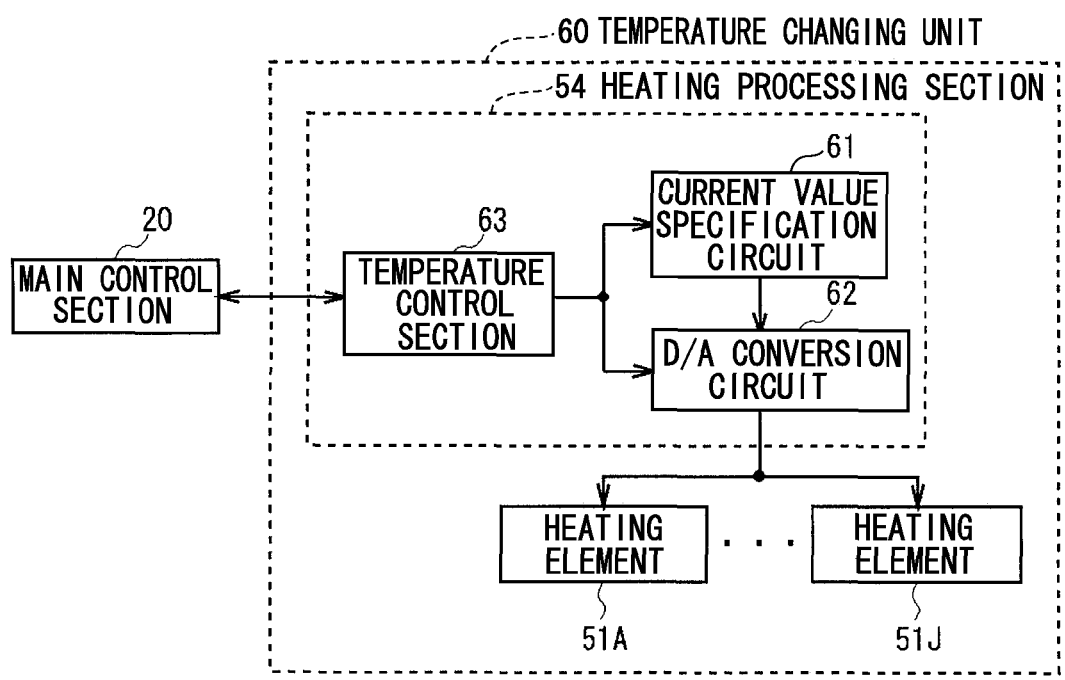
FIG. 5 is a block diagram showing the structure of a temperature changing unit in accordance with the first embodiment.

Now, the structure of a temperature changing unit 60 is described in specific detail using FIG. 5. The temperature changing unit 60 is constituted by the plural heating elements 51A to 51J and the heating processing section 54, and is for changing the temperatures of the operation surfaces 40A of the plural number entry operation keys 40 via the plural heating elements 51A to 51J in the entry section 6, to make the temperatures substantially equal when the plural number entry operation keys 40 are to be pressed by a customer to enter a PIN number.

In this embodiment, a current value specification circuit 61 and a digital-to-analog conversion circuit 62 are provided in the heating processing section 54.

A control section (hereinafter referred to as "the temperature control section") 63 that oversees and controls the heating processing section 54 as a whole, under the control of the main control section 20, is provided in the heating processing section 54.

The temperature control section 63 executes first temperature change processing in accordance with, for example, a first temperature change processing program that is memorized in advance in internal memory. The first temperature change processing is for, together with the current value specification circuit 61 and the digital-to-analog conversion circuit 62, causing the plural heating elements 51A to 51J to generate heat and raise the temperatures of the operation surfaces 40A of the plural number entry operation keys 40.

A target temperature of the operation surfaces 40A of the entry section 6, for when the plural number entry operation keys 40 are being heated via the plural heating elements 51A to 51J and the temperatures of the operation surfaces 40A are being raised, is set in advance.

As described above, when there is a difference between the temperatures of the operation surfaces 40A of the plural number entry operation keys 40 and the temperatures of the fingertips of the hand of a customer, the temperatures at least of contact areas of the operation surfaces 40A of pressed number entry operation keys 40 with the fingertips of the hand change. Therefore, the present target temperature is set to, as an example, a predetermined temperature that is substantially the same as the temperature of the fingertips of a human hand.

That is, the target temperature is set to a predetermined temperature (for example, around 34° C. to 36° C.) that is substantially equal to the temperature of the fingertips of a hand (for example, human body temperature), such that the temperatures of the operation surfaces 40A barely change at all when the operation surfaces 40A of the number entry operation keys 40 are touched by the fingertips of a hand, or such that even if the temperature of a contact area with the fingertips of a hand does change, the change in temperature may be quickly eliminated, returning to the state before the change.

The heating elements 51A to 51J are formed so as to generate heat in accordance with the supply of respective heating control currents, such that heat generation amounts may be altered in accordance with the sizes of current values of the supplied heating control currents.

Accordingly, in the entry section 6, a current value of the heating control currents supplied to the plural heating elements 51A to 51J for heating of the plural number entry operation keys 40 (hereinafter referred to as a "regulation current value") is set in advance in accordance with the target temperature such that the temperatures of the operation surfaces 40A of the plural number entry operation keys 40 rise to the target temperature.

The regulation current value set in accordance with the target temperature is stored in advance in the current value specification circuit 61 of the heating processing section 54.

When the temperature control section 63 of the heating processing section 54 executes the first temperature change processing in accordance with the present structure, the temperature control section 63 waits for the start of heating of the plural number entry operation keys 40 to be commanded by the main control section 20.

When the start of heating of the plural number entry operation keys 40 is commanded from the main control section 20, the temperature control section 63 operates the current value specification circuit 61 and the digital-to-analog conversion circuit 62 in response.

At this time, the current value specification circuit 61 initializes specified current values of the heating control currents for causing the plural heating elements 51A to 51J to generate heat to the regulation current value stored in advance.

Hence, on the basis of the initialized regulation current value, the current value specification circuit 61 generates heating control data for a level in accordance with the regulation current value and sends the generated heating control data to the digital-to-analog conversion circuit 62.

Then the digital-to-analog conversion circuit 62 generates heating control currents at the regulation current value by applying digital-to-analog conversion processing to the heating control data provided from the current value specification circuit 61, and supplies the generated heating control currents to the plural heating elements 51A to 51J.

Thus, the temperature control section 63 causes the plural heating elements 51A to 51J to generate heat with the heating control currents at the regulation current value and heats the plural number entry operation keys 40.

Thereafter, when the end of heating of the plural number entry operation keys 40 is commanded by the main control section 20, the temperature control section 63 stops the operations of the current value specification circuit 61 and the digital-to-analog conversion circuit 62 in response.

Thus, the temperature control section 63 stops the supply of the heating control currents at the regulation current value to the plural heating elements 51A to 51J and stops heat generation by the plural heating elements 51A to 51J. Thus, the temperature control section 63 ends the heating of the plural number entry operation keys 40.

In this manner, the temperature control section 63 supplies the heating control currents at the regulation current value and causes the plural heating elements 51A to 51J to generate heat continuously from when the start of heating of the plural number entry operation keys 40 is commanded by the main control section 20 until the end is commanded.

Thus, the temperature control section 63 heats the plural number entry operation keys 40 by heat generation from the plural heating elements 51A to 51J, from the start of heating of the plural number entry operation keys 40 being commanded by the main control section 20 to the end being commanded, and raises all of the operation surfaces 40A of the plural number entry operation keys 40 to the target temperature.

Now, when a third party attempts to illegitimately acquire a customer's PIN number by using thermography, the third party may consider, for example, sensing the temperatures of the operation surfaces 40A of the plural number entry operation keys 40 by using thermography over the shoulder of the customer while the customer is entering their PIN number.

Alternatively, when a third party attempts to illegitimately acquire a customer's PIN number by using thermography, the third party may consider, for example, using thermography to sense the temperatures of the operation surfaces 40A of the plural number entry operation keys 40 just after the customer entering the PIN number has taken withdrawn banknotes and moved away from in front of the ATM 1.

Therefore, it is necessary to heat the plural number entry operation keys 40 with the temperature control section 63 such that the temperatures of the respective operation surfaces 40A of the plural number entry operation keys 40 rise to the target temperature before the entry of a PIN number by a customer is started, such that the temperatures of the operation surfaces 40A of the plural number entry operation keys 40 barely change when the PIN number is entered.

It is also necessary for the main control section 20 to cause the temperature control section 63 to continue the heating of the plural number entry operation keys 40 from before the entry of a PIN number until after the entry, such that if the temperatures of the operation surfaces 40A of the number entry operation keys 40 that are pressed for entry of the PIN number are changed a little from the target temperature by the contact of the fingertips of a hand, the changes in temperature are quickly eliminated, returning to the state before the change.

Therefore, for example, when the main control section 20 detects via the proximity sensor 23 that a customer has approached the ATM 1 and is facing the entry section 6, the main control section 20 immediately commands the temperature control section 63 to start the heating of the plural number entry operation keys 40.

After the main control section 20 has thus commanded the temperature control section 63 to start the heating of the plural number entry operation keys 40, the main control section 20 guides the customer through the procedure of a transaction as described above while a card is inserted into the card insertion and ejection aperture 8 (and a bank book is inserted into the bank book insertion and ejection aperture 9).

While the main control section 20 is guiding the customer through the procedure of the transaction, a transaction type is selected via the entry section 6, and if a withdrawal of banknotes is selected as the transaction type, the main control section 20 prompts the customer to press the plural number entry operation keys 40 and enter the PIN number.

That is, after causing the temperature control section 63 to start the heating of the plural number entry operation keys 40, the main control section 20 follows through the procedures, allowing the customer to check the procedures of transactions while inserting their card (and bank book) and to select a transaction type.

Thus, after the main control section 20 causes the temperature control section 63 to start the heating of the plural number entry operation keys 40, a heating duration sufficient to raise all of the operation surfaces 40A of the plural number entry operation keys 40 to the target temperature is assured before the customer starts to enter the PIN number.

Then, when the main control section 20 detects via the proximity sensor 23 that the customer has moved away from in front of the ATM 1, the main control section 20 commands the temperature control section 63 to end the heating of the plural number entry operation keys 40.

In other words, the main control section 20 causes the temperature control section 63 to continuously heat the plural number entry operation keys 40 from when the customer approaches the ATM 1 for a withdrawal of banknotes and faces the entry section 6 until when the customer takes their withdrawn banknotes and moves away from in front of the ATM 1.

Figure 6:
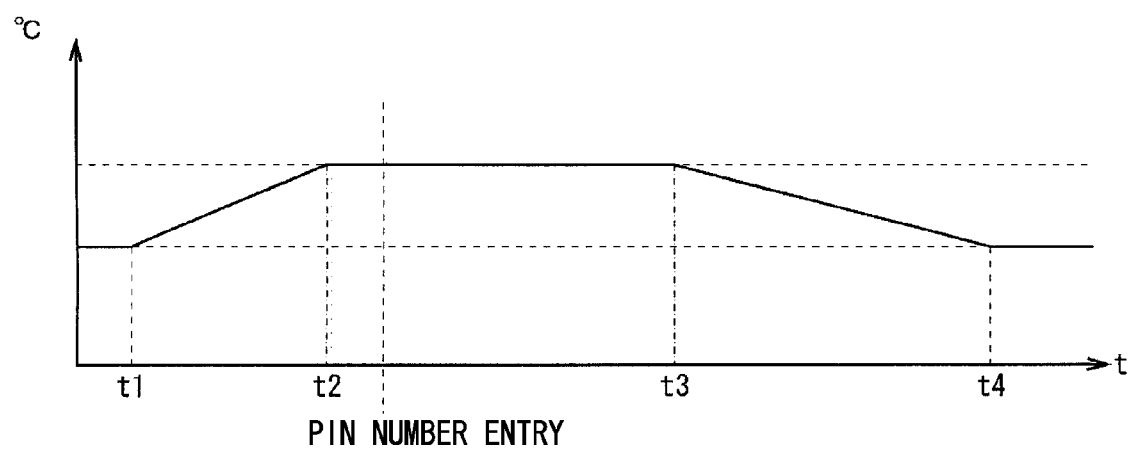
FIG. 6 is a schematic diagram supporting a description of changes in temperature of an operation surface in accordance with heating of plural number entry operation keys.

As illustrated in FIG. 6, before heating is started, the plural number entry operation keys 40 have fallen to a predetermined temperature depending on the ATM usage environment, which is lower than the target temperature of the operation surfaces 40A.

From this state, if a customer approaches the ATM 1 and faces the entry section 6 at time t1, the main control section 20 commands the temperature control section 63 to start the heating of the plural number entry operation keys 40, and the heating of the plural number entry operation keys 40 is started by the plural heating elements 51A to 51J being caused to generate heat.

Thus, from time t1, the plural number entry operation keys 40 are heated by heat generation from the plural heating elements 51A to 51J and the temperatures of the operation surfaces 40A rise.

Then, if a withdrawal is selected as a desired transaction by the customer, the plural number entry operation keys 40 continue to be heated. Thus, all of the operation surfaces 40A rise to the target temperature that is substantially equal to the temperature of the fingertips of a human hand at time t2, which is just before the PIN number is entered.

Even though all of the operation surfaces 40A have risen to the target temperature at time t2, the plural number entry operation keys 40 continue to be heated. Hence, amounts of heat naturally dissipated after time t2 and amounts of heat provided by the heating balance out, and all of the operation surfaces 40A stay at the target temperature that is substantially equal to the temperature of the fingertips of a hand.

When all of the operation surfaces 40A of the plural number entry operation keys 40 have risen to the target temperature in this manner, the main control section 20 continues the heating of the plural number entry operation keys 40 and allows the customer to press the number entry operation keys 40 and enter the PIN number.

Therefore, the main control section 20 may prevent the temperatures of the operation surfaces 40A of the plural number entry operation keys 40 changing noticeably from the target temperature when the plural number entry operation keys 40 are pressed by the customer and the PIN number is entered.

After the entry of the PIN number by the customer, the main control section 20 heats the number entry operation keys 40 until the customer moves away from in front of the ATM 1. Therefore, even if the temperature of an operation surface 40A changes a little from the target temperature during the entry of the PIN number due to contact with the fingertips of the hand, this change of temperature may be quickly eliminated, returning to the state before the change.

When the customer moves away from in front of the ATM 1 at time t3, after the entry of the PIN number, the main control section 20 commands the temperature control section 63 to end the heating of the plural number entry operation keys 40 and heat generation from the plural heating elements 51A to 51J is stopped, thus ending the heating of the plural number entry operation keys 40.

Hence, after time t3 when the heating of the plural number entry operation keys 40 is stopped, heat is naturally dissipated therefrom, and the temperatures of the operation surfaces 40A gradually fall from the target temperature. At time t4, the temperatures of the operation surfaces 40A have fallen again to a predetermined temperature depending on the ATM usage environment that is lower than the target temperature.

After time t4, the temperatures of the operation surfaces 40A of the plural number entry operation keys 40 stay substantially constant at the predetermined temperature depending on the ATM usage environment, until heating is started again.

Thus, at a time of a withdrawal of banknotes, the main control section 20 allows a customer to press the plural number entry operation keys 40 and enter a PIN number in a state in which the plural number entry operation keys 40 have been heated by the temperature control section 63 and the temperatures of the operation surfaces 40A are at a temperature substantially the same as the fingertips of the hand.

Note that whereas the customer is caused to enter the PIN number for authentication when a withdrawal of banknotes is selected as the desired transaction by the customer, entry of the PIN number is not particularly needed when a deposit of banknotes is selected as the desired transaction.

The main control section 20 cannot determine whether a customer will select a withdrawal or a deposit of banknotes as the desired transaction from the moment when the main control section 20 detects, via the proximity sensor 23, the customer approaching the ATM 1 and facing the entry section 6.

However, when the main control section 20 detects via the proximity sensor 23 that the customer is approaching the ATM 1 and facing the entry section 6, in consideration of the possibility that a withdrawal of banknotes may be selected by the customer, the main control section 20 causes the temperature control section 63 to start the heating of the plural number entry operation keys 40 as described above, thus assuring a heating duration sufficient to raise the temperatures of the operation surfaces 40A to the target temperature.

Even though the main control section 20 causes the temperature control section 63 to start the heating of the plural number entry operation keys 40 in this manner, if a deposit of banknotes is selected by the customer, then at that moment the main control section 20 commands the temperature control section 63 to end the heating of the plural number entry operation keys 40, thus ending the heating of the plural number entry operation keys 40.

Therefore, even though the main control section 20 starts the heating of the plural number entry operation keys 40 in response to a customer approaching the ATM 1 and facing the entry section 6, if a deposit of banknotes is selected by that customer, subsequent unnecessary heating of the plural number entry operation keys 40 is prevented and an increase in power consumption is prevented.

(1-5) First PIN Number Entry Processing Sequence

Figure 7:
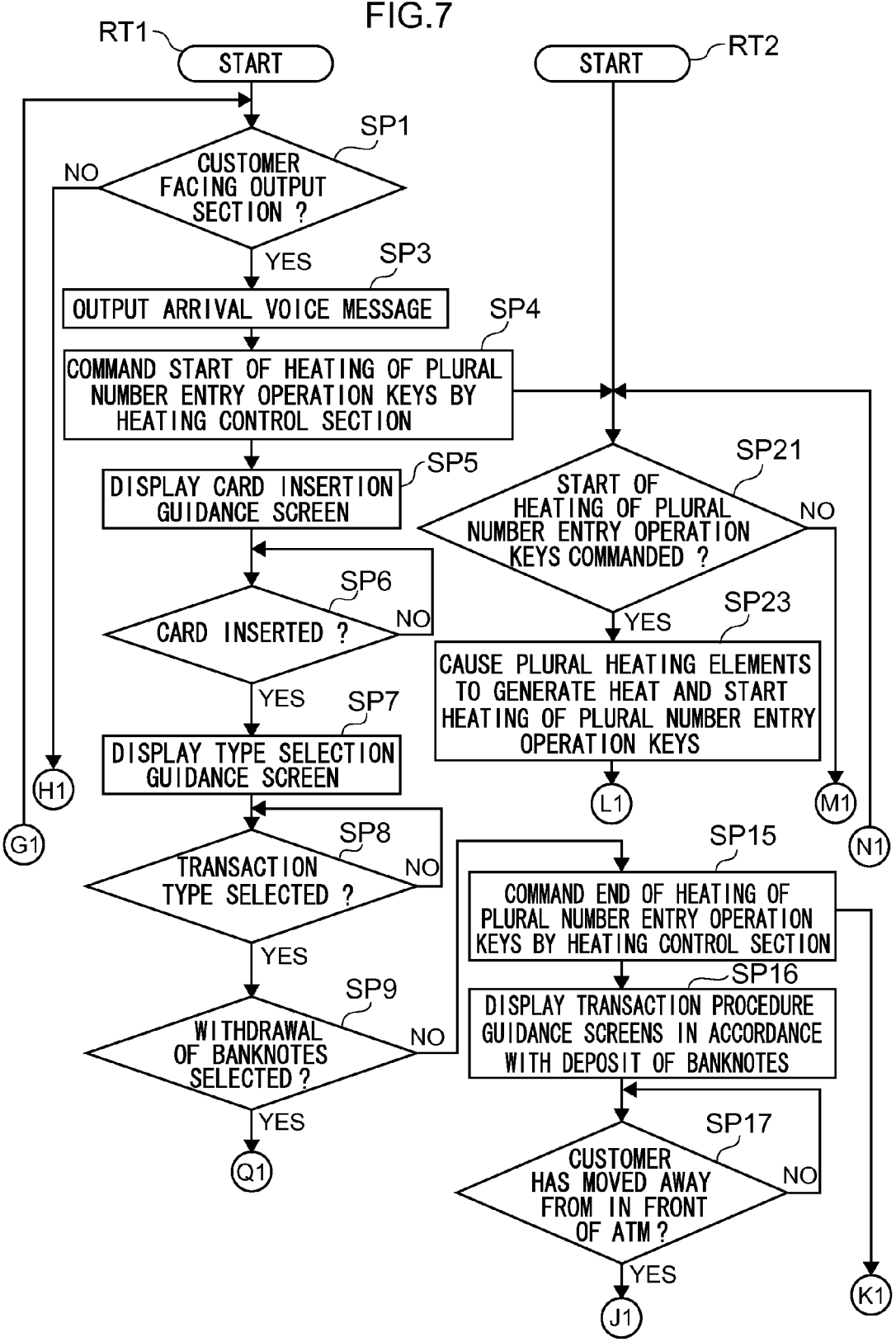
FIG. 7 is a flowchart showing a first PIN number entry processing sequence (part 1).
Figure 8:
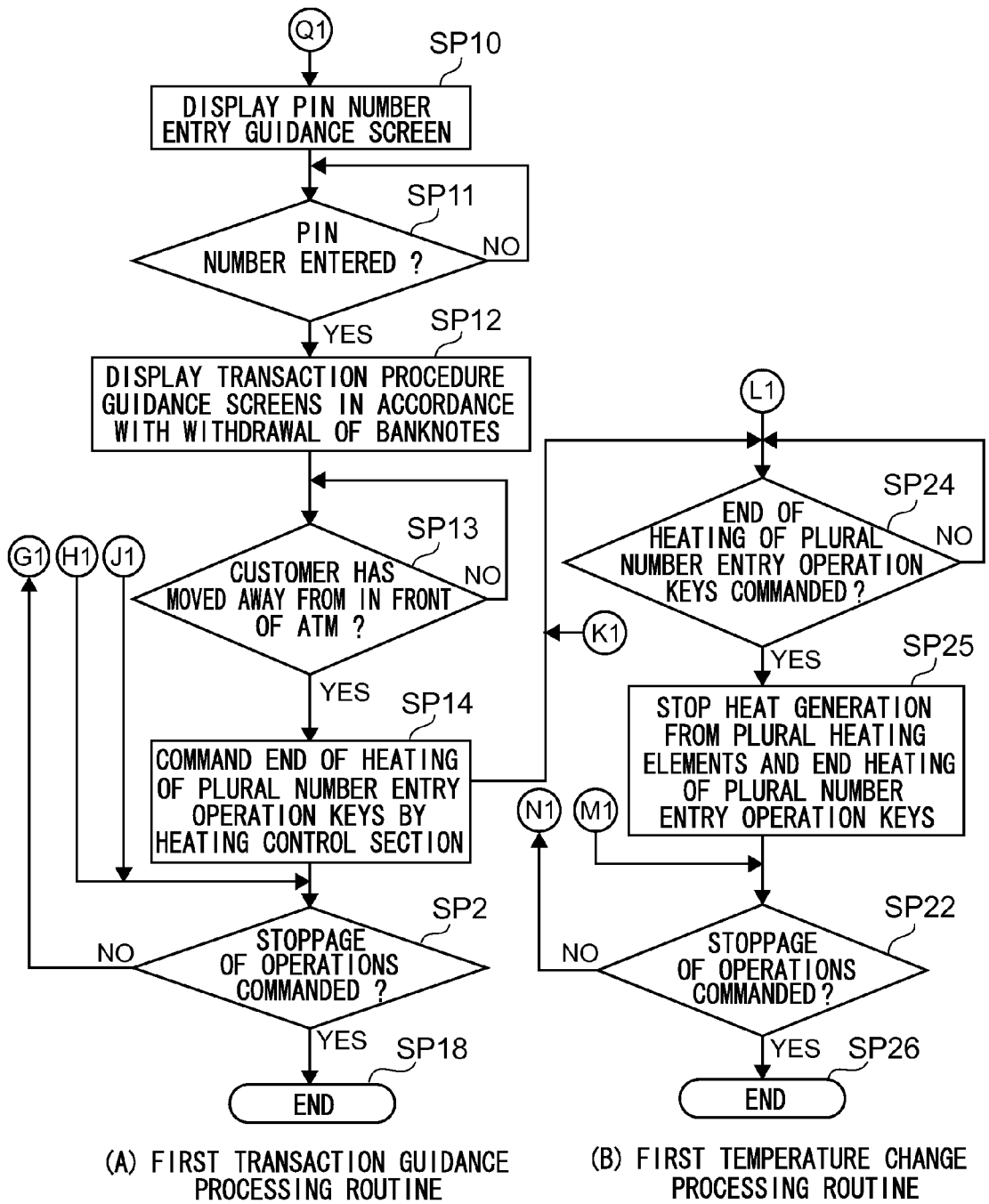
FIG. 8 is the flowchart showing the first PIN number entry processing sequence (part 2).

Now, a first PIN number entry processing sequence is described using the flowchart shown in FIG. 7 and FIG. 8. The first PIN number entry processing sequence is constituted by a first transaction guidance processing routine RT1 that is executed by the main control section 20 and a first temperature change processing routine RT2 that is executed by the temperature control section 63.

When a command to start up the ATM 1 is given by operating staff from outside the ATM 1 in association with, for example, the start of transaction operations or the completion of maintenance or the like, and the main control section 20 starts up, the first transaction guidance processing routine RT1 shown in FIG. 7 and FIG. 8 is started in accordance with a first transaction guidance processing program, which is memorized in advance in the internal memory.

When this first transaction guidance processing routine RT1 starts, in step SP1, the main control section 20 makes a determination as to whether a customer is facing the entry section 6, on the basis of the level of the sensor output signal provided from the proximity sensor 23.

If a negative result is obtained in step SP1, this result indicates that no customer requiring a withdrawal or deposit transaction or the like has arrived yet. When this negative result is obtained in step SP1, the main control section 20 proceeds to step SP2.

In step SP2, the main control section 20 makes a determination as to whether a stoppage of operations has been commanded from outside the ATM 1. If a negative result is obtained in step SP2, this result indicates that a stoppage of operations has not been commanded from outside the ATM 1, because, for example, the main control section 20 is currently performing a transaction task and maintenance of the ATM 1 is not required. When this negative result is obtained in step SP2, the main control section 20 returns to step SP1.

Thus, the main control section 20 repeatedly cycles through execution of the processing of step SP1 and step SP2 until an affirmative result is obtained in either of step SP1 and step SP2.

In this manner, the main control section 20 waits until a customer requiring a withdrawal or deposit transaction or the like arrives in front of the ATM 1 or a stoppage of operations is commanded from outside the ATM 1.

If an affirmative result is obtained in step SP1, this result indicates that a customer requiring a withdrawal or deposit transaction or the like has arrived (that is, the customer has approached the ATM 1 and is facing the entry section 6). When this affirmative result is obtained in step SP1, the main control section 20 proceeds to step SP3.

In step SP3, the main control section 20 outputs the arrival voice message from the speaker 22, and then proceeds to step SP4.

In step SP4, the main control section 20 commands the temperature control section 63 of the entry section 6 to start the heating of the plural number entry operation keys 40, and proceeds to step SP5.

Meanwhile, when a start-up of the temperature control section 63 is commanded, for example, from the main control section 20 and the temperature control section 63 starts up, the first temperature change processing routine RT2 shown in FIG. 7 and FIG. 8 is started in accordance with a first temperature change processing program, which is memorized in advance in the internal memory.

When the present first temperature change processing routine RT2 starts, in step SP21, the temperature control section 63 makes a determination as to whether a start of heating of the plural number entry operation keys 40 has been commanded by the main control section 20.

If a negative result is obtained in step SP21, this result indicates that the start of heating of the plural number entry operation keys 40 has not been commanded by the main control section 20, because no customer requiring a withdrawal or deposit transaction or the like has yet arrived. When this negative result is obtained in step SP21, the temperature control section 63 proceeds to step SP22.

In step SP22, the temperature control section 63 makes a determination as to whether a stoppage of operations has been commanded from, for example, the main control section 20.

If a negative result is obtained in step SP22, this result indicates that a stoppage of operations has not been commanded, because the main control section 20 is currently performing a transaction task and there is a possibility that the temperature control section 63 will be commanded to start the heating of the plural number entry operation keys 40 when a customer arrives. When this negative result is obtained in step SP22, the temperature control section 63 returns to step SP21.

Thus, the temperature control section 63 thereafter repeatedly cycles through execution of the processing of step SP21 and step SP22 until an affirmative result is obtained in either of step SP21 and step SP22.

In this manner, the temperature control section 63 waits until the start of heating of the plural number entry operation keys 40 is commanded from the main control section 20, or a stoppage of operations is commanded.

If an affirmative result is obtained in step SP21, this result indicates that the start of heating of the plural number entry operation keys 40 has been commanded by the main control section 20, because a customer has approached the ATM 1 and is facing the entry section 6. When this affirmative result is obtained in step SP21, the temperature control section 63 proceeds to step SP23.

In step SP23, the temperature control section 63 supplies the heating control currents at the regulation current value to the plural heating elements 51A to 51J to cause heat generation. Thus, the heating of the plural number entry operation keys 40 by heat generation from the plural heating elements 51A to 51J is started. Then the temperature control section 63 proceeds to step SP24.

Meanwhile, in step SP5, the main control section 20 displays the card insertion guidance screen at the display section 7, prompting the customer with the card insertion guidance screen to insert their card and bank book. Then the main control section 20 proceeds to step SP6.

Hence, in step SP6, the main control section 20 waits for the customer to at least insert a card in the card insertion and ejection aperture 8.

From step SP6, when just a card has been inserted in the card insertion and ejection aperture 8 by the customer or when a card has been inserted in the card insertion and ejection aperture 8 and a bank book has been inserted in the bank book insertion and ejection aperture 9, the main control section 20 proceeds to step SP7.

In step SP7, the main control section 20 displays the type selection guidance screen at the display section 7 in place of the card insertion guidance screen, prompting the customer with the type selection guidance screen to select a transaction type. Then the main control section 20 proceeds to step SP8.

Hence, in step SP8, the main control section 20 waits for the customer to press a particular operation key 40 of the entry section 6 to select a transaction type.

From step SP8, when a transaction type has been selected by the customer via the entry section 6, the main control section 20 proceeds to step SP9.

In step SP9, the main control section 20 makes a determination as to whether a withdrawal of banknotes has been selected as the transaction type by the customer.

If an affirmative result is obtained in step SP9, this result indicates that the customer is visiting for a withdrawal of banknotes, which requires the entry of a PIN number.

When this affirmative result is obtained in step SP9, the main control section 20 allows the temperature control section 63 to continue the heating of the plural number entry operation keys 40. Then the main control section 20 proceeds to step SP10.

In step SP10, the main control section 20 displays the PIN number entry guidance screen at the display section 7 in place of the type selection guidance screen, prompting the customer with the PIN number entry guidance screen to enter their PIN number. Then the main control section 20 proceeds to step SP11.

In step SP11, the main control section 20 waits for some of the plural number entry operation keys 40 of the entry section 6 to be pressed in sequence by the customer to enter a PIN number.

From step SP11, when some of the plural number entry operation keys 40 of the entry section 6 in the heated state are pressed in sequence by the customer and the PIN number is entered, the main control section 20 proceeds to step SP12.

Hence, in step SP12, the main control section 20 requests the authentication device to execute the identification processing described above, and the main control section 20 successively displays transaction procedure guidance screens in accordance with the banknote withdrawal processing at the display section 7, such as the amount specification guidance screen, the ongoing withdrawal process guidance screen and the like, in place of the PIN number entry guidance screen.

When the customer has taken the withdrawal banknotes and has taken the card and/or the bank book or transaction statement, the main control section 20 proceeds to step SP13.

In step SP13, the main control section 20 waits for the customer to move away from in front of the ATM 1.

From step SP13, when the main control section 20 detects, on the basis of the level of the sensor output signal obtained from the proximity sensor 23, that the customer has moved away from in front of the ATM 1, the main control section 20 proceeds to step SP14.

In step SP14, the main control section 20 commands the temperature control section 63 to end the heating of the plural number entry operation keys 40. Then the main control section 20 proceeds to step SP2.

Meanwhile, in step SP24, the temperature control section 63 that started the heating of the plural number entry operation keys 40 in step SP23 waits for the end of heating of the plural number entry operation keys 40 to be commanded by the main control section 20.

From step SP24, when the end of the heating of the plural number entry operation keys 40 is commanded by the main control section 20, because the customer has taken the withdrawal banknotes and moved away from in front of the ATM 1, the temperature control section 63 proceeds to step SP25.

In step SP25, the temperature control section 63 stops the supply of the heating control currents at the regulation current value to the plural heating elements 51A to 51J, stopping heat generation from the plural heating elements 51A to 51J.

Thus, the temperature control section 63 ends the heating of the plural number entry operation keys 40. Then the temperature control section 63 proceeds to step SP22.

Alternatively, if a negative result is obtained in the above-described step SP9, this result indicates that the customer is visiting for a deposit of banknotes, which does not require the entry of a PIN number. When this negative result is obtained in step SP9, the main control section 20 proceeds to step SP15.

In step SP15, because there is no need for entry of a PIN number for the current transaction, the main control section 20 commands the temperature control section 63 to end the heating of the plural number entry operation keys 40. Then the main control section 20 proceeds to step SP16.

At this time, in step SP24 the temperature control section 63 receives the command from the main control section 20 to end the heating of the plural number entry operation keys 40, because there is no need for entry of a PIN number for the current transaction. Then the temperature control section 63 proceeds to step SP25.

Accordingly, in step SP25 the temperature control section 63 ends the heating of the plural number entry operation keys 40 in the same manner as described above. Then the temperature control section 63 proceeds to step SP22.

In step SP16, the main control section 20 successively displays transaction procedure guidance screens in accordance with the banknote deposit processing at the display section 7 in place of the type selection guidance screen as described above, such as the banknote insertion guidance screen, the ongoing counting guidance screen and the like.

When the deposit of banknotes is complete and the customer has taken the card and/or the bank book or transaction statement, the main control section 20 proceeds to step SP17.

Hence, in step SP17, the main control section 20 waits for the customer to move away from in front of the ATM 1. When the main control section 20 detects, on the basis of the level of the sensor output signal obtained from the proximity sensor 23, that the customer has moved away from in front of the ATM 1, the main control section 20 proceeds to step SP2.

If the main control section 20 again obtains a negative result in step SP2, the main control section 20 returns to step SP1. In this manner, the main control section 20 thereafter repeatedly cycles through execution of the processing from step SP1 to step SP17 each time a customer visits for a transaction, until an affirmative result is obtained in step SP2.

After executing the processing of step SP25, the temperature control section 63 proceeds to step SP22. If the temperature control section 63 again obtains a negative result in step SP22, the temperature control section 63 returns to step SP21.

Hence, the temperature control section 63 thereafter repeatedly cycles through execution of the processing from step SP21 to step SP25 in accordance with commands from the main control section 20 each time a customer visits for a transaction, until an affirmative result is obtained in step SP22.

Thus, each time a customer visits in order to perform a withdrawal transaction, the main control section 20 and the temperature control section 63 may allow pressing operations of the plural number entry operation keys 40 and entry of a PIN number in a state in which the plural number entry operation keys 40 have been heated and all of the respective operation surfaces 40A have risen to the target temperature that is substantially equal to the temperature of the fingertips of a human hand.

When an affirmative result is obtained in the above-described step SP2, this result indicates that a stoppage of operations has been commanded by operation staff from outside the ATM 1, in association with the end of transaction operations, the performance of maintenance or the like.

When this affirmative result is obtained in step SP2, the main control section 20, for example, commands the temperature control section 63 to stop operations, and then proceeds to step SP18 and ends the first transaction guidance processing routine RT1.

Further, when an affirmative result is obtained in the above-described step SP22, this result indicates that the temperature control section 63 has been commanded by the main control section 20 to stop operations in association with a stoppage of operations of the main control section 20.

When this affirmative result is obtained in step SP22, the temperature control section 63 proceeds to step SP26 and ends the first temperature change processing routine RT2.

In this manner, the main control section 20 and the temperature control section 63 completely stop the first PIN number entry processing sequence that is constituted by the first transaction guidance processing routine RT1 and the first temperature change processing routine RT2.

(1-6) Operation and Effects of the First Embodiment

In the ATM 1 with the structure described above, the entry section 6 that includes the number entry operation keys 40 that can be pressed for use in the entry of a PIN number is provided with the plural heating elements 51A to 51J for heating the plural number entry operation keys 40.

When a PIN number is to be entered by a customer at the ATM 1, the plural heating elements 51A to 51J are caused to generate heat and heat up the plural number entry operation keys 40, as result of which all of the operation surfaces 40A of the plural number entry operation keys 40 are respectively raised to a target temperature that is substantially equal to the temperature of the fingertips of a human hand.

Thus, in the ATM 1, even when the plural number entry operation keys 40 are pressed in sequence by a customer for the entry of a PIN number, the temperatures of the operation surfaces 40A that are touched by the fingertips of the hand barely change in temperature and may be kept equal to the temperatures of the operation surfaces 40A that are not touched by the fingertips of the hand.

Therefore, even if the temperatures of the operation surfaces 40A of the plural number entry operation keys 40 are sensed by a third party using thermography when the plural number entry operation keys 40 have been pressed in sequence by a customer for the entry of their PIN number, the ATM 1 may make it not possible to determine from the sensed temperatures of the operation surfaces 40A which of the number entry operation keys 40 have been pressed.

According to the structure described above, the ATM 1 is provided with the plural heating elements 51A to 51J at the entry section 6 that includes the plural number entry operation keys 40 which can be pressed for the entry of a PIN number. Thus, when a PIN number is to be entered by a customer, the plural heating elements 51A to 51J are caused to generate heat and heat up the plural number entry operation keys 40, and the temperatures of the operation surfaces 40A of the plural number entry operation keys 40 are respectively raised to the target temperature that is substantially equal to the temperature of the fingertips of a hand.

Thus, even if the temperatures of the operation surfaces 40A of the plural number entry operation keys 40 are sensed by a third party using thermography, for example, over a customer's shoulder when the plural number entry operation keys 40 have been pressed in sequence by the customer for the entry of their PIN number, the ATM 1 may make it not possible to determine from the sensed temperatures of the operation surfaces 40A which of the number entry operation keys 40 have been pressed. Therefore, the ATM 1 may prevent the illegitimate acquisition of PIN numbers using thermography.

Furthermore, the ATM 1 starts the heating of the plural number entry operation keys 40 when the ATM 1 detects, via the proximity sensor 23, that a customer has approached the ATM 1 and is facing the entry section 6.

After starting the heating of the plural number entry operation keys 40, the ATM 1 allows the customer to check transaction procedures through transaction procedure guidance screens displayed at the display section 7 while the customer is inserting a card and then selecting a transaction type, and thereafter the ATM 1 allows the customer to enter a PIN number.

Therefore, the ATM 1 may assure a heating duration, from the start of the heating of the plural number entry operation keys 40 until the PIN number is entered, in which the temperatures of the operation surfaces 40A of the plural number entry operation keys 40 may be raised to the target temperature.

That is, while sequentially following through the procedures required for the transaction, the ATM 1 may raise the temperatures of the operation surfaces 40A of the plural number entry operation keys 40 to the target temperature in this duration, rather than causing a customer who is visiting for a withdrawal of banknotes to unnecessarily wait for the heating of the plural number entry operation keys 40 before entering the PIN number.

The ATM 1 heats the plural number entry operation keys 40 while the PIN number is being entered by a customer, and continues heating the plural number entry operation keys 40 for some time after the entry of the PIN number, until the ATM 1 detects via the proximity sensor 23 that the customer, having taken withdrawn banknotes, has moved away from in front of the ATM 1.

Thus, when the plural number entry operation keys 40 have been pressed by the customer and the PIN number has been entered, even if the temperatures of contact areas of the operation surfaces 40A of the number entry operation keys 40 that have been pressed by the fingerprints of the hand change a little, the ATM 1 may quickly eliminate this temperature change, returning to the state before the change.

According to the present structure, if, for example, a third party uses thermography to sense the temperatures of the operation surfaces 40A of the plural number entry operation keys 40 just after a customer who has entered a PIN number has taken withdrawn banknotes and moved away from in front of the ATM 1, the ATM 1 may make it almost certainly not possible to identify the number entry operation keys 40 that have been pressed from the sensed temperatures of the operation surfaces 40A and may prevent illegitimate acquisition of the PIN number.

Even though the ATM 1 starts the heating of the plural number entry operation keys 40 in response to a customer facing the entry section 6, if a deposit of banknotes, which does not require the entry of a PIN number, is thereafter selected by the customer as the transaction type, the ATM 1 ends the heating of the plural number entry operation keys 40 at that moment.

Therefore, even though the heating of the plural number entry operation keys 40 is started in response to a customer facing the entry section 6, if a deposit of banknotes is selected by that customer, the ATM 1 may prevent subsequent unnecessary heating of the plural number entry operation keys 40 and an increase in power consumption.

(2) Second Embodiment

(2-1) External Structures of the ATM

Figure 9:
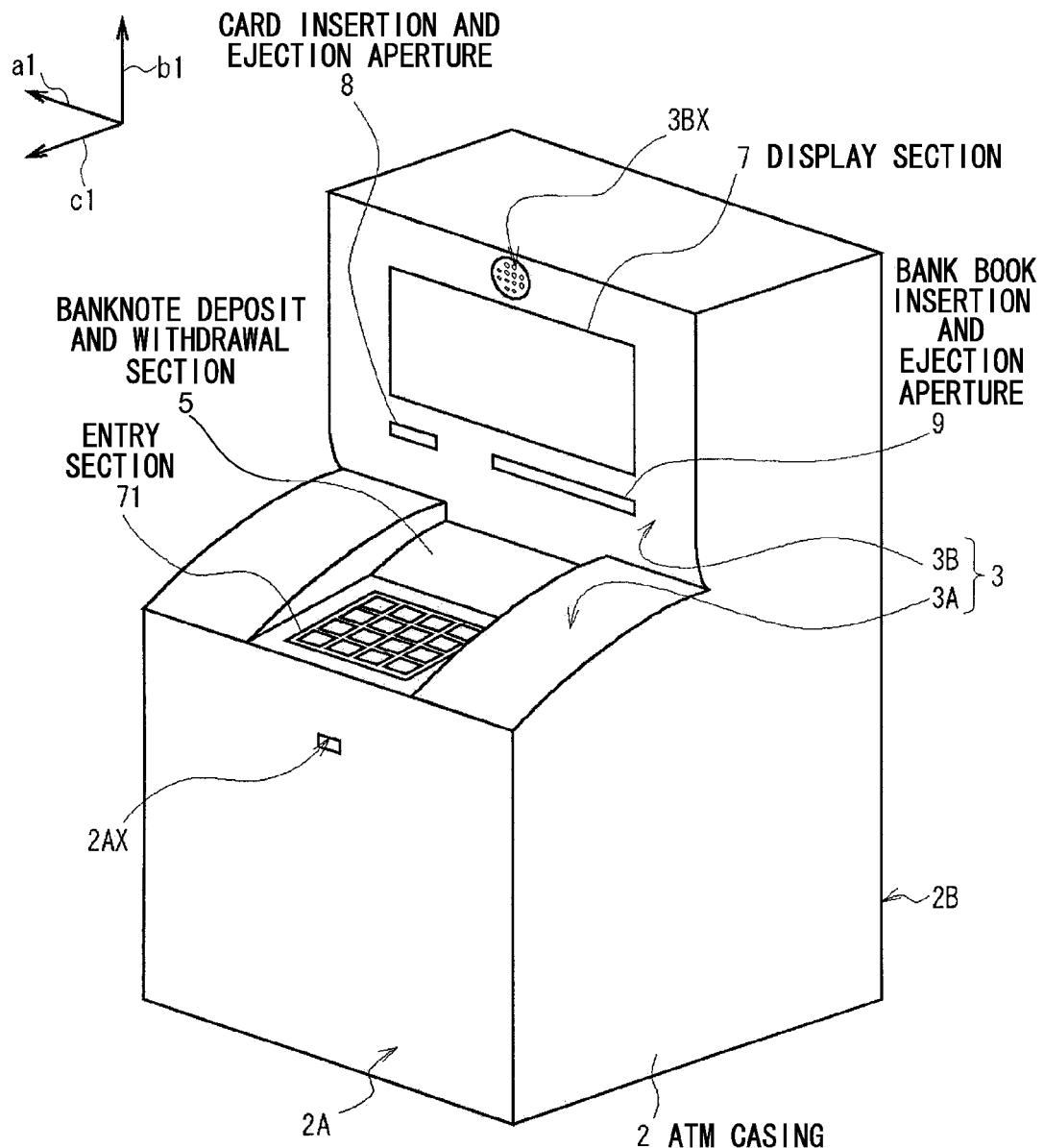
FIG. 9 is a schematic perspective view showing external structures of an ATM in accordance with a second embodiment.

FIG. 9 shows an ATM 70 in accordance with a second embodiment, with the same reference symbols assigned to portions that correspond with FIG. 1. The ATM 70 according to the second embodiment is, for example, installed on a street with a portion of the ATM casing 2 embedded in an outer wall of a building.

That is, the ATM 70 according to the second embodiment is installed outdoors, where changes in the surrounding temperature are larger than indoors.

Accordingly, as described below, the ATM 70 according to the second embodiment is provided with an entry section 71 with a different internal structure from the entry section 6 according to the first embodiment.

The ATM 70 according to the second embodiment has the same external structures as the ATM 1 according to the first embodiment. Therefore, descriptions of the external structures of the ATM 70 according to the second embodiment are not given.

(2-2) Internal Structures of the ATM

Figure 10:
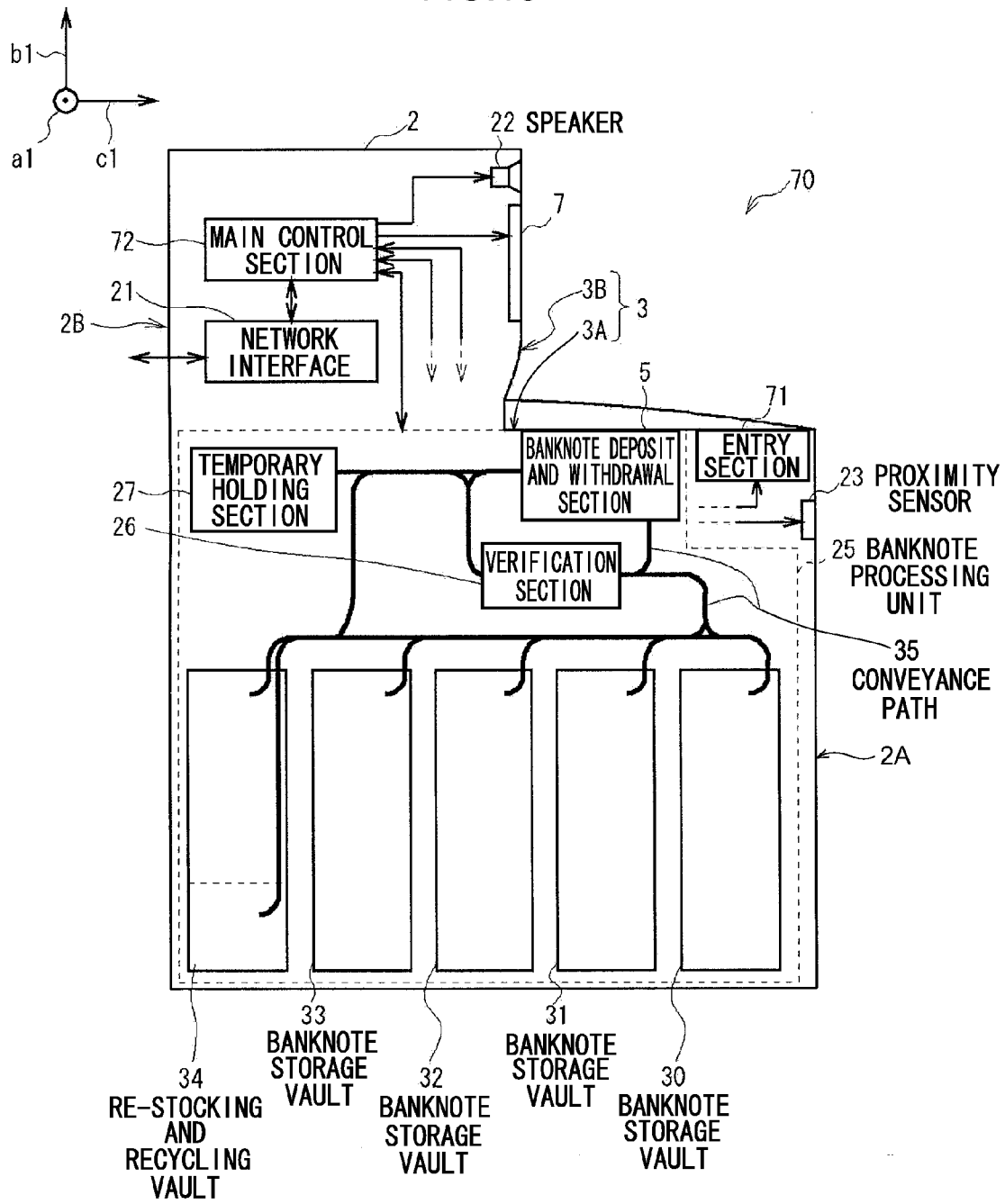
FIG. 10 is a schematic side view showing internal structures of the ATM in accordance with the second embodiment.

Now, internal structures of the ATM 70 according to the second embodiment are described using FIG. 10, with the same reference symbols assigned to portions that correspond with FIG. 2.

As shown in FIG. 10, the ATM 70 has the same internal structures as the ATM 1 according to the first embodiment, except in being provided with the entry section 71 that is different from the entry section 6 according to the first embodiment and being provided with a main control section 72 that executes processing that is different in parts from the main control section 20 according to the first embodiment.

In this embodiment, when banknotes are being withdrawn and deposited, the main control section 72 executes withdrawal processing and deposit processing that are similar to the withdrawal processing and deposit processing described above for the first embodiment, by control of the banknote processing unit 25.

Moreover, when banknotes are being re-stocked and recovered, the main control section 72 executes re-stocking processing and recovery processing that are similar to the re-stocking processing and recovery processing described above for the first embodiment, by control of the banknote processing unit 25.

During operations, the main control section 72 executes second transaction guidance processing, which is partially different from the first transaction guidance processing described above for the first embodiment, by controlling the network interface 21, the entry section 71, the display section 7, the speaker 22 and the proximity sensor 23 in accordance with a second transaction guidance processing program that is memorized in advance in the internal memory.

That is, during the execution of the second transaction guidance processing, the same as in the first transaction guidance processing, the main control section 72 guides customers through transaction procedures in the same sequences each time a customer visits.

During the execution of the second transaction guidance processing, the same as in the first transaction guidance processing, the main control section 72 controls the entry section 71 and heats the plural number entry operation keys 40 each time a customer visits.

However, when the outside air temperature, which is the temperature of the vicinity of the ATM 70, is relatively low, due to winter cold or the like, the temperatures of the unheated operation surfaces 40A of the plural number entry operation keys 40 are affected by the outside air temperature and are uniformly relatively low.

In the entry section 71, if, for example, heating control currents with a constant current value are continuously supplied to the plural heating elements 51A to 51J to generate heat in order to heat the plural number entry operation keys 40, then the lower the temperatures of the operation surfaces 40A relative to the target temperature when the heating starts, the longer a heating duration from the start of heating until the temperatures of the operation surfaces 40A rise to the target temperature will be.

Accordingly, during the execution of the second transaction guidance processing, the processing that is partially different from the first transaction guidance processing is that, if a withdrawal of banknotes is selected by a customer as the transaction type, the main control section 72 checks that the temperatures of the operation surfaces 40A of the plural number entry operation keys 40 have risen to the target temperature, and only then allows the customer to enter the PIN number.

In practical terms, the main control section 72 displays a transaction type guidance screen at the display section 7, and if the customer presses an operation key of the entry section 6 to select a withdrawal of banknotes as the transaction type, the main control section 72 sends a query to the entry section 71 about a state of changes in the temperatures of the operation surfaces 40A of the plural number entry operation keys 40 (which is hereinafter referred to as a temperature change state).

When the entry section 71 receives the temperature change state query from the main control section 72, as described below, the entry section 71 senses the temperatures of the operation surfaces 40A of the plural number entry operation keys 40.

Then, when the temperatures of the operation surfaces 40A of all of the plural number entry operation keys 40 have risen to the target temperature, the entry section 71 reports to the main control section 72 that the temperatures of the operation surfaces 40A have risen to the target temperature.

When the main control section 72 is informed by the entry section 71 that the temperatures of the operation surfaces 40A of the plural number entry operation keys 40 have risen to the target temperature, similarly to the first embodiment described above, the main control section 72 sends the PIN number entry guidance screen data to the display section 7 to replace the type selection guidance screen data.

Thus, in place of the type selection guidance screen, the main control section 72 displays the PIN number entry guidance screen at the display section 7, prompting the customer to enter their PIN number.

On the other hand, if the result of the sensing of the temperatures of the operation surfaces 40A of the plural number entry operation keys 40 in response to the temperature change state query from the main control section 72 is that the temperature of one or more of the operation surfaces 40A of the plural number entry operation keys 40 is lower than the target temperature, the entry section 71 reports to the main control section 72 that the temperatures of the operation surfaces 40A have not yet risen to the target temperature.

When the main control section 72 is notified by the entry section 71 that the temperatures of the operation surfaces 40A of the plural number entry operation keys 40 have not yet risen to the target temperature, the main control section 72 sends to the display section 7, to replace the type selection guidance screen data, from among the plural sets of transaction procedure guidance screen data memorized in advance in the internal memory, transaction procedure guidance screen data of, for example, a transaction procedure guidance screen for prompting the customer to wait in front of the ATM 70 (that is, in front of the entry section 71).

In the descriptions below, the transaction procedure guidance screen for prompting waiting in front of the ATM 70 is referred to as "the waiting guidance screen", and the transaction procedure guidance screen data of the waiting guidance screen is referred to as "the waiting guidance screen data".

Thus, in place of the type selection guidance screen, the main control section 72 displays the waiting guidance screen at the display section 7 in accordance with the waiting guidance screen data, including a guidance text such as, for example, "Please wait a moment.", prompting the customer to wait in front of the ATM 70.

When the main control section 72 is informed by the entry section 71 that the temperatures of the operation surfaces 40A of the plural number entry operation keys 40 have not risen to the target temperature, a predetermined duration after that moment (for example, a duration of the order of several milliseconds), the main control section 72 sends a temperature change state query to the entry section 71 again.

Accordingly, when the entry section 71 receives the repeated temperature change state query from the main control section 72, the entry section 71 senses the temperatures of the operation surfaces 40A of the plural number entry operation keys 40 in the same manner as described above.

Then, depending on the sensing results, the entry section 71 reports to the main control section 72 that the temperatures of the operation surfaces 40A of the plural number entry operation keys 40 have not risen to the target temperature or that the temperatures of the operation surfaces 40A of the plural number entry operation keys 40 have risen to the target temperature.

If the main control section 72 is notified by the entry section 71 that the result of the repeated temperature change state query is that the temperatures of the operation surfaces 40A of the plural number entry operation keys 40 have not risen to the target temperature, the main control section 72 continues the display of the waiting guidance screen at the display section 7.

Then, the predetermined duration after this moment when the main control section 72 is notified by the entry section 71 that the temperatures of the operation surfaces 40A of the plural number entry operation keys 40 have not risen to the target temperature, the main control section 72 yet again sends a temperature change state query to the entry section 71.

Thus, the main control section 72 sends a temperature change state query to the entry section 71 when a withdrawal of banknotes is selected by the customer as the transaction type, and if it is reported that the temperatures of the operation surfaces 40A of the plural number entry operation keys 40 have not risen to the target temperature, the main control section 72 thereafter periodically sends temperature change state queries to the entry section 71 until it is reported by the entry section 71 that the temperatures of the operation surfaces 40A have risen to the target temperature.

Meanwhile, when the entry section 71 receives a temperature change state query from the main control section 72, the entry section 71 senses the temperatures of the operation surfaces 40A of the plural number entry operation keys 40 at that moment in the same manner as described above, and responds to the main control section 72 in accordance with the sensing results.

The main control section 72 sends temperature change state queries to the entry section 71 a number of times, and when it is reported by the entry section 71 that the temperatures of the operation surfaces 40A of the plural number entry operation keys 40 have risen to the target temperature, the main control section 72 sends to the display section 7, to replace the waiting guidance screen data, the PIN number entry guidance screen data.

Thus, in place of the waiting guidance screen, the main control section 72 displays the PIN number entry guidance screen at the display section 7, prompting the customer to enter their PIN number.

In this manner, when a withdrawal of banknotes has been selected as the transaction type by the customer, the main control section 72 prompts the customer to press the plural number entry operation keys 40 in sequence by touching the fingertips of their hand against the operation surfaces 40A only after the temperatures of the operation surfaces 40A of the plural number entry operation keys 40 have all risen to the target temperature.

Therefore, even if heating the plural number entry operation keys 40 and raising the temperatures of the operation surfaces 40A to the target temperature requires a relatively long duration, the main control section 72 avoids the plural number entry operation keys 40 being pressed to enter the PIN number while the temperatures of the operation surfaces 40A are lower than the target temperature, and prevents significant changes in the temperatures of the operation surfaces 40A being caused by contact with the fingertips of the hand.

Furthermore, if the temperatures of the respective operation surfaces 40A of the plural number entry operation keys 40 have not risen to the target temperature when a withdrawal of banknotes is selected as the transaction type by the customer, the main control section 72 sends temperature change state queries to the entry section 71 at exceptionally short intervals.

Therefore, when the temperatures of the respective operation surfaces 40A of the plural number entry operation keys 40 have risen to the target temperature, the fact that the temperatures of the operation surfaces 40A have risen to the target temperature may be immediately sensed by the entry section 71 and reported to the main control section 72, and the main control section 72 may switch the display at the display section 7 from the waiting guidance screen to the PIN number entry guidance screen in response to this report.

Thus, although the main control section 72 makes the customer wait if the temperatures of the respective operation surfaces 40A of the plural number entry operation keys 40 have not risen to the target temperature when a withdrawal of banknotes is selected as the transaction type by the customer, the duration of waiting may be made substantially equal to the duration from when the first temperature change state query is sent to the entry section 71 until when the temperatures of the respective operation surfaces 40A of the plural number entry operation keys 40 have risen to the target temperature.

That is, cases of a customer being unnecessarily made to wait before entering the PIN number even when the temperatures of the operation surfaces 40A of the plural number entry operation keys 40 have risen to the target temperature may be avoided.

(2-3) External Structures and Internal Structures of the Entry Section

The entry section 71 differs from the entry section 6 according to the first embodiment as described above (FIG. 3) only in internal structures, having the same external structures as the entry section 6 according to the first embodiment.

Therefore, external structures of the entry section 71 according to the second embodiment are not described; the external structures of the entry section 6 according to the above-described first embodiment in FIG. 3 should be referred to.

The internal structures of the entry section 71 are described below, using FIG. 11 in which the same reference numerals are assigned to portions that correspond with FIG. 4.

Figure 11:
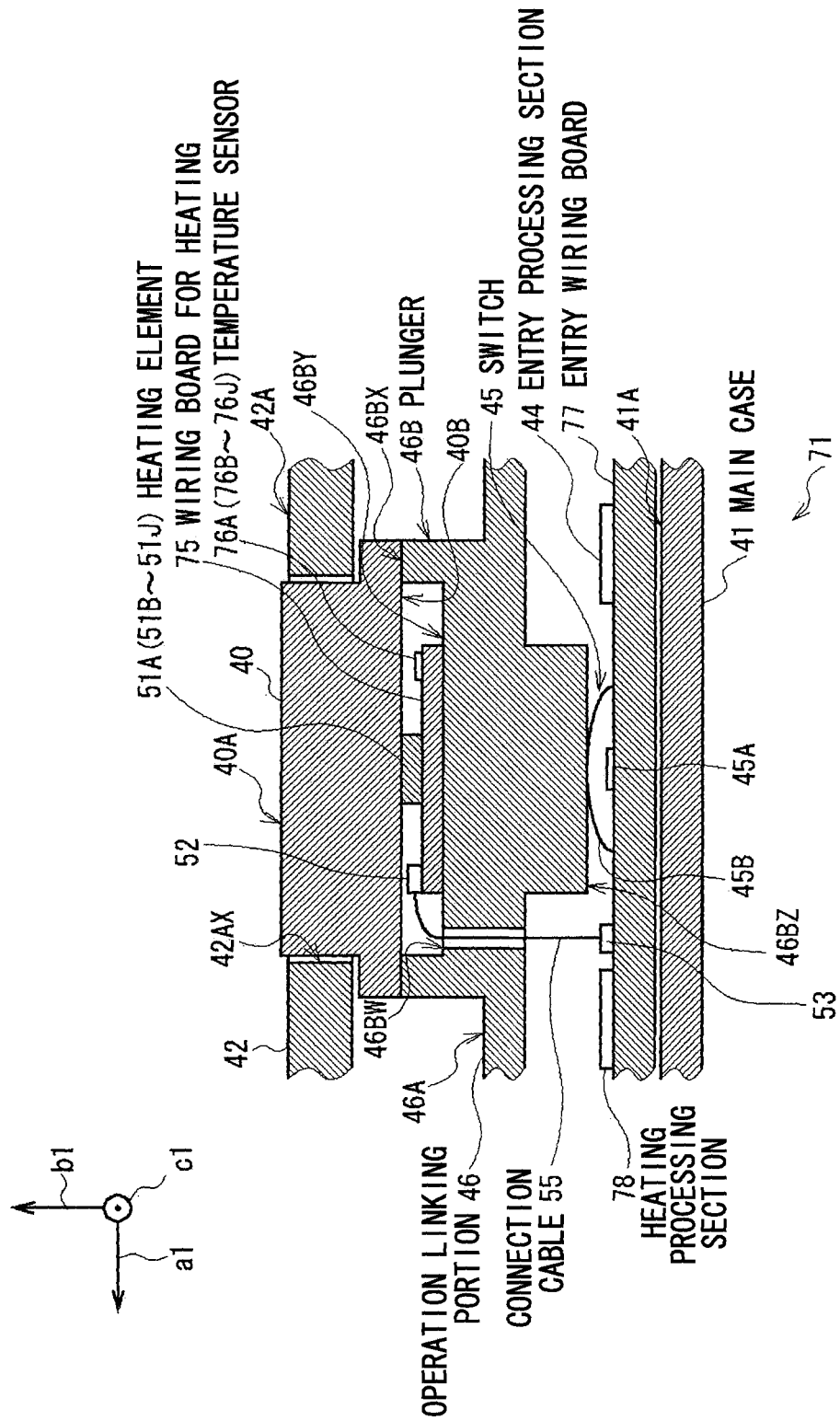
FIG. 11 is a schematic sectional view showing internal structures of an entry section in accordance with the second embodiment.

As shown in FIG. 11, at the plural number entry plungers 46B of the operation linking portion 46 in the entry section 71, a heating wiring board 75 is disposed at a central portion of the interior of each circuit board arrangement recess portion 46BY.

The heating elements 51A to 51J are mounted at central portions of respective one faces of the plural heating wiring boards 75, and surfaces of the heating elements 51A to 51J are caused to touch against the central portions of the key lower faces 40B of the corresponding operation keys 40.

Temperature sensors 76A to 76J structured by thermistors are mounted at the respective one faces of the plural heating wiring boards 75. The temperature sensors 76A to 76J are mounted as surface-mounted components at, for example, predetermined positions of edge portions of the one faces. The temperature sensors 76A to 76J are for sensing the temperatures of the operation surfaces 40A of the plural number entry operation keys 40.

The heating board side connectors 52 are mounted at, for example, predetermined positions of an edge portion of the one face of each of the plural heating wiring boards 75.

Conductive wiring (not shown in the drawings) is formed in predetermined patterns at the respective one faces of the plural heating wiring boards 75.

Thus, at the plural heating wiring boards 75, the respective heating elements 51A to 51J are electronically connected to the heating board side connectors 52 via the conductive wiring, and the temperature sensors 76A to 76J are also electronically connected to the heating board side connectors 52 via the conductive wiring.

A heating processing section 78 structured by, for example, a microcomputer, is mounted as a surface-mounted component at one face of an entry wiring board 77. The heating processing section 78 causes the plural heating elements 51A to 51J to generate heat, thus heating the plural number entry operation keys 40.

The heating processing section 78 at the entry wiring board 77 is electronically connected with the entry board side connectors 53 via conductive wiring (not shown in the drawings) that is formed in a predetermined pattern at the entry wiring board 77.

Thus, the entry wiring board 77 has the same structure as the entry wiring board 43 of the entry section 6 according to the first embodiment except that the heating processing section 78, which has a different circuit structure from the heating processing section 54 of the entry section 6 according to the first embodiment, is mounted at the entry wiring board 77.

Further, similarly to the entry section 6 according to the first embodiment, the plural entry board side connectors 53 are mechanically and electronically connected with the corresponding heating board side connectors 52 of the heating wiring boards 75 via the respective connection cables 55.

Thus, the heating processing section 78 of the entry section 71 is electronically connected to the plural heating elements 51A to 51J and to the plural temperature sensors 76A to 76J via, in order, the plural entry board side connectors 53, the plural connection cables 55 and the plural heating board side connectors 52.

When a PIN number is to be entered by a customer, under the control of the main control section 72, the heating processing section 78 of the entry section 71 heats the plural number entry operation keys 40, by supplying the heating control currents at the regulation current value to the plural heating elements 51A to 51J and causing the plural heating elements 51A to 51J to generate heat.

During the heating of the plural number entry operation keys 40, when a temperature change state query is sent from the main control section 72 as described above, the heating processing section 78 senses the temperatures of the operation surfaces 40A of the plural number entry operation keys 40 at that moment, via the plural temperature sensors 76A to 76J.

Then, on the basis of the sensing results, the heating processing section 78 reports to the main control section 72 that the temperatures of the operation surfaces 40A of the plural number entry operation keys 40 have not risen to the target temperature or that the temperatures of the operation surfaces 40A of the plural number entry operation keys 40 have risen to the target temperature.

However, when the heating processing section 78 has sensed the temperatures of the operation surfaces 40A of the plural number entry operation keys 40, if the sensed temperatures are lower than the target temperature, then the heating processing section 78 makes the current values of the heating control currents being supplied to the plural heating elements 51A to 51J larger than the regulation current value.

Thus, the heating processing section 78 increases heat generation amounts from the plural heating elements 51A to 51J and accelerates the rise in temperatures of the operation surfaces 40A of the plural number entry operation keys 40.

Therefore, even if the temperatures of the respective operation surfaces 40A of the plural number entry operation keys 40 are uniformly relatively low, the heating processing section 78 raises the temperatures of the respective operation surfaces 40A of the plural number entry operation keys 40 to the target temperature in a very short duration.

If the heating processing section 78 has made the current values of the heating control currents supplied to the plural heating elements 51A to 51J larger than the regulation current value, then when the temperatures of the operation surfaces 40A of the plural number entry operation keys 40 have risen to the target temperature, the heating processing section 78 returns the current values of the heating control currents supplied to the plural heating elements 51A to 51J to the original regulation current value.

Thus, the heating processing section 78 keeps the temperatures of the respective operation surfaces 40A of the plural number entry operation keys 40 substantially constant at the target temperature, and prevents a difference from the temperature of the fingertips of a hand increasing significantly.

Hence, when the temperatures of the respective operation surfaces 40A of the plural number entry operation keys 40 of the plural number entry operation keys 40 have risen to the target temperature, the same as in the first embodiment described above, the plural number entry operation keys 40 may be pressed by the operation surfaces 40A at the target temperature being touched by the fingertips of a hand and a PIN number may be entered.

Therefore, the same as in the first embodiment described above, when some of the plural number entry operation keys 40 are pressed by a customer and a PIN number is entered, the heating processing section 78 may prevent the temperatures of the operation surfaces 40A of the number entry operation keys 40 that have been pressed at this time changing to be different from the temperatures of the operation surfaces 40A of the number entry operation keys 40 that have not been pressed.

Therefore, when a PIN number is entered by a customer, even if temperatures of the operation surfaces 40A of the plural number entry operation keys 40 are sensed by a third party using thermography, the heating processing section 78 may make it not possible to identify the number entry operation keys 40 that have been pressed to enter the PIN number and the sequence of pressing operations of these number entry operation keys 40.

(2-4) Structure of the Temperature Changing Unit

Figure 12:
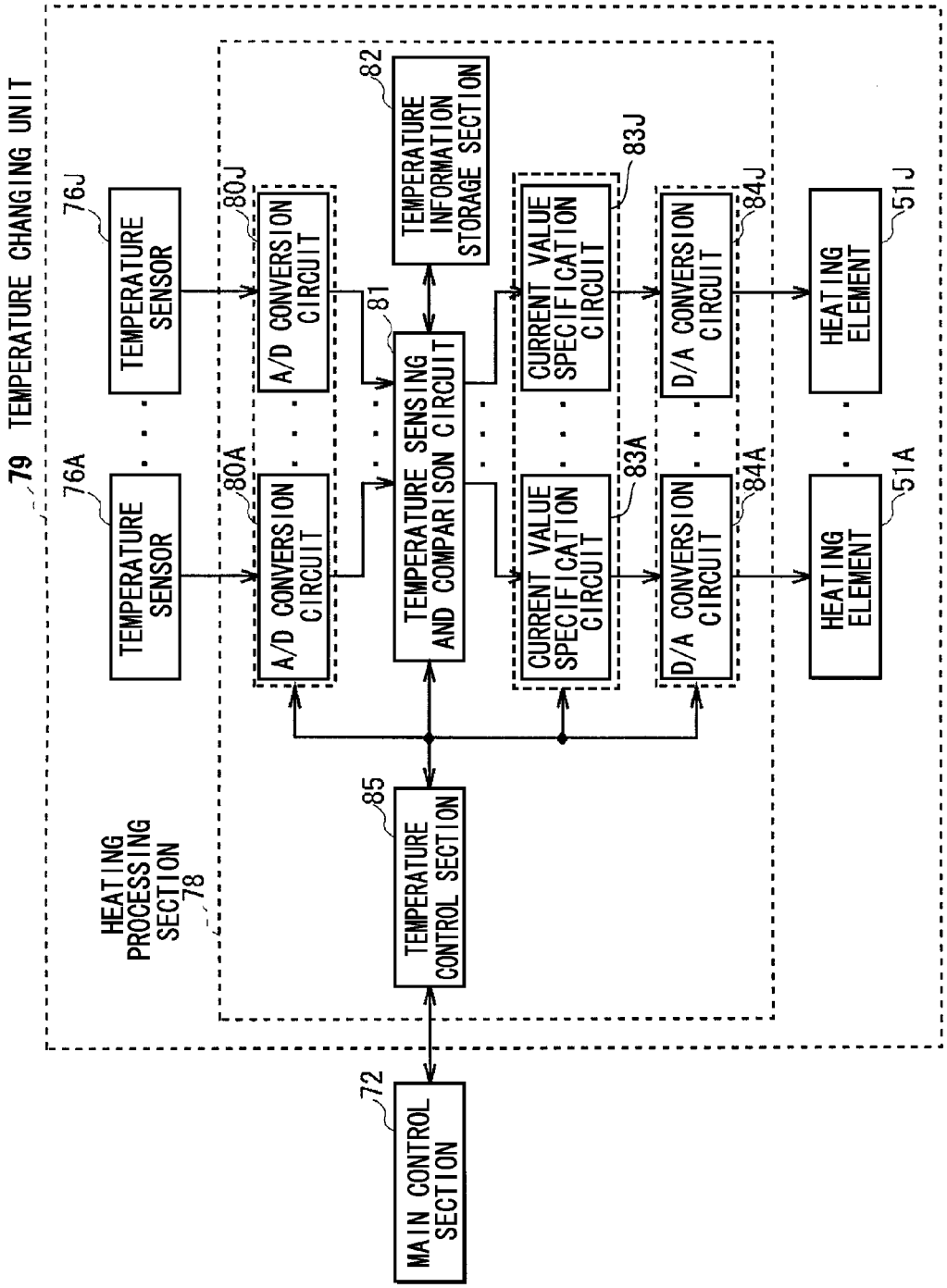
FIG. 12 is a block diagram showing the structure of a temperature changing unit in accordance with the second embodiment.

Now, the structure of a temperature changing unit 79 is described in specific detail using FIG. 12. The temperature changing unit 79 is constituted by the plural heating elements 51A to 51J, the heating processing section 78 and the temperature sensors 76A to 76J. The temperature changing unit 79 is for changing the temperatures of the operation surfaces 40A of the plural number entry operation keys 40 via the plural heating elements 51A to 51J in the entry section 71 to make the temperatures substantially equal when the plural number entry operation keys 40 are to be pressed by a customer to enter a PIN number.

In this embodiment, the heating processing section 78 is provided with analog-to-digital conversion circuits 80A to 80J in the same number as the number of the plural temperature sensors 76A to 76J, in correspondence with the plural temperature sensors 76A to 76J (that is, in correspondence with the plural number entry operation keys 40).

The heating processing section 78 is also provided with a temperature sensing and comparison circuit 81 that senses actual temperatures of the operation surfaces 40A of the plural number entry operation keys 40 (hereinafter referred to as "the actual operation surface temperatures"), on the basis of temperature sensing results from the plural temperature sensors 76A to 76J, and compares the actual operation surface temperatures with the target temperature.

The heating processing section 78 is further provided with a temperature information storage section 82 that stores temperature information to be used in processing by the temperature sensing and comparison circuit 81. This processing senses and compares the actual operation surface temperatures and is (hereinafter referred to as "the temperature sensing and comparison processing").

The heating processing section 78 is also provided with current value specification circuits 83A to 83J and digital-to-analog conversion circuits 84A to 84J in the same number as the number of the plural heating elements 51A to 51J, in correspondence with the plural heating elements 51A to 51J (that is, in correspondence with the plural number entry operation keys 40).

The heating processing section 78 is also provided with a temperature control section 85 that oversees and controls the heating processing section 78 as a whole, under the control of the main control section 72.

The temperature control section 85 executes second temperature change processing in accordance with, for example, a second temperature change processing program that is memorized in advance in the internal memory, by controlling respective blocks of the plural current value specification circuits 83A to 83J, the plural digital-to-analog conversion circuits 84A to 84J and the like.

The plural temperature sensors 76A to 76J sense the temperatures, for example, while the entry section 71 is operating, and output temperature sensing signals with current values corresponding to the sensed temperatures.

In this embodiment, as can be seen in FIG. 11, the temperature sensors 76A to 76J are disposed inside the circuit board arrangement recess portions 46BY of the number entry plungers 46B that are closed off by the key lower faces 40B of the operation keys 40, such that respective temperature sensing accuracies of the temperature sensors 76A to 76J are not reduced due to being affected by the temperature of the vicinity of the ATM 70.

However, the plural temperature sensors 76A to 76J are separated from the key lower faces 40B of the respectively corresponding number entry operation keys 40, and do not directly sense the temperatures of the operation surfaces 40A of the number entry operation keys 40.

Accordingly, as the temperature information, the temperature information storage section 82 stores, for example, a data table for each of the temperature sensors 76A to 76J in advance, for sensing the actual operation surface temperatures of the corresponding number entry operation keys 40 on the basis of the temperatures sensed by the temperature sensors 76A to 76J. As further temperature information, the temperature information storage section 82 also stores target temperature information representing the target temperature in advance.

In the following descriptions, the data tables for sensing the actual operation surface temperatures of the corresponding number entry operation keys 40 on the basis of temperatures sensed by the temperature sensors 76A to 76J are referred to as "the temperature sensing tables".

The temperature sensing table for each of the temperature sensors 76A to 76J is created by associating a variety of sensed temperatures of the temperature sensors 76A to 76J with actual operation surface temperatures of the corresponding operation keys 40.

In the entry section 71, as an example, temperature differences between the actual operation surface temperatures and the target temperature are demarcated into a number of ranges (which are hereinafter respectively referred to as "temperature difference ranges"), with it being assumed that, when a temperature difference occurs, the actual operation surface temperature of the operation key 40 is lower than the target temperature.

In the entry section 71, for each temperature difference range, a current value for heat generation at the heating elements 51A to 51J is selected in advance in accordance with the temperature differences in that temperature difference range. These current values (which are hereinafter referred to as "variable current values") are different from the regulation current value.

The variable current value for each temperature difference range is specified such that, for example, the larger the temperature differences in that temperature difference range, the larger the variable current value, so as to increase amounts of heat generated at the heating elements 51A to 51J.

The plural current value specification circuits 83A to 83J store the regulation current value in advance, and associate and store the plural temperature difference ranges and the plural variable current values in advance.

When the temperature control section 85 of the heating processing section 78 executes the second temperature change processing in accordance with the present structure, the temperature control section 85 waits for the start of heating of the plural number entry operation keys 40 to be commanded by the main control section 72.

When the start of heating of the plural number entry operation keys 40 is commanded from the main control section 72, the temperature control section 85 operates the plural current value specification circuits 83A to 83J and digital-to-analog conversion circuits 84A to 84J in response.

At this time, the plural current value specification circuits 83A to 83J initialize specified current values of the heating control currents for causing the respectively corresponding heating elements 51A to 51J to generate heat to the regulation current value that was stored beforehand.

Hence, on the basis of the initialized regulation current values, the plural current value specification circuits 83A to 83J generate heating control data for levels in accordance with the regulation current value and send the generated heating control data to the corresponding digital-to-analog conversion circuits 84A to 84J.

Then the plural digital-to-analog conversion circuits 84A to 84J generate heating control currents at the regulation current value by applying digital-to-analog conversion processing to the heating control data provided from the corresponding current value specification circuits 83A to 83J, and supply the generated heating control currents to the corresponding heating elements 51A to 51J.

Thus, the temperature control section 85 causes the plural heating elements 51A to 51J to generate heat with the respective heating control currents at the regulation current value and heats the plural number entry operation keys 40 with the heat generated at the plural heating elements 51A to 51J.

If there is a temperature change state query from the main control section 72 during the heating of the plural number entry operation keys 40, the temperature control section 85 additionally operates the plural analog-to-digital conversion circuits 80A to 80J, the temperature sensing and comparison circuit 81 and the temperature information storage section 82 at that moment.

When the plural analog-to-digital conversion circuits 80A to 80J operate in response to a temperature change state query, the plural analog-to-digital conversion circuits 80A to 80J generate sensed temperature data with levels corresponding to temperatures sensed by the respectively corresponding temperature sensors 76A to 76J, by reading the temperature sensing signals outputted from the temperature sensors 76A to 76J and applying analog-to-digital conversion processing thereto.

When the temperature sensing and comparison circuit 81 operates in response to the temperature change state query, the temperature sensing and comparison circuit 81 applies temperature sensing and comparison processing to each of the plural number entry operation keys 40 in time divisions, sequentially reading sensed temperature data from one of the plural analog-to-digital conversion circuits 80A to 80J in each execution of the temperature sensing and comparison processing.

When the temperature sensing and comparison circuit 81 executes the temperature sensing and comparison data and reads the sensed temperature data from one or other of the analog-to-digital conversion circuits 80A to 80J, the temperature sensing and comparison circuit 81 senses the actual operation surface temperature of the number entry operation key 40 on the basis of the sensed temperature data and the corresponding temperature sensing table stored by the temperature information storage section 82.

The temperature sensing and comparison circuit 81 then compares the sensed actual operation surface temperature with the target temperature that is stored as the target temperature information by the temperature information storage section 82.

Hence, if the actual operation surface temperature is lower than the target temperature, there is a need for the temperature sensing and comparison circuit 81 to accelerate the rise in the temperature of the operation surface 40A of the number entry operation key 40. Accordingly, the temperature sensing and comparison circuit 81 subtracts the actual operation surface temperature from the target temperature to detect a temperature difference (that is, the temperature difference between the actual operation surface temperature and the target temperature).

Then the temperature sensing and comparison circuit 81 sends temperature difference data representing the detected temperature difference to the corresponding one of the current value specification circuits 83A to 83J, and also sends the temperature difference data to the temperature control section 85.

On the other hand, if the result of comparing the actual operation surface temperature with the target temperature is that the actual operation surface temperature is equal to or higher than the target temperature, there is no need to accelerate the rise in temperature of the operation surface 40A of the number entry operation key 40. Therefore, the temperature sensing and comparison circuit 81 generates temperature data presenting 0° C. as the temperature difference, and sends this temperature difference data to the corresponding one of the current value specification circuits 83A to 83J and to the temperature control section 85.

In this manner, each time the temperature sensing and comparison circuit 81 successively executes the temperature sensing and comparison processing, the temperature sensing and comparison circuit 81 reads the sensed temperature data from the corresponding one of the analog-to-digital conversion circuits 80A to 80J, generates temperature difference data, and sends the temperature difference data to the corresponding one of the current value specification circuits 83A to 83J and to the temperature control section 85.

When the plural current value specification circuits 83A to 83J are provided with the temperature difference data from the temperature sensing and comparison circuit 81 operating in response to the temperature change state query, in accordance with the temperature difference data, the current value specification circuits 83A to 83J suitably re-specify the current values specified for the heating control currents causing the corresponding heating elements 51A to 51J to generate heat.

That is, when a temperature difference represented by the temperature difference data is greater than 0° C., that one of the current value specification circuits 83A to 83J identifies the temperature difference range in which this temperate difference falls, and detects a variable current value corresponding to the identified temperature difference range.

If the specified current value of the heating control current for causing the corresponding one of the heating elements 51A to 51J to generate heat at this time is the initially specified regulation current value, that one of the plural current value specification circuits 83A to 83J re-specifies the specified current value to the detected variable current value in place of the regulation current value.

If the specified current value of the heating control current for causing the corresponding one of the heating elements 51A to 51J to generate heat at this time is a variable current value that has already been re-specified, that one of the plural current value specification circuits 83A to 83J compares the variable current value that has previously been re-specified with the variable current value that has just been detected.

Hence, if the variable current value that has previously been re-specified is different from the variable current value that has just been detected, then that one of the plural current value specification circuits 83A to 83J re-specifies the specified current value to the variable current value that has just been detected in place of the variable current value that was previously re-specified.

On the other hand, if the variable current value that has previously been re-specified is the same as the variable current value that has just been detected, then that one of the plural current value specification circuits 83A to 83J leaves the specified current value unaltered at the variable current value that was previously re-specified.

If the temperature difference represented by the temperature difference data provided from the temperature sensing and comparison circuit 81 is 0° C. and the specified current value of the heating control current for causing the corresponding one of the heating elements 51A to 51J to generate heat is a variable current value that has previously been re-specified, then that one of the plural current value specification circuits 83A to 83J re-specifies the specified current value to the regulation current value in place of the variable current value that was previously re-specified.

If the temperature difference represented by the temperature difference data provided from the temperature sensing and comparison circuit 81 is 0° C. and the specified current value of the heating control current for causing the corresponding one of the heating elements 51A to 51J to generate heat is the initialized regulation current value, then that one of the plural current value specification circuits 83A to 83J leaves the specified current value unaltered at the initialized regulation current value.

Hence, if the specified current value of the heating control current for causing the corresponding one of the heating elements 51A to 51J to generate heat is being re-specified, that one of the plural current value specification circuits 83A to 83J generates heating control data with a level corresponding to the re-specified variable current value or regulation current value.

Alternatively, if the specified current value of the heating control current for causing the corresponding one of the heating elements 51A to 51J to generate heat is not being altered, that one of the plural current value specification circuits 83A to 83J generates heating control data with a level corresponding to the unaltered variable current value or regulation current value.

Then the plural current value specification circuits 83A to 83J send the heating control data generated in this manner to the corresponding digital-to-analog conversion circuits 84A to 84J.

Accordingly, the plural digital-to-analog conversion circuits 84A to 84J apply digital-to-analog conversion processing in the same manner as described above to the heating control data provided by the corresponding current value specification circuits 83A to 83J at this time, thus generating heating control currents at variable current values or the regulation current value.

Then the plural digital-to-analog conversion circuits 84A to 84J supply the heating control currents at the variable current values or the regulation current value to the corresponding heating elements 51A to 51J, causing the heating elements 51A to 51J to generate heat and heating the plural number entry operation keys 40.

Thus, when heating control currents at the variable current values are supplied from the plural digital-to-analog conversion circuits 84A to 84J to the corresponding heating elements 51A to 51J, the temperature control section 85 may increase heat generation amounts compared to a case in which heating control currents are supplied at the regulation current value, and may accelerate rises in the actual operation surface temperatures of the plural number entry operation keys 40.

At this time, the lower the actual operation surface temperatures of the plural number entry operation keys 40 are compared to the target temperature, the larger the heating control currents from the plural digital-to-analog conversion circuits 84A to 84J may be, and thus the more greatly heat generation amounts may be increased by the heating control currents supplied to the corresponding heating elements 51A to 51J. Thus, the temperature control section 85 may greatly accelerate rises in the actual operation surface temperatures of the plural number entry operation keys 40.

On the other hand, when the temperature control section 85 supplies heating control currents at the regulation current value from the plural digital-to-analog conversion circuits 84A to 84J to the corresponding heating elements 51A to 51J, then when the actual operation surface temperatures of the plural number entry operation keys 40 have risen to the target temperature, the actual operation surface temperatures may be kept substantially constant at the target temperature.

When the temperature control section 85 supplies heating control currents at the regulation current value from the plural digital-to-analog conversion circuits 84A to 84J to the corresponding heating elements 51A to 51J, if the actual operation surface temperatures of the plural number entry operation keys 40 have risen a little above the target temperature, the actual operation surface temperatures may be allowed to converge on the target temperature.

Meanwhile, when, for example, temperature difference data for the plural number entry operation keys 40 has been provided from the temperature sensing and comparison circuit 81 operating in response to the temperature change state query, then on the basis of this temperature difference data, the temperature control section 85 makes a determination as to whether the actual operation surface temperature of one or more of the number entry operation keys 40 is lower than the target temperature.

Consequently, if the actual operation surface temperature of one or more of the plural number entry operation keys 40 is lower than the target temperature, the temperature control section 85 reports to the main control section 72 that the actual operation surface temperatures have not risen to the target temperature.

On the other hand, if the actual operation surface temperatures of all of the plural number entry operation keys 40 have risen to the target temperature, the temperature control section 85 reports to the main control section 72 that the actual operation surface temperatures have risen to the target temperature.

Thus, each time there is a temperature change state query from the main control section 72, depending on the respective actual operation surface temperatures of the plural number entry operation keys 40, the temperature control section 85 suitably alters heat generation amounts from the plural heating elements 51A to 51J for heating the plural number entry operation keys 40, and a duration required for heating to raise the actual operation surface temperatures to the target temperature may be greatly shortened.

Moreover, each time there is a temperature change state query from the main control section 72, the temperature control section 85 may report and clarify to the main control section 72 the state of changes of the actual operation surface temperatures of the plural number entry operation keys 40.

(2-5) Second PIN Number Entry Processing Sequence

Figure 13:
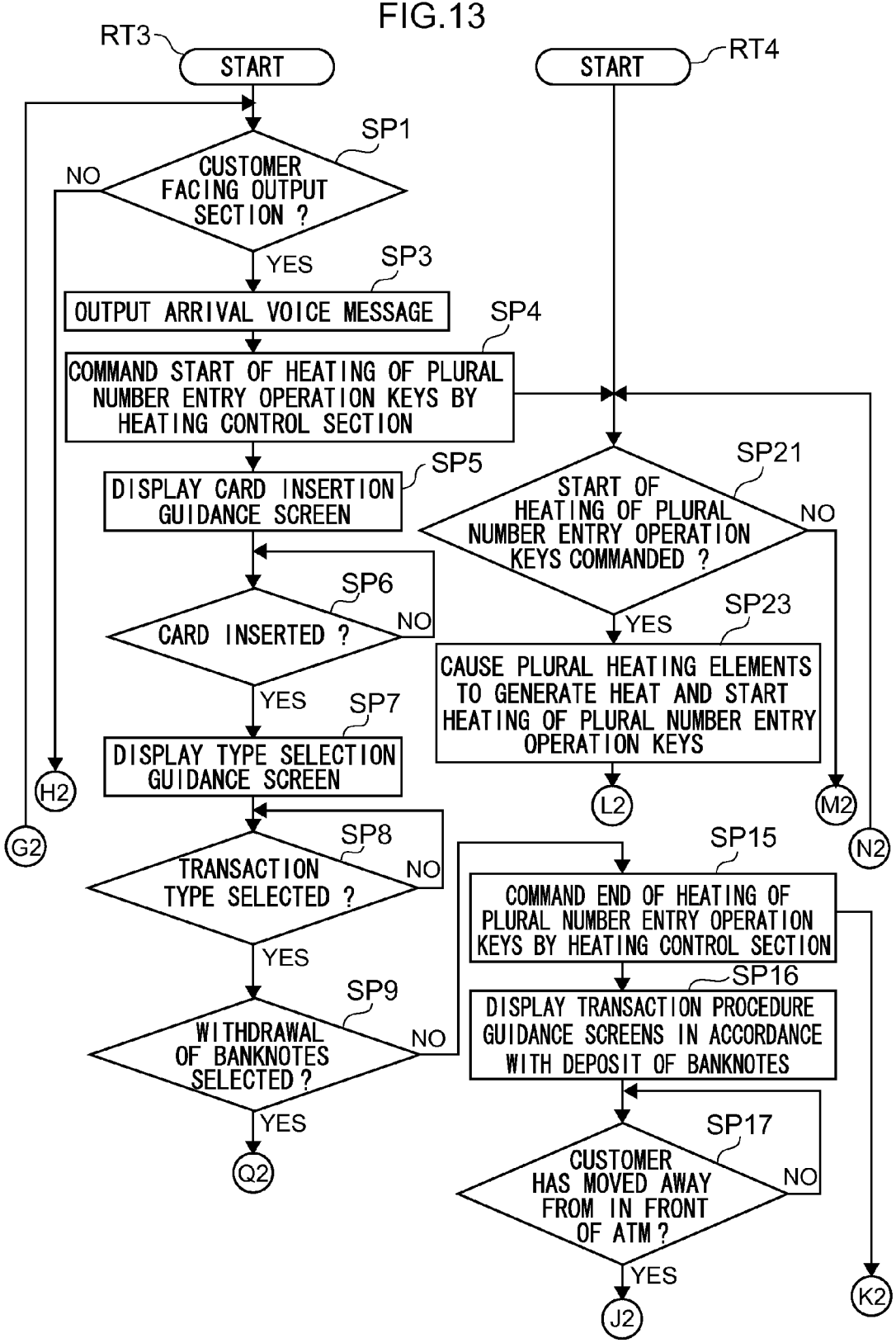
FIG. 13 is a flowchart showing a second PIN number entry processing sequence (part 1).
Figure 14:
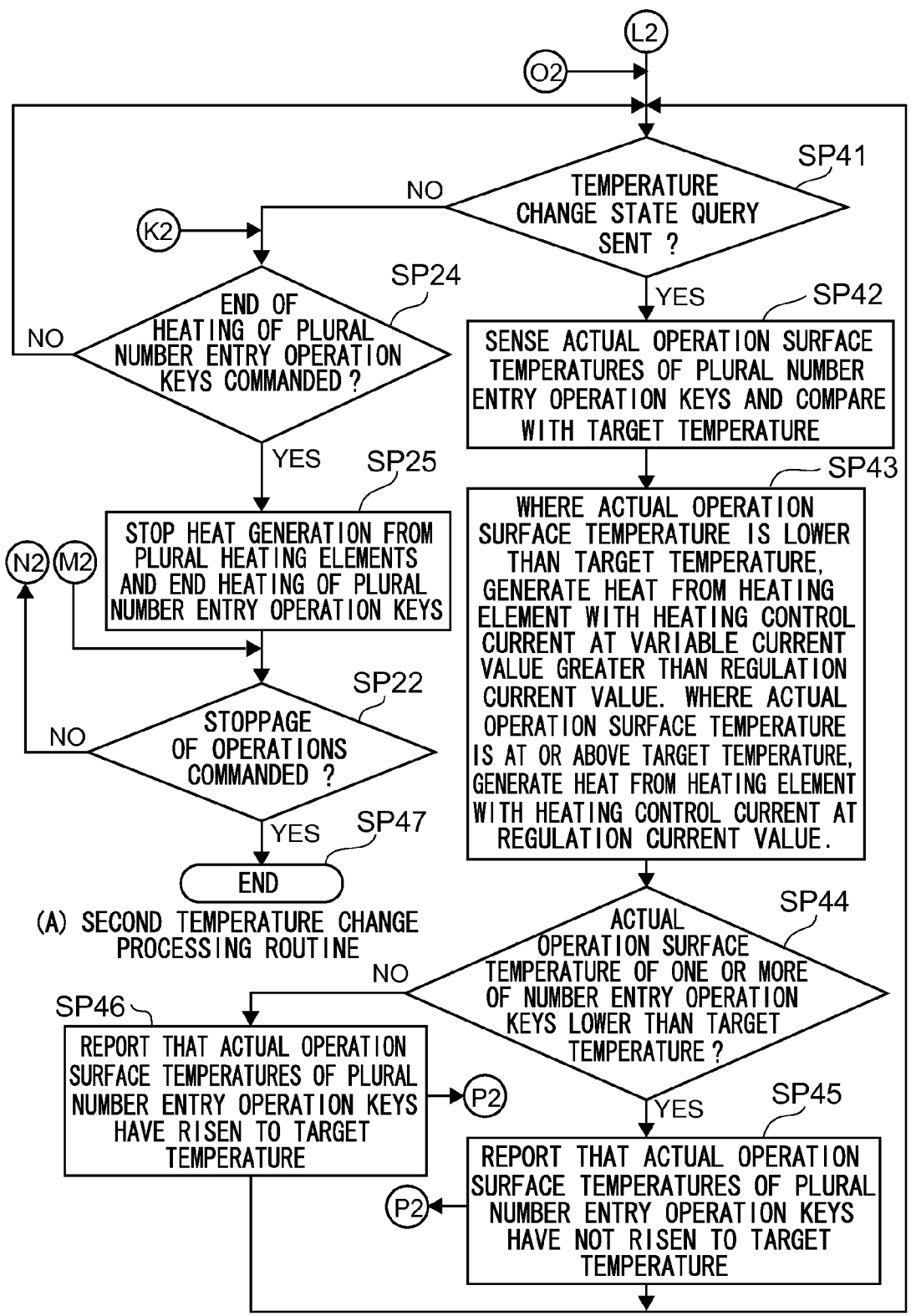
FIG. 14 is the flowchart showing the second PIN number entry processing sequence (part 2).
Figure 15:
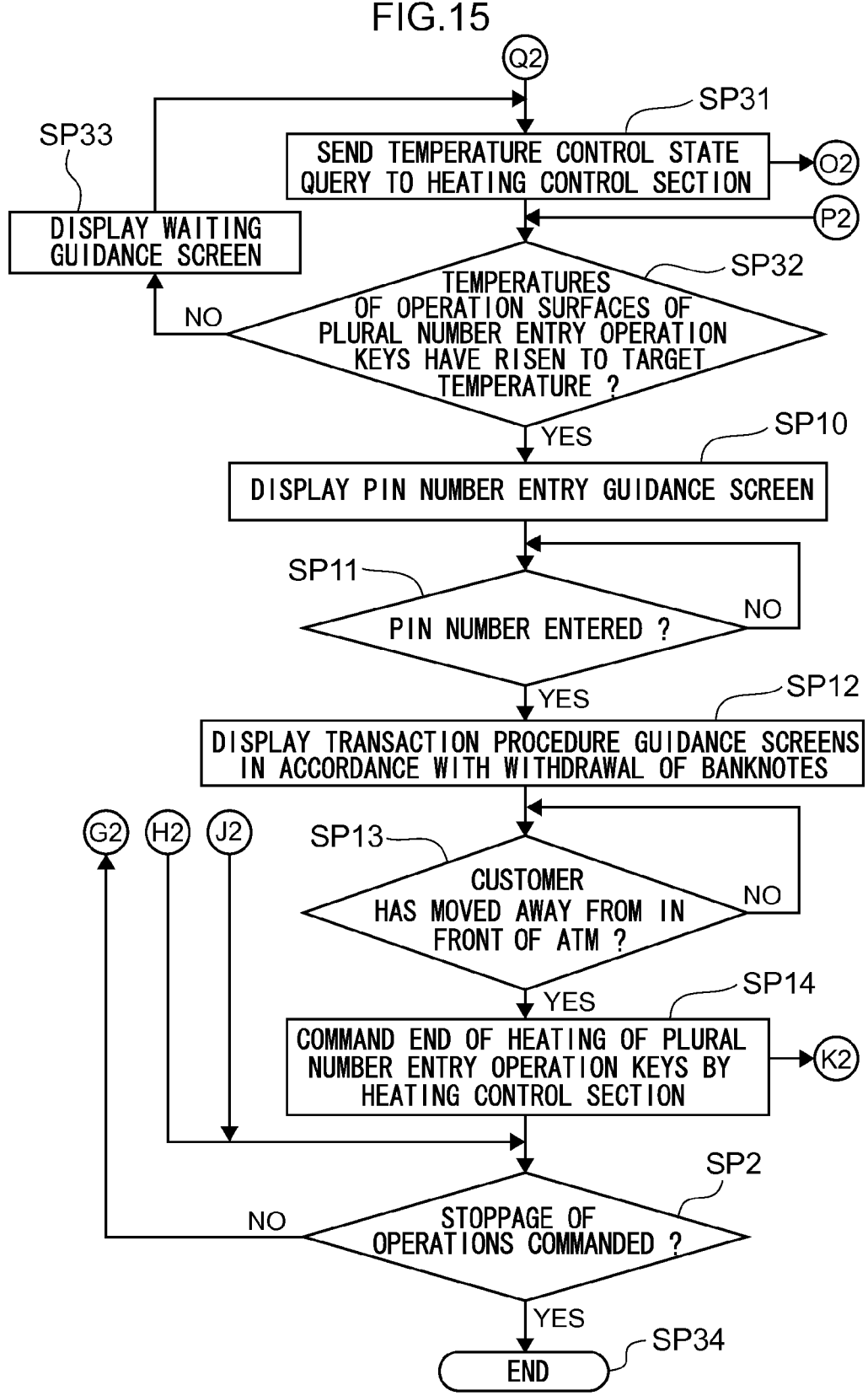
FIG. 15 is the flowchart showing the second PIN number entry processing sequence (part 3).

Now, a second PIN number entry processing sequence is described using the flowchart shown in FIG. 13 to FIG. 15, with the same reference symbols assigned to portions that correspond with FIG. 7 and FIG. 8. The second PIN number entry processing sequence is constituted by a second transaction guidance processing routine RT3 that is executed by the main control section 72 and a second temperature change processing routine RT4 that is executed by the temperature control section 85.

When a command to start up the ATM 70 is given by operating staff from outside the ATM 70 in association with, for example, the start of transaction operations or the completion of maintenance or the like, and the main control section 72 starts up, the second transaction guidance processing routine RT3 shown in FIG. 13 to FIG. 15 is started in accordance with a second transaction guidance processing program, which is memorized in advance in the internal memory.

When this second transaction guidance processing routine RT3 starts, the main control section 72 sequentially executes the processing from step SP1 to step SP9.

Then, if an affirmative result is obtained in step SP9, because a withdrawal of banknotes has been selected as the transaction type by the customer, the main control section 72 proceeds to step SP31.

In step SP31, the main control section 72 sends a query to the temperature control section 85 about the temperature change state at the operation surfaces 40A of the plural number entry operation keys 40, and then proceeds to step SP32.

Meanwhile, when a start-up of the temperature control section 85 is commanded, for example, from the main control section 72 and the temperature control section 85 starts up, the second temperature change processing routine RT4 shown in FIG. 13 to FIG. 15 is started in accordance with a second temperature change processing program, which is memorized in advance in the internal memory.

When the present second temperature change processing routine RT4 starts, the temperature control section 85 sequentially executes the processing from step SP21 to step SP23. After the heating of the plural number entry operation keys 40 has started, the temperature control section 85 proceeds to step SP41.

In step SP41, the temperature control section 85 makes a determination as to whether a temperature change state query has been sent from the main control section 72.

If a negative result is obtained in step SP41, this result indicates that, for example, a transaction type has not yet been selected by the customer visiting to perform a transaction. When this negative result is obtained in step SP41, the temperature control section 85 proceeds to step SP24. Then, if a negative result is obtained in step SP24, the temperature control section 85 returns to step SP41.

Thus, the temperature control section 85 thereafter repeatedly cycles through execution of the processing of step SP41 and step SP24 until an affirmative result is obtained in either of step SP41 and step SP24.

In this manner, the temperature control section 85 waits until there is a temperature change state query from the main control section 72, or the end of heating of the plural number entry operation keys 40 is commanded by the main control section 72.

If an affirmative result is obtained in step SP41, this result indicates that a temperature change state query has been sent from the main control section 72, because a withdrawal of banknotes has been selected as the transaction type by the customer visiting to perform a transaction. When this affirmative result is obtained in step SP41, the temperature control section 85 proceeds to step SP42.

In step SP42, the temperature control section 85 senses the respective actual operation surface temperatures of the plural number entry operation keys 40 and compares the sensed actual operation surface temperatures with the target temperature. The temperature control section 85 then proceeds to step SP43.

In step SP43, depending on the comparison results between the actual operation surface temperatures and the target temperatures, when the actual operation surface temperatures of the number entry operation keys 40 are lower than the target temperature, the temperature control section 85 causes the corresponding heating elements 51A to 51J to generate heat with heating control currents at variable current values that are larger than the regulation current value.

On the other hand, when, according to the comparison results between the actual operation surface temperatures and the target temperatures, the actual operation surface temperatures of the number entry operation keys 40 are equal to or higher than the target temperature, the temperature control section 85 causes the corresponding heating elements 51A to 51J to generate heat with heating control currents at the regulation current value. The temperature control section 85 then proceeds to step SP44.

In step SP44, depending on the comparison results between the actual operation surface temperatures of the plural number entry operation keys 40 and the target temperature, the temperature control section 85 makes a determination as to whether the actual operation surface temperature of one or more of the number entry operation keys 40 is lower than the target temperature.

If an affirmative result is obtained in step SP44, this result indicates that there are actual operation surface temperatures among the plural number entry operation keys 40 that have not yet risen to the target temperature. When this affirmative result is obtained in step SP44, the temperature control section 85 proceeds to step SP45.

Accordingly, in step SP45, the temperature control section 85 reports to the main control section 72 that the actual operation surface temperatures have not risen to the target temperature, and then returns to step SP41.

If a negative result is obtained in step SP44, this result indicates that the actual operation surface temperatures of all of the plural number entry operation keys 40 have risen to the target temperature. When this negative result is obtained in step SP44, the temperature control section 85 proceeds to step SP46.

Accordingly, in step SP46, the temperature control section 85 reports to the main control section 72 that the actual operation surface temperatures have risen to the target temperature, and returns to step SP41.

In this manner, the temperature control section 85 thereafter repeatedly cycles through execution of the processing of step SP41 to step SP46 and reports to the main control section 72 whether or not the actual operation surface temperatures of the plural number entry operation keys 40 have risen to the target temperature each time there is a temperature change state query from the main control section 72, until the end of the heating of the plural number entry operation keys 40 is commanded by the main control section 72.

When the end of the heating of the plural number entry operation keys 40 is commanded by the main control section 72 and an affirmative result is obtained in step SP24, the temperature control section 85 executes the processing of step SP25 and then returns to step SP22.

When, for example, a stoppage of operations is commanded by the main control section 72 and an affirmative result is obtained in step SP22, the temperature control section 85 proceeds to step SP47 and ends the second temperature change processing routine RT4.

Meanwhile, in the aforementioned step SP32, the main control section 72 receives a report from the temperature control section 85 in response to a temperature change state query.

Then the main control section 72 makes a determination as to whether the report is a report that the actual operation surface temperatures of the plural number entry operation keys 40 have risen to the target temperature.

If a negative result is obtained in step SP32, this result indicates that the actual operation surface temperature of one or more of the number entry operation keys 40 has not yet risen to the target temperature, and therefore if the customer entered a PIN number in this state, it might be possible for a third party to illegitimately acquire the PIN number by using thermography to sense the actual operation surface temperatures of the plural number entry operation keys 40. When this negative result is obtained in step SP32, the main control section 72 proceeds to step SP33.

Accordingly, in step SP33, the main control section 72 displays the waiting guidance screen at the display section 7 in place of the type selection guidance screen, prompting the customer with the waiting guidance screen to wait in front of the ATM 70. The main control section 72 returns to step SP31 without the PIN number being entered.

Thus, the main control section 72 repeatedly cycles through execution of the processing of step SP31 to step SP33 until an affirmative result is obtained in step SP32.

In this manner, the main control section 72 periodically sends queries to the temperature control section 85 about the temperature change state and waits for the actual operation surface temperatures of the plural number entry operation keys 40 to rise to the target temperature, while the rises of the actual operation surface temperatures of the plural number entry operation keys 40 are being accelerated.

When an affirmative result is obtained in step SP32, this result indicates that the actual operation surface temperatures of the plural number entry operation keys 40 have risen to the target temperature, and therefore if the customer enters a PIN number in this state, it may be possible to prevent even a third party using thermography to sense the actual operation surface temperatures of the plural number entry operation keys 40 from illegitimately acquiring the PIN number. When this affirmative result is obtained in step SP32, the main control section 72 proceeds to step SP10.

Accordingly, in step SP10, the main control section 72 displays the PIN number entry guidance screen at the display section 7 in place of the waiting guidance screen (or the type selection guidance screen), prompting the customer with the PIN number entry guidance screen to enter their PIN number. The main control section 72 then proceeds to step SP11.

From step SP11, after some of the plural number entry operation keys 40 have been pressed by the customer touching the operation surfaces 40A whose actual operation surface temperatures have risen to the target temperature with the fingertips of a hand and the PIN number has been entered, the main control section 72 sequentially executes the processing of step SP12 to step SP14, and then proceeds to step SP2.

When a stoppage of operations has been commanded from outside the ATM 70 and an affirmative result is obtained in step SP2, the main control section 72 proceeds to step SP34 and ends the second transaction guidance processing routine RT3.

In this manner, the main control section 72 and the temperature control section 85 completely end the second PIN number entry processing sequence that is constituted by the second transaction guidance processing routine RT3 and the second temperature change processing routine RT4.

(2-6) Operation and Effects of the Second Embodiment

In the ATM 70 with the structure described above, the entry section 71 that includes the number entry operation keys 40 that can be pressed for use in the entry of a PIN number is provided with the plural heating elements 51A to 51J in contact with the key lower faces 40B of the plural number entry operation keys 40.

In the ATM 70, the plural temperature sensors 76A to 76J for sensing the actual operation surface temperatures of the plural number entry operation keys 40 are provided in the entry section 71.

When a customer visits the ATM 70 to perform a transaction and faces the entry section 71, the ATM 70 causes the plural heating elements 51A to 51J to generate heat and start the heating of the plural number entry operation keys 40.

In this state in which the plural number entry operation keys 40 are being heated, if a withdrawal of banknotes, requiring the entry of a PIN number, is selected as a desired transaction by the customer, the ATM 70 uses the plural temperature sensors 76A to 76J to sense the actual operation surface temperatures of the plural number entry operation keys 40, and checks whether the sensed actual operation surface temperatures have risen to a target temperature substantially equal to the temperature of the fingertips of a human hand.

If the actual operation surface temperatures of the plural number entry operation keys 40 have not risen to the target temperature, the ATM 70 makes the customer wait without entering the PIN number.

When it is confirmed that the actual operation surface temperatures of the plural number entry operation keys 40 have risen to the target temperature, the ATM 70 allows the customer to enter the PIN number by touching the operation surfaces 40A whose actual operation surface temperatures have risen to the target temperature with the fingertips of their hand to press the plural number entry operation keys 40.

Thus, the ATM 70 does not allow the customer to enter the PIN number by pressing the plural number entry operation keys 40 whose actual operation surface temperatures are lower than the target temperature, and the ATM 70 may almost certainly prevent changes of temperature of contact areas of the operation surfaces 40A with the fingertips of the hand.

According to the structure described above, the ATM 70 is provided with the plural heating elements 51A to 51J and the plural temperature sensors 76A to 76J in the entry section 71 that includes the plural number entry operation keys 40 that can be pressed for use in the entry of a PIN number. When a customer faces the entry section 71, the plural heating elements 51A to 51J generate heat and the heating of the plural number entry operation keys 40 starts. If a withdrawal of banknotes is selected as a desired transaction by the customer, actual operation surface temperatures of the plural number entry operation keys 40 are sensed using the temperature sensors 76A to 76J, and the ATM 70 confirms that these sensed actual operation surface temperatures have risen to the target temperature that is substantially equal to the temperature of the fingertips of a hand, after which the plural number entry operation keys 40 are pressed by the customer to enter the PIN number.

Thus, the ATM 70 may both provide the same effects as the effects provided by the first embodiment described above and, by not allowing a customer to enter a PIN number by pressing the plural number entry operation keys 40 whose actual operation surface temperatures are lower than the target temperature, may almost certainly prevent changes of temperature of contact areas of the operation surfaces 40A with the fingertips of the hand.

When the ATM 70 confirms whether or not the actual operation surface temperatures of the plural number entry operation keys 40 have risen to the target temperature, if the actual operation surface temperatures are lower than the target temperature, the ATM 70 increases heat generation amounts from the plural heating elements 51A to 51J so as to heat up the plural number entry operation keys 40.

Thus, even when temperature differences between the target temperature and the actual operation surface temperatures of the unheated plural number entry operation keys 40 are relatively large, a duration of heating of the plural number entry operation keys 40 sufficient to raise the actual operation surface temperatures to the target temperature may be made very short.

Even if, as a result of the ATM 70 checking whether or not the actual operation surface temperatures of the plural number entry operation keys 40 have risen to the target temperature, the ATM 70 has increased heat generation amounts from the plural heating elements 51A to 51J to heat up the plural number entry operation keys 40 because the actual operation surface temperatures were lower than the target temperature, when the actual operation surface temperatures have risen to the target temperature, the ATM 70 heats the plural number entry operation keys 40 with the heat generation amounts of the plural heating elements 51A to 51J returned to the unincreased level.

Thus, when the plural number entry operation keys 40 are heated with the heat generation amounts of the plural heating elements 51A to 51J being increased because of the actual operation surface temperatures being lower than the target temperature, then after the actual operation surface temperatures have risen to the target temperature, the ATM 70 may avoid continuing to heat the plural number entry operation keys 40 with the increased heat generation amounts from the plural heating elements 51A to 51J and may prevent the actual operation surface temperatures becoming significantly higher than the target temperature.

That is, even when the plural number entry operation keys 40 are heated with the heat generation amounts of the plural heating elements 51A to 51J being increased because the actual operation surface temperatures were lower than the target temperature, then when the plural number entry operation keys 40 are pressed by a customer to enter a PIN number, the ATM 70 may prevent the temperatures of contact areas of the operation surfaces 40A with the fingertips of the hand from changing because of the actual operation surface temperatures being significantly higher than the target temperature that is substantially equal to the temperature of the fingertips of the hand.

(3) Alternative Embodiments (3-1) First Alternative Embodiment

In the first embodiment described hereabove, a case in which the heating of the plural number entry operation keys 40 starts in response to a customer facing the entry section 6 and the actual operation surface temperatures are raised to the target temperature is described.

However, the present invention is not limited thus. A wiring board at which a cooling element such as, for example, a Peltier element is mounted is disposed at a central portion of the interior of the circuit board arrangement recess portion 46BY of each of the plural number entry plungers 46B of the operation linking portion 46 in the entry section 6. The cooling elements are for cooling the plural number entry operation keys 40 to a predetermined temperature that is lower than the temperature of the fingertips of a hand. The surface of each cooling element is touched against the key lower face 40B of the corresponding number entry operation key 40.

Thus, in the present invention, the plural number entry operation keys 40 may be cooled with the plural cooling elements when a PIN number is being entered.

In the present invention, the cooling of the plural number entry operation keys 40 with the plural cooling elements may be started at various timings from the moment it is sensed that a customer is facing the entry section 6 to the moment when it is sensed that a customer has taken withdrawn banknotes and moved away from in front of the ATM 1 such as, for example, the moment when it is sensed that the customer is facing the entry section 6, the moment when it is sensed that the customer has taken withdrawn banknotes and moved away from in front of the ATM 1, just before the entry of a pin number, and the like.

According to the present structure of the present invention, when a customer presses the plural number entry operation keys 40 to enter a PIN number and the temperatures of contact areas of the operation surfaces 40A with the fingertips of the hand change, the temperatures of these contact areas may be rapidly lowered.

Thus, according to the present structure of the present invention, even if a third party uses thermography to sense the temperatures of the operation surfaces 40A of the plural number entry operation keys 40, for example, just after a customer has taken withdrawn banknotes and moved away from in front of the ATM 1, it may not be possible to illegitimately acquire the PIN number from the sensed temperatures.

Figure 16A:
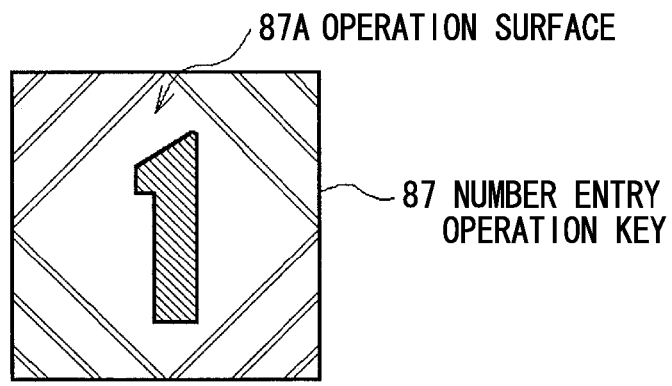
FIG. 16A is a schematic plan view showing the structure of a number entry operation key in accordance with an alternative embodiment.
Figure 16B:
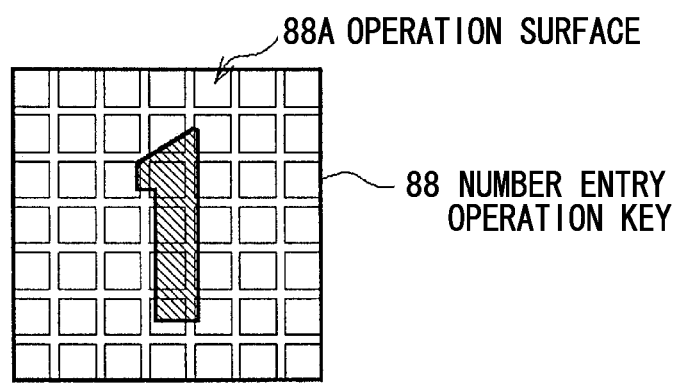
FIG. 16B is a schematic plan view showing the structure of a number entry operation key in accordance with the alternative embodiment.
Figure 16C:
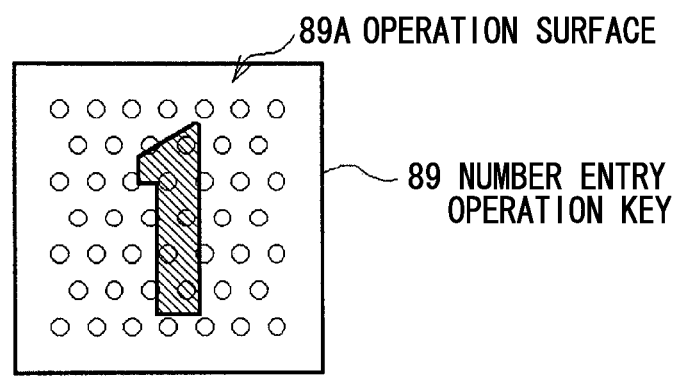
FIG. 16C is a schematic plan view showing the structure of a number entry operation key in accordance with the alternative embodiment.

In the present structure of the present invention, for example, as shown in FIG. 16A, FIG. 16B and FIG. 16C, plural groove portions, tiny hole portions and the like may be formed in predetermined patterns in operation surfaces 87A, 88A and 89A of number entry operation keys 87, 88 and 89.

When these number entry operation keys 87 to 89 are employed, surface areas of the operation surfaces 87A to 89A of the number entry operation keys 87 to 89 may be made larger than in a case of flat surfaces and heat dissipation efficiency may be improved. Thus, in the present invention, it may be made easier to lower the temperatures of the operation surfaces 87A to 89A.

(3-2) Second Alternative Embodiment

In the second embodiment described hereabove, a case is described in which, each time there is a temperature change state query from the main control section 72, the temperature control section 85 senses the actual operation surface temperatures of the plural number entry operation keys 40 and compares the actual operation surface temperatures with the target temperature and, depending on the comparison results, supplies heating control currents at a regulation current value or variable current values to the plural heating elements 51A to 51J to suitably alter heat generation amounts.

However, the present invention is not limited thus. Each time there is a temperature change state query from the main control section 72, although the temperature control section 85 senses the actual operation surface temperatures of the plural number entry operation keys 40 and compares the actual operation surface temperatures with the target temperature in order to respond to the main control section 72, the temperature control section 85 may continue to supply heating control currents at the regulation current value to the plural heating elements 51A to 51J and not alter heat generation amounts.

Figure 17:
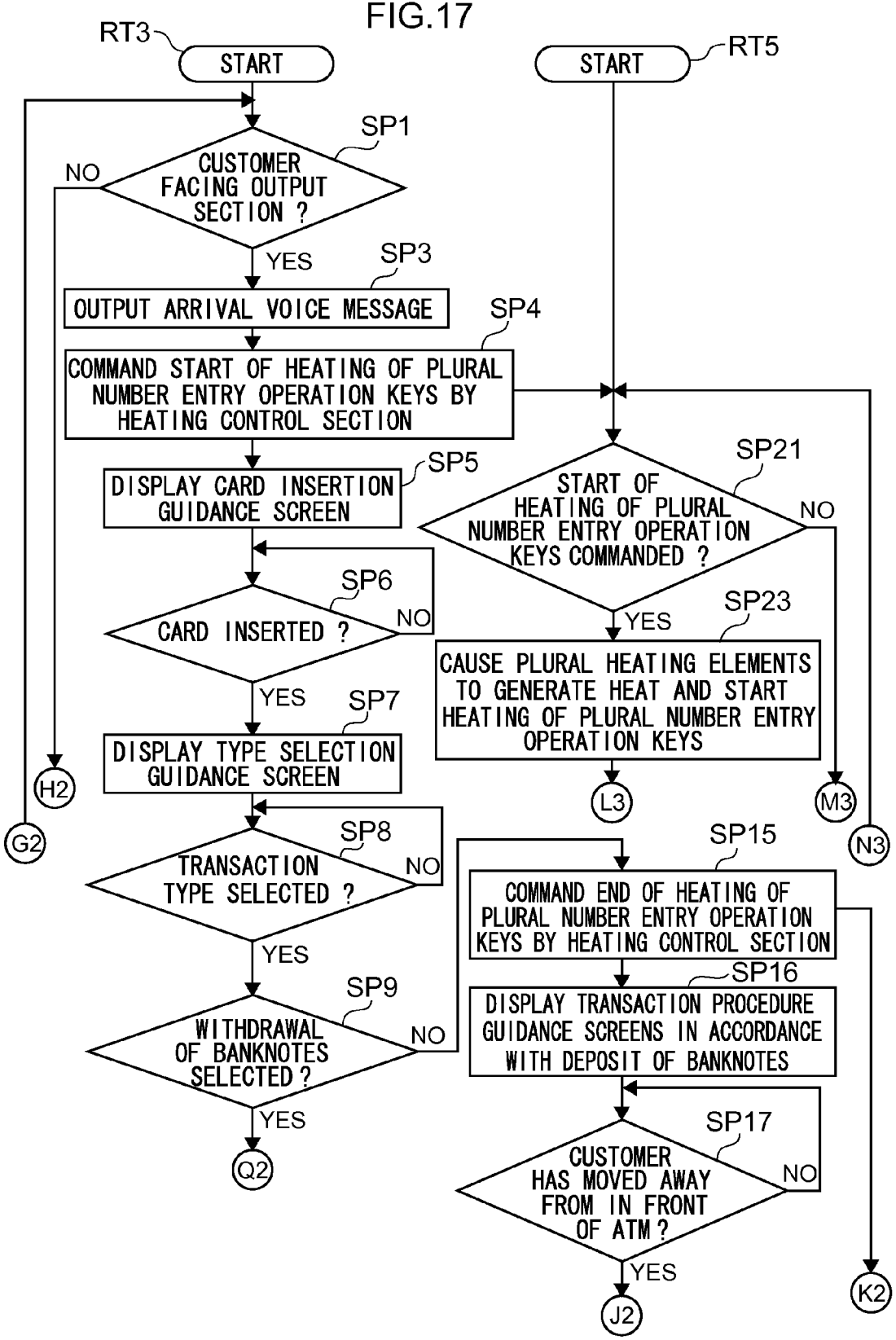
FIG. 17 is a flowchart showing a third PIN number entry processing sequence in accordance with an alternative embodiment (part 1).
Figure 18:
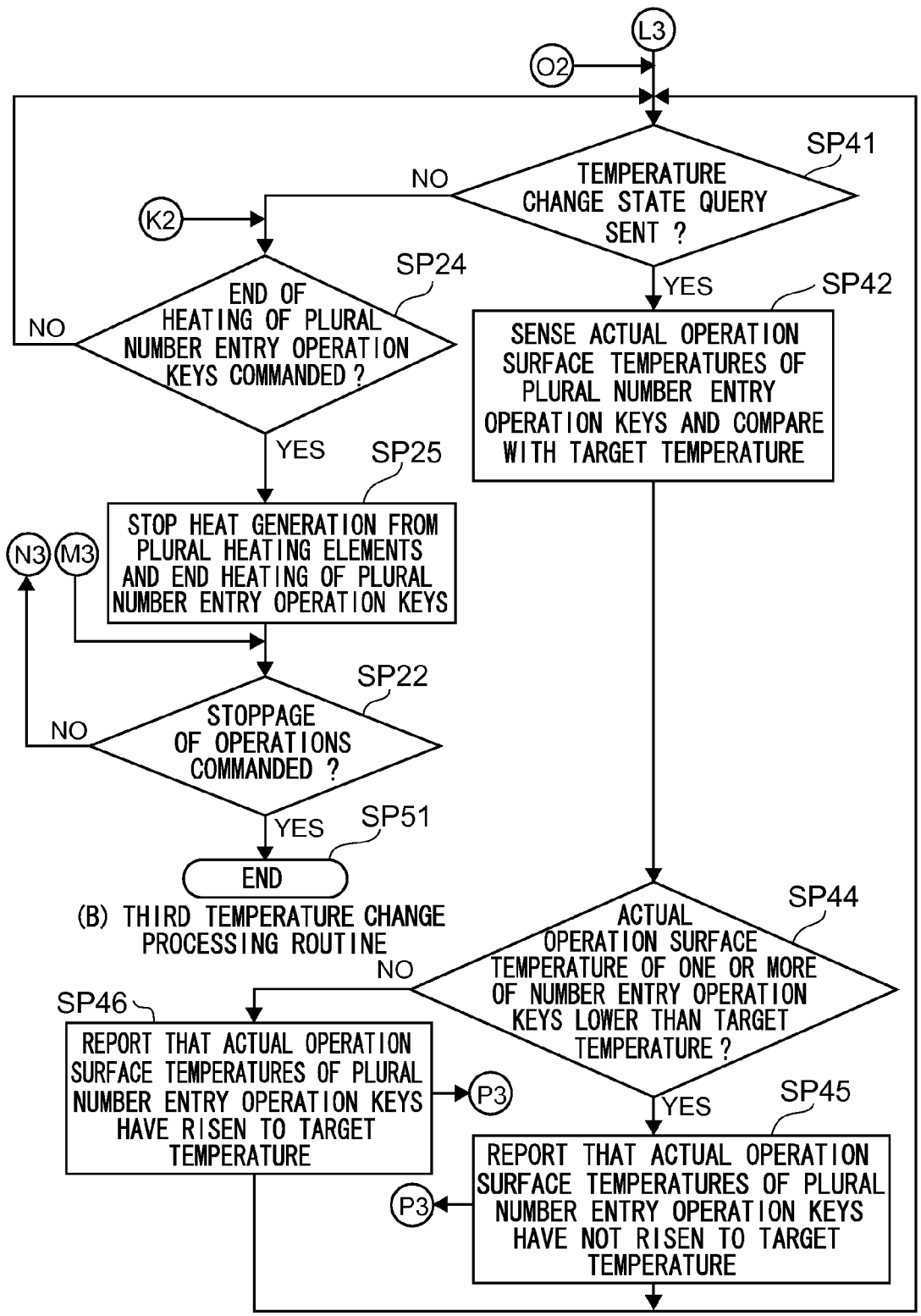
FIG. 18 is the flowchart showing the third PIN number entry processing sequence in accordance with the alternative embodiment (part 2).
Figure 19:
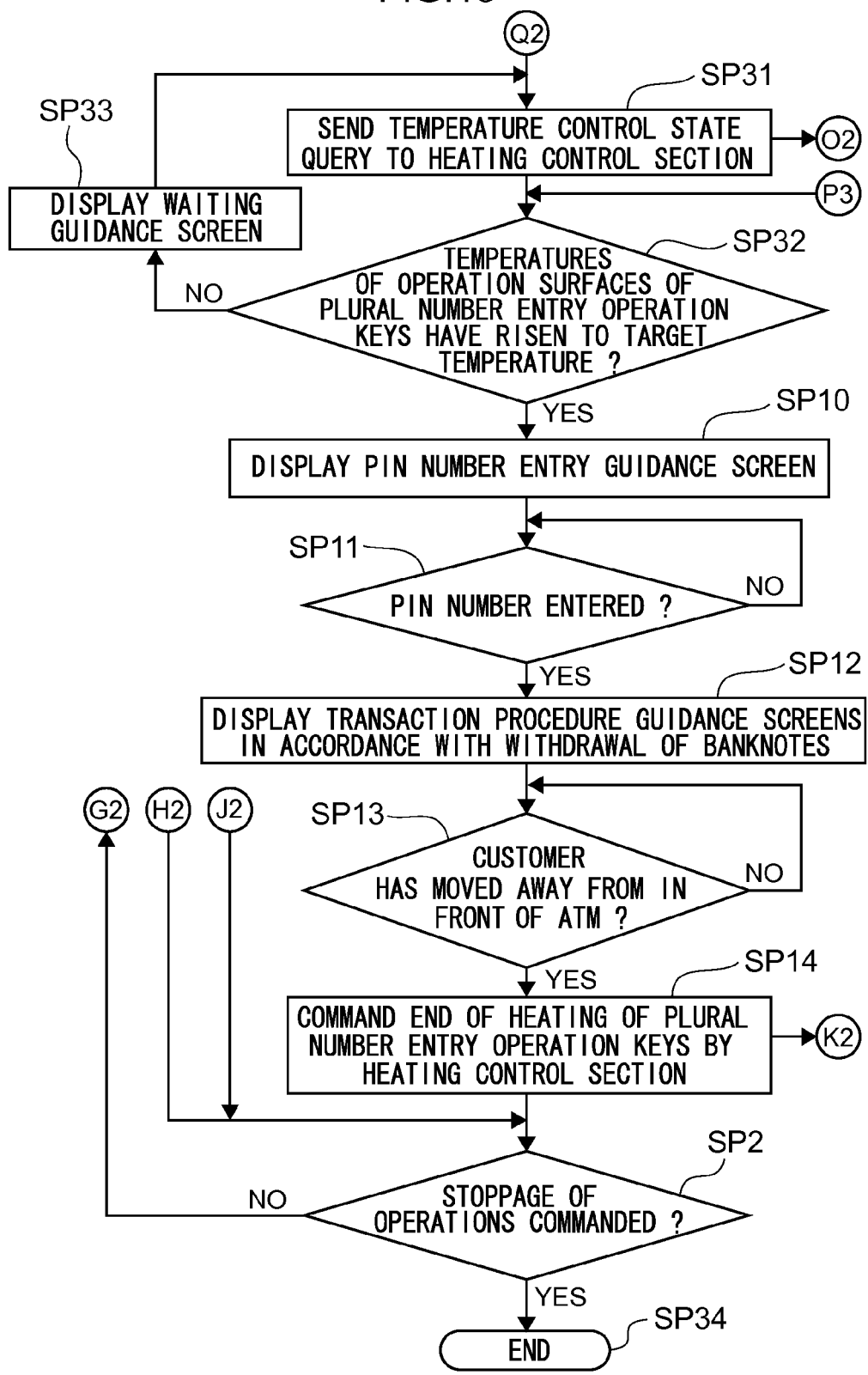
FIG. 19 is the flowchart showing the third PIN number entry processing sequence in accordance with the alternative embodiment (part 3).

Now, the present structure is described in the form of a third PIN number entry processing sequence using the flowchart shown in FIG. 17 to FIG. 19, with the same reference symbols assigned to portions that correspond with FIG. 13 to FIG. 15. The third PIN number entry processing sequence is constituted by the second transaction guidance processing routine RT3 that is executed by the main control section 72 and a third temperature change processing routine RT5 that is executed by the temperature control section 85.

That is, when, for example, a command to start up is given by the main control section 72 and the temperature control section 85 starts up, the third transaction guidance processing routine RT5 shown in FIG. 17 to FIG. 19 is started in accordance with a third transaction guidance processing program, which is memorized in advance in the internal memory.

When this third transaction guidance processing routine RT5 starts, the temperature control section 85 sequentially executes the processing from step SP21 to step SP23, starts the heating of the plural number entry operation keys 40, and then proceeds to step SP41.

When an affirmative result is obtained in step SP41, because a temperature change state query has been sent from the main control section 72, the temperature control section 85 proceeds to step SP42.

In step SP42, the temperature control section 85 senses the respective actual operation surface temperatures of the plural number entry operation keys 40 and compares the sensed actual operation surface temperatures with the target temperature. The temperature control section 85 then proceeds to step SP44.

Hence, in step SP44, depending on the comparison results between the actual operation surface temperatures of the plural number entry operation keys 40 and the target temperatures, the temperature control section 85 makes a determination as to whether the actual operation surface temperature of one or more of the number entry operation keys 40 is lower than the target temperature.

If an affirmative result is obtained in step SP44, because there are actual operation surface temperatures among the plural number entry operation keys 40 that have not yet risen to the target temperature, the temperature control section 85 proceeds to step SP45.

Accordingly, in step SP45, the temperature control section 85 reports to the main control section 72 that the actual operation surface temperatures have not risen to the target temperature, and then returns to step SP41.

If a negative result is obtained in step SP44, because the actual operation surface temperatures of all of the plural number entry operation keys 40 have risen to the target temperature, the temperature control section 85 proceeds to step SP46.

Then, in step SP46, the temperature control section 85 reports to the main control section 72 that the actual operation surface temperatures have risen to the target temperature, and returns to step SP41.

In this manner, the temperature control section 85 thereafter repeatedly cycles through execution of the processing of step 41, step 42, and steps 44 to 46 and reports to the main control section 72 whether or not the actual operation surface temperatures of the plural number entry operation keys 40 have risen to the target temperature each time a temperature change state query is sent from the main control section 72, until the end of the heating of the plural number entry operation keys 40 is commanded by the main control section 72.

When the end of the heating of the plural number entry operation keys 40 is commanded by the main control section 72 and an affirmative result is obtained in step SP24, the temperature control section 85 executes the processing of step SP25 and then returns to step SP22.

When, for example, a stoppage of operations is commanded by the main control section 72 and an affirmative result is obtained in step SP22, the temperature control section 85 proceeds to step SP51 and ends the third temperature change processing routine RT5.

According to the present structure of the present invention, because the heating processing section 78 does not alter the current values of the heating control currents being supplied to the plural heating elements 51A to 51J even when the actual operation surface temperatures of the plural number entry operation keys 40 are lower than the target temperature, the processing load may be reduced.

Further, when the heating of the plural number entry operation keys 40 has started, the temperature control section 85 of the present invention may periodically sense the actual operation surface temperatures and compare the same with the target temperature and, depending on the comparison results, supply heating control currents at the regulation current value or variable current values to the plural heating elements 51A to 51J and suitably alter heat generation amounts.

Then, when there is a temperature change state query from the main control section 72, the temperature control section 85 of the present invention may report to the main control section 72 whether or not the actual operation surface temperatures of the plural number entry operation keys 40 have risen to the target temperature in accordance with comparison results between the actual operation surface temperatures that were obtained most recently and the target temperature.

According to the present structure, because the temperature control section 85 of the present invention monitors the actual operation surface temperatures and suitably alters heat generation amounts of the heating elements 51A to 51J from immediately after the start of the heating of the plural number entry operation keys 40, the present invention may greatly shorten the duration of heating sufficient to raise the actual operation surface temperatures of the plural number entry operation keys 40 to the target temperature.

(3-3) Third Alternative Embodiment

In the second embodiment described hereabove, a case is described in which a number of variable current values are prepared beforehand, and when the actual operation surface temperatures of the plural number entry operation keys 40 are lower than the target temperature, the temperature control section 85 supplies heating control currents at variable current values in accordance with temperature differences between the actual operation surface temperatures and the target temperature to the plural heating elements 51A to 51J to alter the heat generation amounts.

However, the present invention is not limited thus. Just one variable current value larger than the regulation current value may be prepared, and when the actual operation surface temperatures of the plural number entry operation keys 40 are lower than the target temperature, the temperature control section 85 may supply heating control currents at the one variable current value to the plural heating elements 51A to 51J to alter the heat generation amounts, regardless of temperature differences between the actual operation surface temperatures and the target temperature.

According to the present structure, because there is no need for the temperature control section 85 to assign variable current values in accordance with temperature differences between actual operation surface temperatures and the target temperature, the present invention may reduce the processing load during the heating of the plural number entry operation keys 40.

(3-4) Fourth Alternative Embodiment

In the second embodiment described hereabove, a case is described in which the temperature sensors 76A to 76J mounted at the heating wiring boards 75 of the entry section 71 are disposed so as to be separated from the key lower faces 40B of the corresponding number entry operation keys 40.

However, the present invention is not limited thus. The temperature sensors 76A to 76J mounted at the heating wiring boards 75 of the entry section 71 may be disposed so as to be in contact with the key lower faces 40B of the corresponding number entry operation keys 40.

According to the present structure, the plural temperature sensors 76A to 76J may directly sense the temperatures of the surfaces of the plural number entry operation keys 40 rather than the temperatures of spaces close to the plural number entry operation keys 40.

Thus, according to the present structure of the present invention, the effects of the temperature of the vicinity of the ATM 70 may be reduced, contributing to better sensing accuracy of the plural temperature sensors 76A to 76J than in the second embodiment described above, and sensing accuracy of the actual operation surface temperatures of the plural number entry operation keys 40 may be improved.

Figure 20:
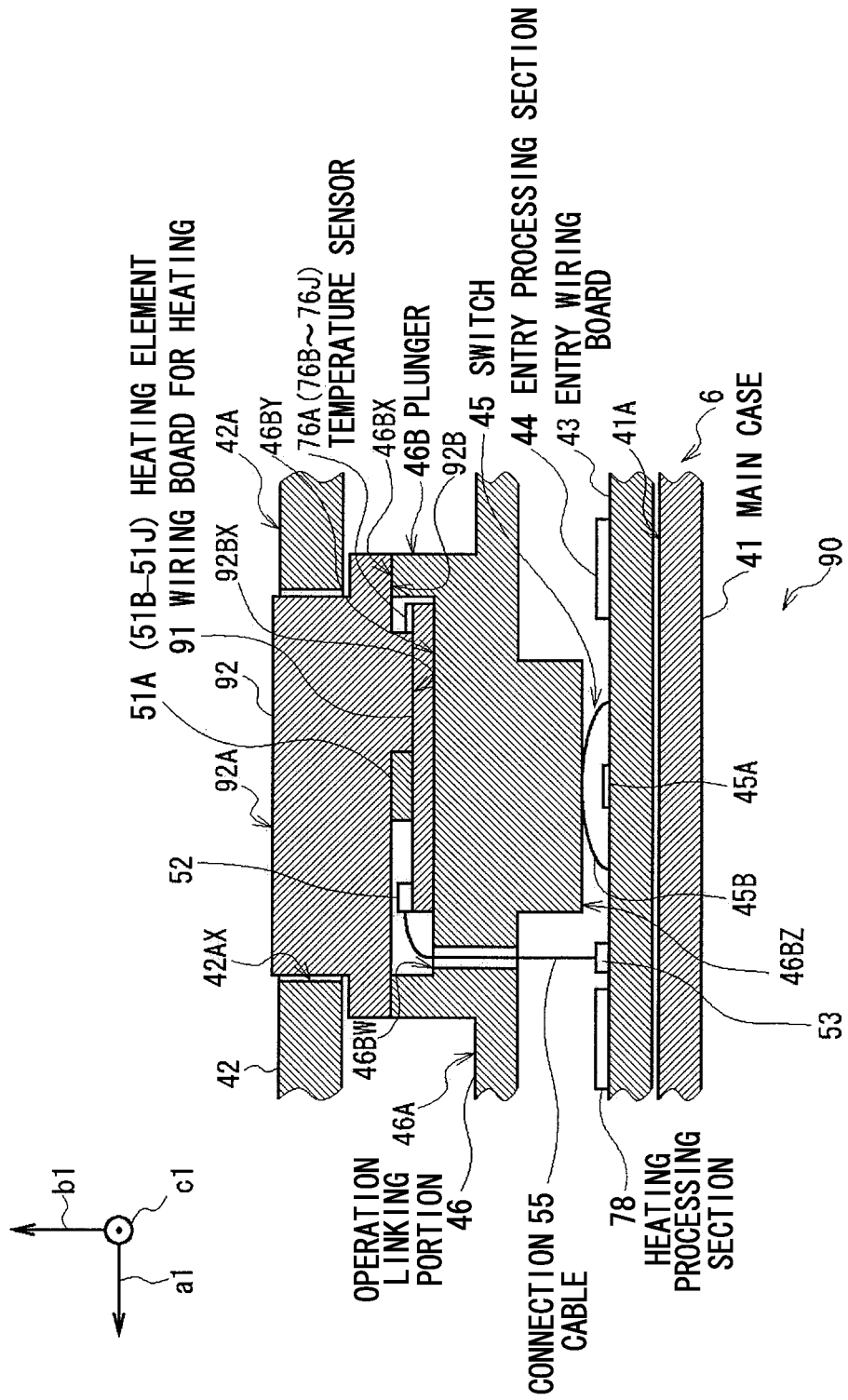
FIG. 20 is a schematic sectional view showing internal structures of an entry section in accordance with an alternative embodiment.

Further, as is shown in FIG. 20, with the same reference symbols assigned to portions that correspond with FIG. 11, the heating elements 51A to 51J are mounted at central portions of one faces of heating wiring boards 91 of an entry section 90.

Although the temperature sensors 76A to 76J are mounted at edge portions of the one faces of the heating wiring boards 91 of the present invention, distances between the temperature sensors 76A to 76J and the heating elements 51A to 51J are made equal to distances between surfaces of the heating elements 51A to 51J and operation surfaces 92A of number entry operation keys 92.

Protrusion portions 92BX are provided at key lower faces 92B of the number entry operation keys 92 of the present invention. The protrusion portions 92BX have widths equal to the distances between the surfaces of the heating elements 51A to 51J and the operation surfaces 92A of the number entry operation keys 92.

The protrusion portions 92BX of the key lower faces 92B of the number entry operation keys 92 of the present invention are interposed between the heating elements 51A to 51J and the temperature sensors 76A to 76J, and the heating elements 51A to 51J and the temperature sensors 76A to 76J are in contact with the protrusion portions 92BX.

According to the present structure, because the protrusion portions 92BX of the key lower faces 92B of the number entry operation keys 92 of the present invention are interposed in touching states between the heating elements 51A to 51J and the temperature sensors 76A to 76J, and the distances between the temperature sensors 76A to 76J and the heating elements 51A to 51J are equal to the distances between the surfaces of the heating elements 51A to 51J and the operation surfaces 92A of the number entry operation keys 92, the temperatures of contact areas with the protrusion portions 92BX of the number entry operation keys 92 may be sensed by the temperature sensors 76A to 76J to serve as the actual operation surface temperatures.

Thus, according to the present structure, the processing at the heating processing section 78 to sense the actual operation surface temperatures is unnecessary, and the temperature sensing tables used for the sensing of the actual operation surface temperatures are unnecessary. Therefore, the present invention may reduce the processing load and the scale of circuitry.

(3-5) Fifth Alternative Embodiment

In the first and second embodiments described hereabove, cases are described in which the plural number entry operation keys 40 are heated when a PIN number is to be entered and the temperatures of all of the respective operation surfaces 40A of the plural number entry operation keys 40 are raised to the target temperature.

However, the present invention is not limited thus. For example, the plural number entry operation keys are formed of stainless steel, with a lower thermal conductivity, or relatively small heat generation elements are used.

When a PIN number is to be entered, temperatures of portions of the operation surfaces of the plural number entry operation keys are raised to the target temperatures by heating of the plural number entry operation keys. Thus, the temperatures of the operation surfaces of the plural number entry operation keys may be changed to be substantially equal in the present invention.

Figure 21:
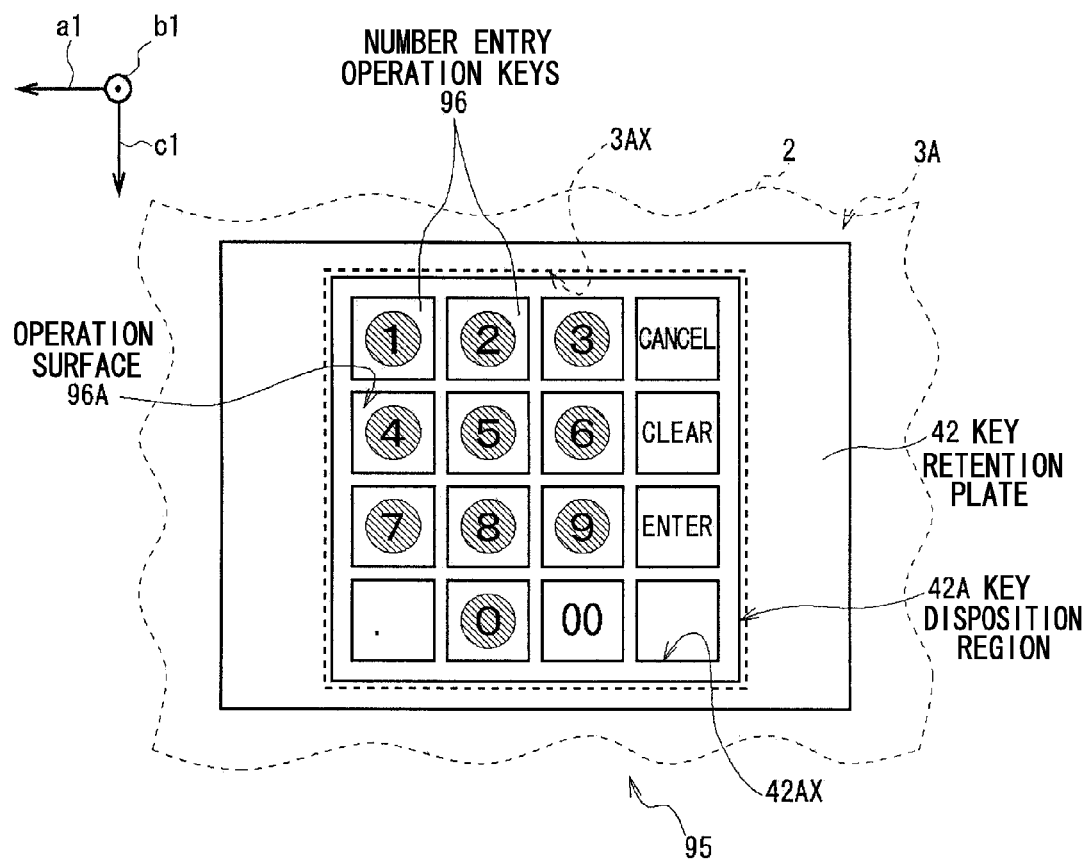
FIG. 21 is a schematic plan view supporting a description of heating of plural number entry operation keys in accordance with an alternative embodiment (1).

For example, in the present invention, as shown in FIG. 21 with the same reference symbols assigned to portions that correspond with FIG. 3, plural number entry operation keys 96 of stainless steel are arranged in an entry section 95.

In the entry section 95 of the present invention, the plural heating elements 51A to 51J have the same sizes as in the first and second embodiments described above, or plural heat generation elements (not shown in the drawings) that are smaller in size than the plural heating elements 51A to 51J are disposed in contact with central portions of key lower faces of the plural number entry operation keys 96.

In the present invention, when a PIN number is to be entered, the plural number entry operation keys 96 may be heated such that only central portions (the shaded portions in FIG. 21) of respective operation surfaces 96A of the plural number entry operation keys 96 are raised to the target temperature. Thus, the temperatures of the operation surfaces 96A of the plural number entry operation keys 96 may be changed to be substantially equal.

Figure 22:
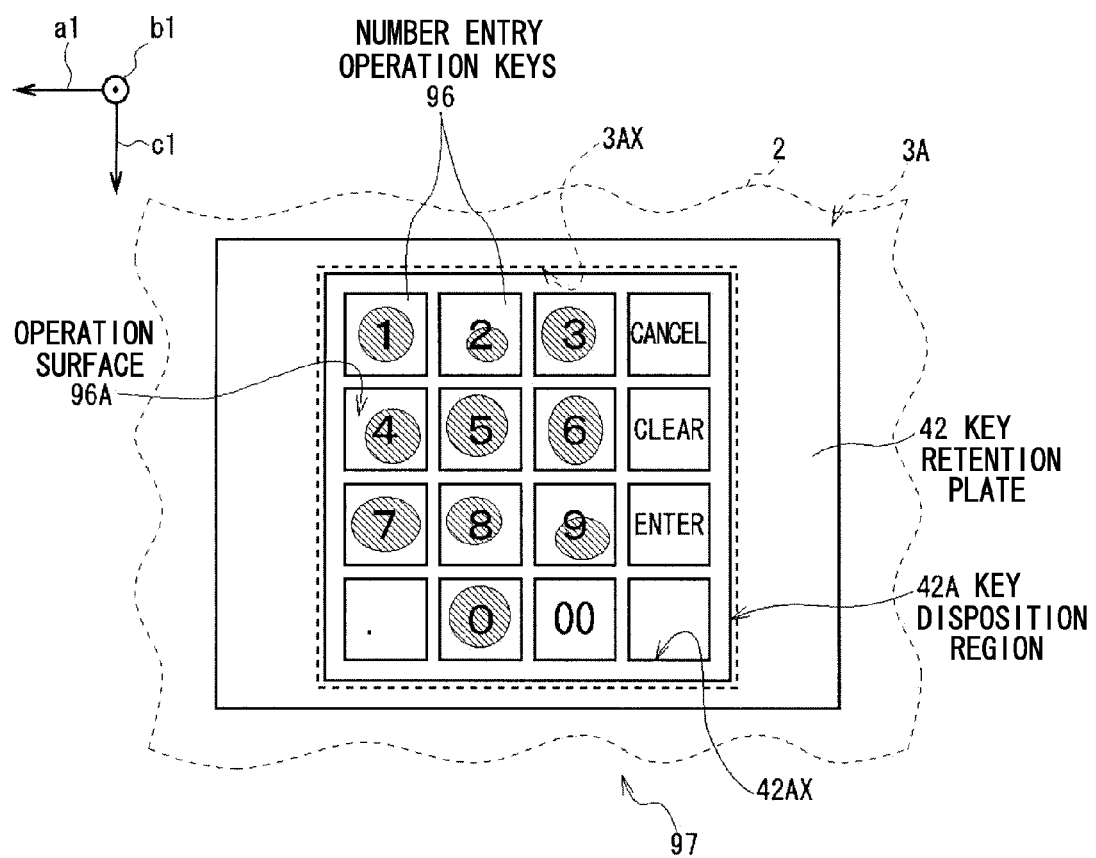
FIG. 22 is a schematic plan view supporting a description of heating of plural number entry operation keys in accordance with the alternative embodiment (2).
Figure 23:
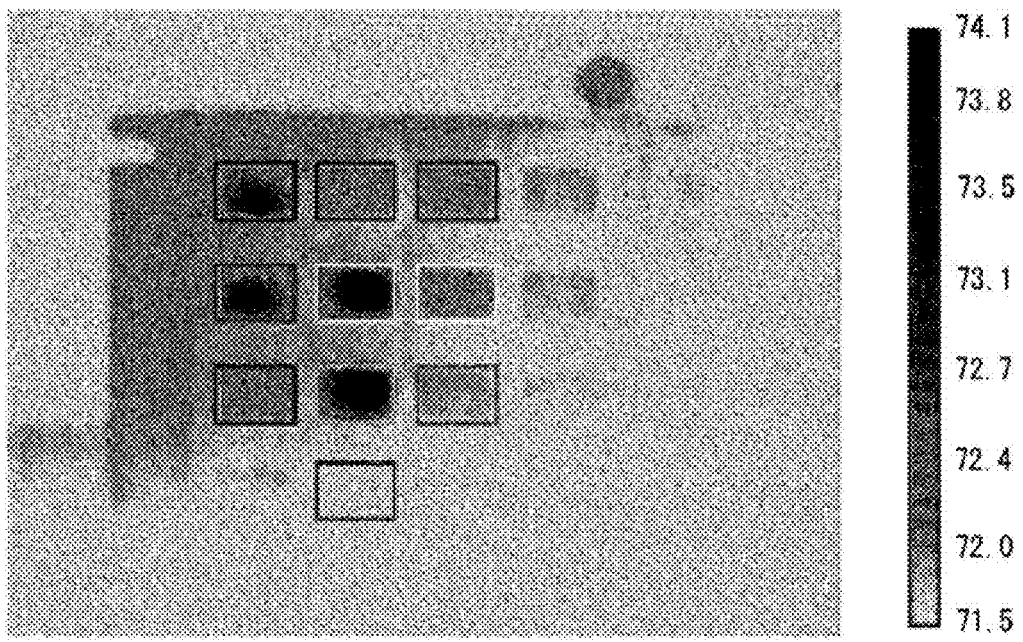
FIG. 23 is a schematic plan view supporting a description of the use of thermography to sense temperatures of operation surfaces at plural operation keys.

The stainless steel plural number entry operation keys 96 of the present invention are disposed in an entry section 97, as is shown in FIG. 22 with the same reference symbols assigned to portions that correspond with FIG. 3.

In the entry section 97 of the present invention, plural heat generation elements (not shown in the drawings), with different sizes and shapes from the sizes and shapes of the plural heating elements 51A to 51J according to the first and second embodiments described above, are disposed so as to be in contact with central portions of the key lower faces of the plural number entry operation keys 96 or with portions that are offset from these central portions.

In the present invention, when a PIN number is to be entered, the plural number entry operation keys 96 may be heated such that only portions with predetermined shapes (the shaded portions in FIG. 22) at the middles or offset from the middles of the respective operation surfaces 96A of the plural number entry operation keys 96 are raised to the target temperature. Thus, the temperatures of the operation surfaces 96A of the plural number entry operation keys 96 may be changed to be substantially equal.

According to this structure of the present invention, when a PIN number is being entered, the temperatures of the operation surfaces 96A of the plural number entry operation keys 96 may imitate partial changes as if caused by contact from the fingertips of a hand in pressing operations.

Thus, according to the present structure of the present invention, even if a third party uses thermography to sense the temperatures of the operation surfaces 96A of the plural number entry operation keys 96 when a PIN number is being entered, it may not be possible to identify the number entry operation keys 96 that have actually been pressed for the entry of the PIN number from the sensed temperatures.

Therefore, with the present structure, the present invention may almost certainly prevent the illegitimate acquisition of a PIN number by a third party.

(3-6) Sixth Alternative Embodiment

In the first and second embodiments described above, cases are described in which the heating of the plural number entry operation keys 40 starts after the main control section 20 or 72 has detected via the proximity sensor 23 that a customer has approached the ATM 1 and is facing the entry section 6 or 71, and the main control section 20 or 72 has outputted the arrival voice message via the speaker 22.

However, the present invention is not limited thus. The heating of the plural number entry operation keys 40 may be started at various alternative timings, such as when the main control section 20 or 72 detects via the proximity sensor 23 that a customer has approached the ATM 1 or 70 and is facing the entry section 6 or 71, when a card is inserted by the customer, when a transaction type is selected by the customer, just after a PIN number has been entered by the customer, when withdrawal banknotes are taken by the customer, when the main control section 20 or 72 detects via the proximity sensor 23 that the customer has taken the withdrawn banknotes and moved away from in front of the ATM 1 or 70, or the like.

As a further example, the temperature control section 63 or 85 of the present invention may be structured so as to detect via the proximity sensor 23 that a customer has approached the ATM 1 or 70 and is facing the entry section 6 or 71, to detect via the proximity sensor 23 that a customer has moved away from in front of the ATM 1 or 70, or the like.

The temperature control section 63 or 85 of the present invention may detect via the proximity sensor 23 that a customer has approached the ATM 1 or 70 and is facing the entry section 6 or 71 or detect via the proximity sensor 23 that a customer has moved away from in front of the ATM 1 or 70, and start the heating of the plural number entry operation keys 40 in accordance with this detection.

(3-7) Seventh Alternative Embodiment

In the first and second embodiments described above, cases are described in which, when the heating of the plural number entry operation keys 40 starts, heating control currents at the regulation current value are supplied to the plural heating elements 51A to 51J so as to generate heat.

However, the present invention is not limited thus. For example, depending on the actual operation surface temperatures of the plural number entry operation keys 40, plural current values of the heating control currents may be set in advance such that the values are larger when the actual operation surface temperatures are lower.

As an example in the present invention, when the heating of the plural number entry operation keys 40 starts, the actual operation surface temperatures (that is, the actual operation surface temperatures just before the heating of the plural number entry operation keys 40) are sensed, and heating control currents at, from the plural current values, current values corresponding to the sensed actual operation surface temperatures are supplied to the plural heating elements 51A to 51J so as to generate heat.

As an example in the present invention, the plural current values of heating control currents are set in advance in accordance with temperatures of the vicinity of the ATM 1 or 70, such that the values are larger for when the temperature of the vicinity is lower.

As an example in the present invention, when the heating of the plural number entry operation keys 40 starts, the temperature of the vicinity of the ATM 1 or 70 is sensed and heating control currents at, from the plural current values, a current value corresponding to the sensed temperature of the vicinity are supplied to the plural heating elements 51A to 51J so as to generate heat.

According to the present structure of the present invention, for example, when the plural number entry operation keys 40 are heated, the actual operation surface temperatures may be raised to the target temperature in a substantially uniform heating duration, regardless of the temperatures of the operation surfaces 40A just before the heating of the plural number entry operation keys 40.

(3-8) Eighth Alternative Embodiment

In the first and second embodiments described above, cases are described in which the plural heating elements 51A to 51J are disposed with the surfaces of the plural heating elements 51A to 51J in contact with the key lower faces 40B of the plural number entry operation keys 40.

However, the present invention is not limited thus. A depth of the circuit board arrangement recess portion 46BY in each of the plural number entry plungers 46B of the operation linking portion 46 may be made deeper than in the above-described first and second embodiments, such that the plural heating elements 51A to 51J are disposed with the surfaces of the plural heating elements 51A to 51J separated from the key lower faces 40B of the plural number entry operation keys 40.

Further, the heating wiring board 50 or 75 of the present invention may be embedded in the floor of the circuit board arrangement recess portion 46BY of each of the plural number entry plungers 46B of the operation linking portion 46, such that the plural heating elements 51A to 51J are disposed with the surfaces of the plural heating elements 51A to 51J separated from the key lower faces 40B of the plural number entry operation keys 40.

Further, the surface of each of the plural heating elements 51A to 51J that is separated from the key lower face 40B of each of the plural number entry operation keys 40 of the present invention and the one face of each heating wiring board 50 or 75 may be covered with and protected by an insulating sheet.

(3-9) Ninth Alternative Embodiment

In the first and second embodiments described above, cases are described in which the main control section 20 or 72 of the ATM 1 or 70 executes the first or second transaction guidance processing routine RT1 or RT3 described in FIG. 7 and FIG. 8, FIG. 13 to FIG. 15, or FIG. 17 to FIG. 19, in accordance with the first or second transaction guidance processing program memorized in advance in the internal memory.

Meanwhile, in the first and second embodiments described above, cases are described in which the heating control section 63 or 85 of the entry section 6 or 71 executes the first, second or third temperature change processing routine RT2, RT4 or RT5 described in FIG. 7 and FIG. 8, FIG. 13 to FIG. 15, or FIG. 17 to FIG. 19, in accordance with the first, second or third temperature change processing program memorized in advance in the internal memory.

However, the present invention is not limited thus. The ATM 1 or 70 may install the first or second transaction guidance processing program from a computer readable storage medium on which the first or second transaction guidance processing program is stored.

Furthermore, the entry section 6 or 71 may install the first, second or third temperature change processing program from a computer readable storage medium on which the first, second or third temperature change processing program is stored.

Then the main control section 20 or 72 and the heating control section 63 or 85 may execute the first or second transaction guidance processing routine RT1 or RT3 and the first, second or third temperature change processing routine RT2, RT4 or RT5 in accordance with the first or second transaction guidance processing program and the first, second or third temperature change processing program that have been installed.

Further, the ATM 1 or 70 and the entry section 6 or 71 may install the first or second transaction guidance processing program and the first, second or third temperature change processing program from outside, using a wired and/or wireless communications medium such as a local area network, the Internet, digital satellite broadcasting or the like.

A computer readable storage medium for installing and making executable the first or second transaction guidance processing program and the first, second or third temperature change processing program at the ATM 1 or 70 and the entry section 6 or 71 may be realized as, for example, a package medium such as a floppy disk.

Further, a computer readable storage medium for installing and making executable the first or second transaction guidance processing program and the first, second or third temperature change processing program at the ATM 1 or 70 and the entry section 6 or 71 may be realized as, for example, a package medium such as a Compact Disc Read-Only Memory (CD-ROM).

Further, a computer readable storage medium for installing and making executable the first or second transaction guidance processing program and the first, second or third temperature change processing program at the ATM 1 or 70 and the entry section 6 or 71 may be realized as, for example, a package medium such as a Digital Versatile Disc (DVD) or the like.

Further, the present computer readable storage medium may be realized as, rather than a package medium, a semiconductor memory, a magnetic disk or the like on which the programs are temporarily or permanently stored.

A wired and/or wireless communications medium such as a local area network, the Internet, digital satellite broadcasting or the like may be employed as a means for storing the first or second transaction guidance processing program and the first, second or third temperature change processing program at these computer readable storage media.

Further, the first or second transaction guidance processing program and the first, second or third temperature change processing program may be stored at the computer readable storage media via any of various communications interfaces such as routers, modems and the like.

(3-10) Tenth Alternative Embodiment

In the first and second embodiments described above, cases are described in which the entry section 6 or 71 provided at the ATM 1 or 70 that handles cash in the form of banknotes, described above with FIG. 1 to FIG. 22, is employed as the entry device according to the present invention.

However, the present invention is not limited thus, and may be widely employed in entry devices with various alternative structures, such as: an entry section that is provided at an ATM that handles cash in the form of banknotes and coins, and includes operation keys that can be pressed for the entry of PIN numbers; an entry section that is provided at a cash dispenser (CD) and includes operation keys that can be pressed for the entry of PIN numbers; an entry section that is provided at a deposit and withdrawal administration device and includes operation keys that can be pressed for the entry of PIN numbers; a card management terminal that includes a card insertion aperture and operation keys that can be pressed for the entry of PIN numbers; or the like.

(3-11) Eleventh Alternative Embodiment

In the first and second embodiments described above, cases are described in which the ATM 1 or 70 that handles cash in the form of banknotes, described above with FIG. 1 to FIG. 22, is employed as the paper sheets handling device according to the present invention.

However, the present invention is not limited thus, and may be widely employed in paper sheets handling devices with various alternative structures that are equipped with entry sections including operation keys that can be pressed for the entry of PIN numbers, such as an ATM that handles cash in the form of banknotes and coins, a CD, or the like.

(3-12) Twelfth Alternative Embodiment

In the first and second embodiments described above, cases are described in which PIN numbers that are a predetermined number of digits, described above with FIG. 1 to FIG. 22, are employed as the character strings for identification to be entered via the plural operation keys that can be pressed for operation by respective operation surfaces thereof being touched with the fingertips of a hand.

However, the present invention is not limited thus. Alternative character strings for authentication may be widely employed, such as digits, symbols and letters used for personal identification and/or character strings for identification that are formed by combining plural characters, such as pseudonyms and the like.

(3-13) Thirteenth Alternative Embodiment

In the first and second embodiments described above, cases are described in which the number entry operation keys 40, 87, 88, 89, 92 and 96 that are formed of aluminium, stainless steel or the like, described above with FIG. 1 to FIG. 22, are employed as the plural operation keys that can be pressed for operation by respective operation surfaces thereof being touched with the fingertips of a hand, for the entry of authentication character strings.

However, the present invention is not limited thus. Operation keys with various alternative shapes and materials may be widely employed, such as operation keys that are formed of resin materials in shapes that are circles, ellipses and the like, operation keys that are formed of metals other than aluminium and stainless steel in shapes that are circles, ellipses and the like, and so forth.

(3-14) Fourteenth Alternative Embodiment

In the first and second embodiments described above, cases are described in which the temperature changing unit 60 or 79, described above with FIG. 1 to FIG. 22, is employed as the temperature changing unit that changes the temperatures of the operation surfaces of the plural operation keys and makes the temperatures substantially equal when an authentication character string is to be entered.

However, the present invention is not limited thus. Temperature changing units that execute portions of the processing in software may be widely employed.

Further, the present invention is not limited thus and a temperature changing unit may be employed that is provided with, instead of the plural heating elements 51A to 51J, plural cooling elements for lowering the actual operation surface temperatures of the plural number entry operation keys 40, 87, 88, 89, 92 or 96 to lower than body temperature or for lowering actual operation surface temperatures that are higher than body temperature to around body temperature.

Further yet, the present invention is not limited thus and temperature changing units with various alternative structures may be employed, such as a temperature changing unit that is provided with the plural heating elements 51A to 51J for raising actual operation surface temperatures of the plural number entry operation keys 40, 87, 88, 89, 92 or 96 that are lower than body temperature to around body temperature, and with plural cooling elements for lowering actual operation surface temperatures that are higher than body temperature to around body temperature, and in which the plural heating elements 51A to 51J and the plural cooling elements are employed in accordance with, for example, the actual operation surface temperatures of the plural number entry operation keys 40, 87, 88, 89, 92 or 96 just before the heating starts.

(3-15) Fifteenth Alternative Embodiment

In the first and second embodiments described above, cases are described in which the heating elements 51A to 51J that are resistive heat generating bodies, described above with FIG. 1 to FIG. 22, are employed as the plural heating elements for respective heating of the plural operation keys.

However, the present invention is not limited thus. Heating elements with various alternative structures may be widely employed provided they can heat the plural operation keys and raise the actual operation surface temperatures to around body temperature, such as infrared heaters, thermoelectric elements and the like.

(3-16) Sixteenth Alternative Embodiment

In the first and second embodiments described above, cases are described in which the heating processing section 54 or 78, described above with FIG. 1 to FIG. 22, is employed as a heating processing section that causes the plural heating elements to generate heat and heats the plural operation keys when an authentication character string is to be entered.

However, the present invention is not limited thus. Heating processing sections with various alternative structures may be widely employed, such as heating processing sections that execute portions of the processing in software.

(3-17) Seventeenth Alternative Embodiment

In the first and second embodiments described above, cases are described in which the temperature sensors 76A to 76J that are thermistors, described above with FIG. 1 to FIG. 22, are employed as the plural temperature sensors for sensing the respective temperatures of the operation surfaces of the plural operation keys.

However, the present invention is not limited thus. Temperature sensors with various alternative structures may be widely employed, such as platinum sensors, thermocouples and the like.

INDUSTRIAL APPLICABILITY

The present invention may be employed in entry devices that are provided at automatic teller machines, deposit and withdrawal management devices and the like, and in paper sheets handling devices such as automatic teller machines, cash dispensers and the like.

The disclosures of Japanese Patent Application No. 2012-153411 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

The invention claimed is:

1. An entry device comprising: a plurality of operation keys that can be operated by pressing respective operation surfaces of the operation keys, to be used for entry of an authentication character string; and
   a temperature changing unit that changes temperatures of the operation surfaces of the plurality of operation keys individually, to be substantially equal, the temperature changing unit including
   a plurality of heating elements that heat the plurality of operation keys individually, each of the plurality of heating elements being disposed at a respective operation key among the plurality of operation keys and providing heat thereto, and
   a heating processing section that causes the plurality of heating elements to generate heat.

2. The entry device according to claim 1 wherein
   the temperature changing unit includes a plurality of temperature sensors that individually sense the temperatures of each of the operation surfaces of the plurality of operation keys, each of the plurality of temperature sensors being disposed at a respective operation key among the plurality of operation keys, and
   the heating processing section senses the respective temperatures of the operation surfaces of the plurality of operation keys via the plurality of temperature sensors.

3. The entry device according to claim 2, wherein
   the heating processing section compares each of the respective temperatures of the operation surfaces of the plurality of operation keys, which are sensed via the plurality of temperature sensors, with a target temperature, the target temperature being set in advance for changing of the temperatures of the operation surfaces.

4. The entry device according to claim 3, wherein the heating processing section alters heat generation amounts of the plurality of heating elements in accordance with comparison results obtained by comparing each of the temperatures of the operation surfaces of the plurality of operation keys that are sensed via the plurality of temperature sensors with the target temperature.

5. The entry device according to claim 4, wherein the heating processing section alters the heat generation amounts of the plurality of heating elements such that the lower the temperatures of the operation surfaces of the plurality of operation keys that are sensed via the plurality of temperature sensors are relative to the target temperature, the more the heat generation amounts are increased.

6. The entry device according to claim 5, wherein, when the authentication character string is to be entered, the heating processing section changes the temperatures of at least a portion of the operation surfaces of the plurality of operation keys by causing the plurality of heating elements to generate heat for heating the plurality of operation keys.

7. The entry device according to claim 1, wherein
   the temperature changing unit changes the temperatures of at least a portion of the operation surfaces of the plurality of operation keys.

8. The entry device according to claim 1, wherein
   the temperature changing unit comprises a cooling element that cools the plurality of operation keys, and a cooling processing section that controls the cooling element so as to cool the plurality of operation keys.

9. The entry device according to claim 1, wherein the temperature changing unit comprises
   a cooling element that cools the plurality of operation keys, and
   a plurality of temperature sensors that sense the temperatures of each of the operation surfaces of the plurality of operation keys, and
   the temperature changing unit changes the temperatures of the operation surfaces of the plurality of operation keys by employing the plurality of heating elements and the cooling element in accordance with the respective temperatures of the operation surfaces of the plurality of operation keys that are sensed via the plurality of temperature sensors.

10. A paper sheets handling device comprising:
    a plurality of operation keys that can be operated by pressing respective operation surfaces of the operation keys, to be used for entry of an authentication character string that is required for specific handling of a paper sheet; and
    a temperature changing unit that changes temperatures of the operation surfaces of the plurality of operation keys individually, to be substantially equal, the temperature changing unit including
    a plurality of heating elements that heat the plurality of operation keys individually, each of the plurality of heating elements being disposed at a respective operation key among the plurality of operation keys and providing heat thereto, and
    a heat processing section that causes the plurality of heating elements to generate heat.

11. An entry device comprising:
    a plurality of operation keys that can be operated by pressing respective operation surfaces of the operation keys, to be used for entry of an authentication character string;
    a temperature changing unit that changes temperatures of the operation surfaces of the plurality of operation keys to be substantially equal; and
    a sensor to detect whether or not a person, who enters the authentication character string, faces the entry device,
    wherein the temperature changing unit changes the temperatures of the operation surfaces of the plurality of operation keys at any timings from the moment the sensor detects that the person faces the entry device, to the moment the sensor detects that the person moves away from the entry device.

12. The entry device according to claim 11, wherein
    the temperature changing unit changes the temperatures of the operation surfaces of the plurality of operation keys in a case in which the sensor detects that the person faces the entry device.

13. The entry device according to claim 11, wherein
    the temperature changing unit changes the temperatures of the operation surfaces of the plurality of operation keys in a case in which the sensor detects that the person moves away from the entry device.

14. The entry device according to claim 11, wherein
    the temperature changing unit changes the temperatures of the operation surfaces of the plurality of operation keys in a case in which the person selects a process type for which entry of the authentication character string is necessary.

15. The entry device according to claim 11, wherein the temperature changing unit changes the temperatures of the operation surfaces of the plurality of operation keys in a case in which the person enters the authentication character string by pressing the plurality of operation keys.

* * * * *